(12) United States Patent
Berkun

(10) Patent No.: US 7,427,018 B2
(45) Date of Patent: Sep. 23, 2008

(54) SYSTEMS AND METHODS FOR GENERATING, READING AND TRANSFERRING IDENTIFIERS

(76) Inventor: Kenneth A. Berkun, 230 Ilihau St., Kailua, HI (US) 96734

( * ) Notice: Subject to any disclaimer, the term of this patent is extended or adjusted under 35 U.S.C. 154(b) by 143 days.

(21) Appl. No.: 11/197,754

(22) Filed: Aug. 4, 2005

(65) Prior Publication Data

US 2006/0249573 A1   Nov. 9, 2006

Related U.S. Application Data

(60) Provisional application No. 60/678,549, filed on May 6, 2005.

(51) Int. Cl.
*G06K 5/00* (2006.01)
(52) U.S. Cl. .................. 235/380; 235/375; 235/487
(58) Field of Classification Search .............. 235/380, 235/375, 487, 462.1, 462.45, 472.01, 472.02
See application file for complete search history.

(56) References Cited

U.S. PATENT DOCUMENTS

| | | | |
|---|---|---|---|
| 4,337,375 A | | 6/1982 | Freeman |
| 5,378,881 A | | 1/1995 | Adachi |
| 5,406,024 A | | 4/1995 | Shioda |
| 5,489,769 A | | 2/1996 | Kubo |
| 5,550,365 A | * | 8/1996 | Klancnik et al. ....... 235/462.25 |
| 5,631,457 A | | 5/1997 | Fukuda et al. |
| 5,938,727 A | | 8/1999 | Ikeda |
| 6,042,014 A | | 3/2000 | Zannetti |
| 6,095,418 A | * | 8/2000 | Swartz et al. .......... 235/462.01 |
| 6,144,848 A | * | 11/2000 | Walsh et al. ................ 455/419 |
| 6,437,229 B1 | | 8/2002 | Nobumoto |
| 6,574,441 B2 | | 6/2003 | McElroy |
| 6,629,635 B1 | * | 10/2003 | Akamine .................... 235/375 |
| 2002/0037168 A1 | | 3/2002 | Horii et al. |
| 2003/0012557 A1 | | 1/2003 | Tingey et al. |
| 2003/0048882 A1 | * | 3/2003 | Smith ....................... 379/88.14 |
| 2003/0136837 A1 | * | 7/2003 | Amon et al. ................. 235/435 |
| 2003/0155368 A1 | | 8/2003 | Giancarlo |
| 2003/0189089 A1 | | 10/2003 | Raistrick et al. |
| 2005/0010409 A1 | * | 1/2005 | Hull et al. .................... 704/243 |
| 2005/0041120 A1 | | 2/2005 | Miller |
| 2005/0199699 A1 | * | 9/2005 | Sato et al. ................... 235/375 |

(Continued)

FOREIGN PATENT DOCUMENTS

EP   1101351   5/2001

(Continued)

OTHER PUBLICATIONS

Olympus Optical Co., Ltd. Annual Report 1999, ScanTalk Reader R200 p. 18.

*Primary Examiner*—Edwyn Labaze
(74) *Attorney, Agent, or Firm*—Black Lowe & Graham PLLC

(57) ABSTRACT

Systems and methods for generating, reading and transferring identifiers are disclosed. In one embodiment, a handheld system for associating a selected audio content with an object includes an identifier applied to a surface of the object and having a predetermined graphical format that is configured to encode the selected audio content, and a handheld device operable to encode the identifier and further operable to detect an audio content associated with the identifier.

6 Claims, 66 Drawing Sheets

U.S. PATENT DOCUMENTS

2006/0054702 A1\* 3/2006 Lei ........................ 235/462.13
2006/0111967 A1\* 5/2006 Forbes .......................... 705/14

FOREIGN PATENT DOCUMENTS

| | | |
|---|---|---|
| EP | 1190375 | 3/2002 |
| EP | 1183641 | 12/2002 |
| JP | 07-085085 | 9/1993 |
| JP | 2001-51368 | 2/2001 |
| JP | 2001-108513 | 4/2001 |
| WO | WO0232108 | 4/2002 |
| WO | WO2002032109 | 4/2002 |
| WO | WO02069243 | 9/2002 |
| WO | WO2004008378 | 1/2004 |

\* cited by examiner

Fig. 44B
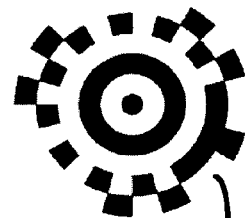
Fig. 44C
 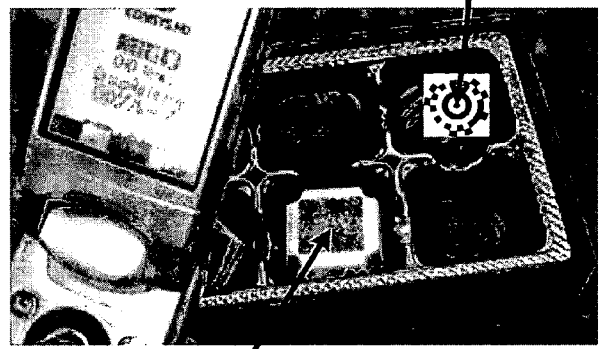
Fig. 44D
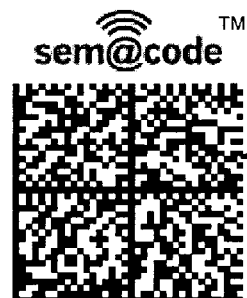
Fig. 44A

Note Pad

Book

Label

Resume'

Greeting Cards

Newspapers

Boxes

| Codec | Rate (kHz) | Bitrate (kbps) | Delay (ms) | Multi-rate | VBR | PLC | Bit-robust |
|---|---|---|---|---|---|---|---|
| Speex | 8, 16, 32 | 2.15-24.6 (NB) | 30 (NB) | yes | yes | | |
| | | 4-44.2 (WB) | 34 (WB) | | | | |
| iLBC | 8 | 13.3 | 30 | | | yes | |
| AMR-NB | 8 | 4.75-12.2 | 20 | yes | | yes | yes |
| AMR-WB (G.722.2) | 16 | 6.6-23.85 | 20 | yes | | yes | yes |
| G.729 | 8 | 8 | 15 | | | yes | yes |
| GSM-FR | 8 | 13 | 20 | | | | |
| GSM-EFR | 8 | 12.2 | 20 | | | yes | yes |
| G.723.1 | 8 | 5.3 6.3 | 37.5 | | | yes | |
| G.728 | 8 | 16 | 0.625 | | | | |
| G.722 | 16 | 48 56 64 | | | | | |

*Fig. 51*

SYSTEMS AND METHODS FOR GENERATING, READING AND TRANSFERRING IDENTIFIERS

PRIORITY CLAIM

This application claims priority to and incorporates by reference as if fully disclosed herein U.S. Provisional Patent application No. 60/678,549 filed May 6, 2005.

FIELD OF THE INVENTION

This invention relates generally to systems and methods for generating, reading and transferring identifiers and, more specifically, for reading, transferring and printing identifiers encoding selected digital audio content.

BACKGROUND OF THE INVENTION

One-dimensional barcodes utilize a series of lines and spaces to encode information. Although one-dimensional barcodes are useful for storing information, one-dimensional barcodes have a limited information storage capacity.

Two-dimensional barcodes utilize a series of lines and spaces that are oriented with respect to a pair of generally perpendicular axes to encode information. Accordingly, two-dimensional barcodes may be used to store information in the same manner as one-dimensional barcodes with the added benefit of an enhanced information storage capability due to the additional barcode dimension. The added storage capacity of two-dimensional barcodes makes them highly suitable for new and creative uses that extend beyond typical one-dimensional barcode applications.

Audible information such as speech data, or other sounds may be stored in various digital formats. Typically, digital audiotapes, compact disks (CDs), digital videodisks (DVDs), computers, and other similar devices are operable to store digital representations of sound and voice data. The foregoing storage media are also advantageously configured to store large amounts of data. A significant drawback, however, is that the foregoing storage media are not readily integrated into a paper product.

Paper products that include informational content are also widely used in a number of well-known applications. For example, photo albums, books, greeting cards, cereal boxes, posters, newspapers, fliers, magazines, business memos, faxes, and labels all include information in a graphical form. Consequently, users of the foregoing products must rely exclusively on their visual sensory system to read and interpret the graphical forms included on these paper products. Other sensory systems, such as the human auditory system, are not generally useable in interpreting the informational content present in such paper products.

Therefore, what is needed are methods and systems for storing information on paper products that allow the human auditory system to complement the human visual system when interpreting information presented paper products.

SUMMARY OF THE INVENTION

The present invention is directed to systems and methods for generating, reading and transferring identifiers. In one aspect, a handheld system for associating a selected audio content with an object includes an identifier applied to a surface of the object and having a predetermined graphical format that is configured to encode the selected audio content, and a handheld device operable to encode the identifier and further operable to detect an audio content associated with the identifier.

BRIEF DESCRIPTION OF THE DRAWINGS

Embodiments of the present invention are described in detail below with reference to the following drawings.

FIG. 34A is an expansion of the algorithm contained within block 360-26-24 from FIG. 33;

FIG. 34B is an expansion of the algorithm contained within block 360-26 from FIG. 32B;

FIG. 44A through FIG. 44D are pictorial views that will be used to describe still another application of the disclosed embodiments of the invention;

FIG. 51 is a table of compressor/decompressor algorithms (CODECs) for encoding audio sound into an identifier.

DETAILED DESCRIPTION OF THE PREFERRED EMBODIMENT

Figure 1:
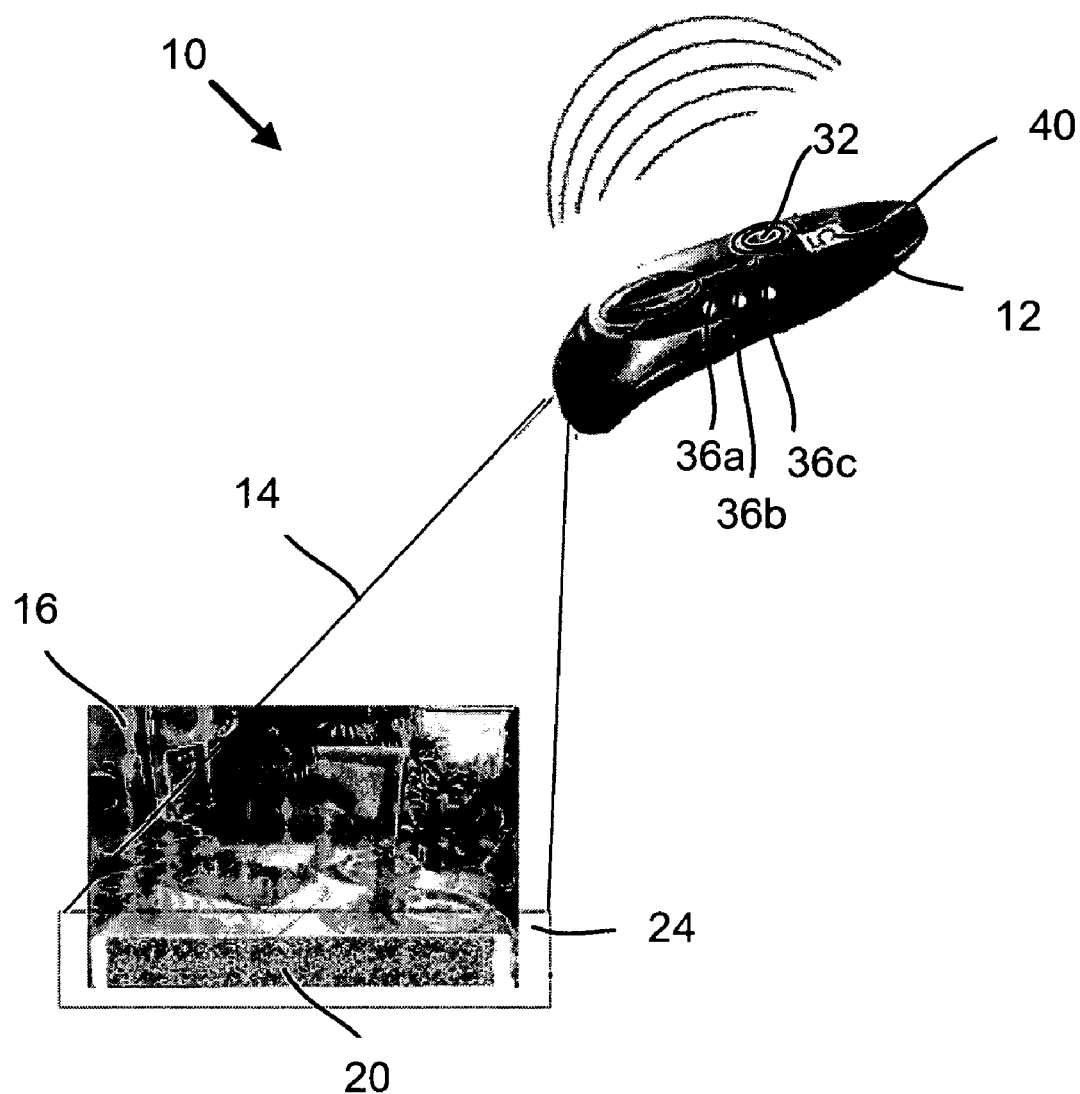
FIG. 1 is an isometric view of a handheld identifier reader system, according to an embodiment of the invention.

The present invention relates generally to systems and methods for reading and printing identifiers and, more specifically, for reading and printing identifiers that encode alphanumeric information and/or digital representations of sound. Particular embodiments of the present invention are shown in FIGS. 1 through 61D to provide a thorough understanding of such embodiments. One skilled in the art, however, will understand that the present invention may have additional embodiments, or that the present invention may be practiced without several of the details described in the following description.

FIG. 1 is an isometric view of a handheld system 10 that is operable to read and generate identifiers, according to an embodiment of the invention. The system 10 includes a handheld reader 12 and an identifier 20. The identifier 20 may include a one-dimensional (1D) bar code, a two-dimensional (2D) bar code, or other suitable graphical arrangements of optically detectable and readable symbols. The identifier 20 contains audio content, such as voice signals or other sounds that are digitally encoded on the identifier 20. The reader 12 is configured to read the identifier 20 by receiving optical information within a sector-shaped viewing wedge 14 that is positioned over or proximate to an image 16. Although the image 16 of FIG. 1 is depicted as a photograph, it is understood that the image 16 may include graphical information in other forms that are positioned on surface portions of various objects such as a newspaper, a magazine or other similar printed articles, a wall of a container, a greeting card, a museum display panel, or any other surface of an object that a reader may view. The identifier 20 may be positioned along a border of the image 16. Alternately, the identifier 20 may be positioned at other locations within the image 16. The identifier 20 may be applied over or upon the surface of the image 16 or may be integral with the surface of the image 16. The image 16 that includes the identifier 20 may be faxed, scanned, imaged, copied and emailed, since the identifier 20 and the image 16 are both optically detectable and readable. Alternatively, the identifier 20 may also be in the form of a magnetic stripe or a radio frequency identification (RFID) tag that are readable with a wand attachment (not shown) coupled to the reader 12 that is configured to sense respective magnetic and radio signals.

The reader 12 may include a built-in speaker 32, a plurality of control buttons 36a, 36b, and 36c, and a timer 40. The control buttons 36a-36c are configured to implement various user commands. The control buttons 36a-36c thus allow a user of the reader 12 to play and record auditory informational content, such as music, voice, and environmental sounds associated with the image 16. For example, control button 36a may be a record button, control button 36b may be a play button, and control button 36c may be a stop button. The control buttons 36a-36c may also be configured to perform other functions. For example, a selected one of the buttons 36a-36c may be operable to perform a print function that permits the identifier 20 or a representation of the identifier 20 to be printed on a suitable printer (not shown in FIG. 1). The printer may be configured to print the identifier 20 on any suitable substrate material. The control buttons 36a-36c shown in FIG. 1 are operable to initiate a predetermined function by actuating the necessary software and circuitry to perform the designated functions. In other alternate embodiments, the control buttons 36a-36c may be located on another remote device such as a printer (not shown in FIG. 1) as described in other embodiments, which will be described in greater detail below. In a further alternate embodiment, the control buttons 36a-36c may be omitted, so that the prescribed functions corresponding to the buttons 26a-36c may be voice activated.

Still referring to FIG. 1, the hand held reader 12 includes an optical imaging device that may include a charge-coupled device (CCD) array, a complimentary, metal-oxide semiconductor (CMOS) array, Foveon light sensors, a laser-based or LED-based scanning device that may be moved across the identifier 20 to detect the image thereon. The information encoded in the identifier 20 typically appears in a pixel array within the identifier 20, but other digital media forms may be used, that include non-pigmentation-based representations, which may further include raised bumps on an exposed surface of a semi-rigid medium or pit-like depressions on the exposed surface of the semi-rigid medium, which will be discussed in greater detail below. In another embodiment, the digital media form may present the encoded information in a combination of non-pigmented or pigmented bumps and/or depressions. Magnetic inks or plastic stationary strips of compact disk pits-and-lands may serve as another manifestation of a 2D pixel array of the sound-encoded identifier. Yet other digital forms may include magnetic stripes and RFID tags to encode information associated with the image 16. When the identifier 20 includes an RFID tag, the reader 12 also includes an interrogator that is configured to interrogate the RFID, and a receiver that is operable to receive signals emanating from the RFID in response to the interrogation. The receiver may also be configured to process signals received from the RFID tag.

The hand held reader 12 also includes a processor (not shown in FIG. 1) that is coupled to the buttons 36a-36c, the optical imaging device, the timer 40 and the speaker 32 that is operable to scan a pixel-containing image of the encoded identifier 20, and to process the received image. The suitably processed digital information may then be translated into an audible form and transferred to the speaker 32 for audible reception by a user. The timer 40 is operable to time a play period of sound and/or voice playback from the speaker 42. As shown in this embodiment, the timer 40 may visually indicate the elapsed time for sound recordings or sound playbacks using a visual display positioned on the hand held reader 12. Alternatively, the timer 40 may visually indicate an elapsed time for recording a voice or ambient sound.

Figure 2:
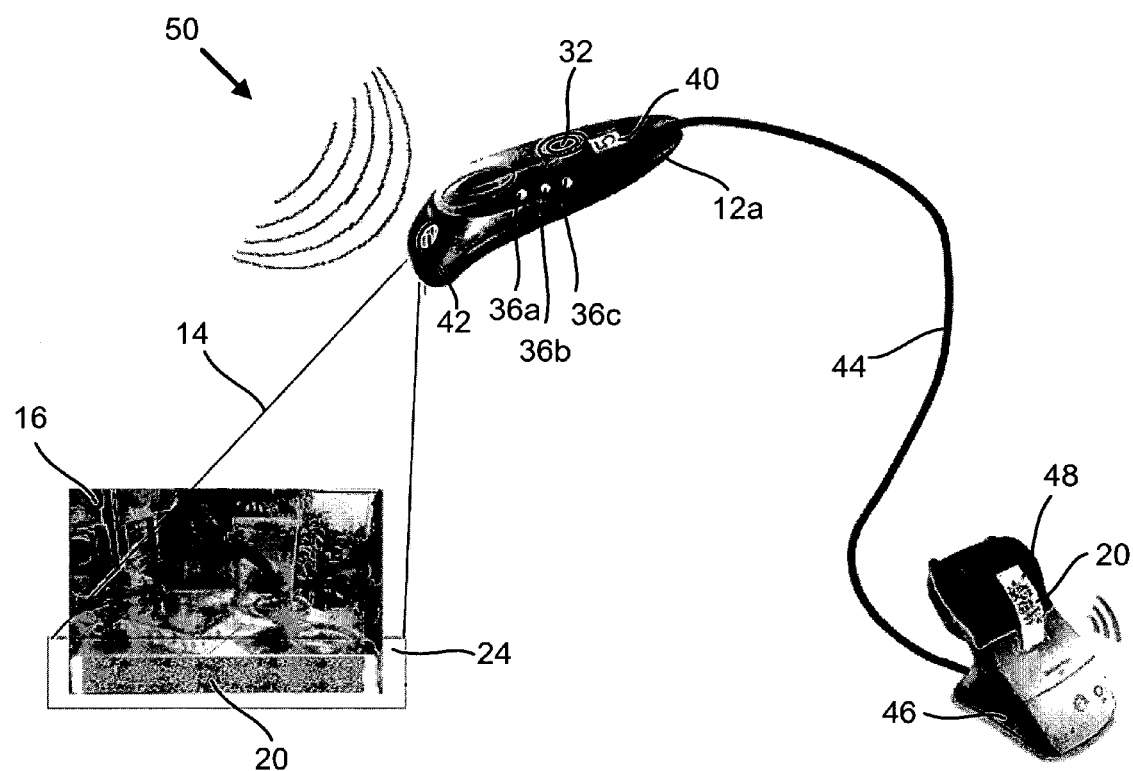
FIG. 2 is an isometric view of a handheld identifier reader system, according to another embodiment of the invention.

FIG. 2 is an isometric view of a handheld reader system 50 that is operable to read and generate identifiers, according to another embodiment of the invention. The system 50 includes a reader 12a, an identifier 20, and a printer 46 coupled to the reader 12a by a conduit 44. Many of the details of the reader 12a and the identifier 20 have been previously discussed in detail, and in the interest of brevity, will not be discussed further. The system 50 is configured to receive sound from the environment in which the reader 12 is located, and to convert the sound to a digital form. The digitally encoded sound may be printed onto an identifier 20 so that the encoded digital sound and/or voice information resides in the identifier 20. The identifier 20 may then be read by the reader 12a, and an audio signal may be transferred to the speaker 42 for confirmation purposes.

The reader 12a further includes a microphone 42 that is operable to capture sound and convert the sound into electrical signals. The microphone 42 receives auditory information such as voice or speech information, or other sounds from the environment for a time period that is identified by the timer 40. The voice information or other audible sound signals are converted from analog signals to digital signals by an analog-to-digital (A/D) converter located within the processor. The digital-encoded sound is routed to the printer 46 through the conduit 44, which may include metallic conductors, or alternately, may include fiber-optic elements. In still another particular embodiment, the reader 12a and the printer 46 communicate wirelessly. In either case, the printer 46 prints the identifier 20 having an optically viewable image of the digitally encoded sound onto a medium 48. The medium 48 may be a paper-based medium, or it may be polymer-based, and in either case, the medium 48 may also include an adhesive backing. In a particular embodiment, the printer 46 includes the circuitry and software necessary to perform the image processing functions, such as image encoding and decoding. The printer 46 may include a laser printer or an ink-jet printer having a color printing capability, and print on commonly available paper stocks. Alternately, the printer 46 may be configured to transfer a non-pigment based identifier 20 onto a semi-rigid, or even a rigid substrate in the form of raised projections or depression-like pits. In a specific embodiment, the printer 46 is configured to etch, abrade or laser imprint the identifier 20 onto the rigid or semi-rigid substrate. In yet another particular embodiment of the invention, the printer 46 creates labels and coded with two-dimensional barcodes suitable for fixing on surfaces of objects or surfaces of images of objects. In yet another particular embodiment, the speaker 42 may be located on the printer 46. The speaker 42, whether located on the reader 12a or printer 46, may be configured to operate as a microphone. The identifier 20 may also take the form of a magnetic stripe or an RFID tag, and the reader 12a would be suitably equipped with a wand (not shown) configured to sense magnetic or radio signals, respectively.

Figure 3:
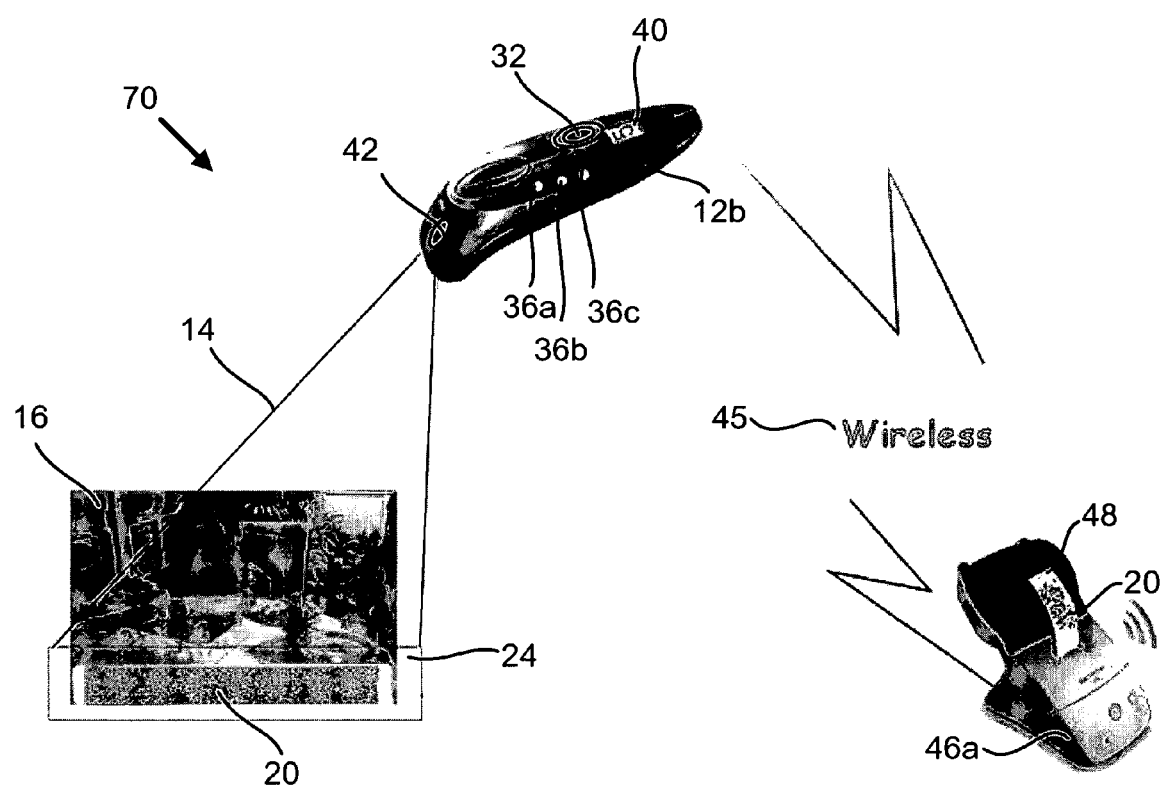
FIG. 3 is an isometric view of a handheld identifier reader system, according to another embodiment of the invention.

FIG. 3 is an isometric view of a handheld reader system 70 that is operable to read and generate identifiers, according to another embodiment of the invention. Many of the details of the present embodiment have been discussed in connection with the foregoing embodiments, and accordingly, will not be described further. The system 70 includes a reader 12b, the identifier 20, and a printer 46 that is operable to communicate wirelessly with the reader 12b by means of wireless signals 45. The reader 12b includes a transceiver (not shown in FIG. 3) that is operable to radiate the wireless signals 45, and also to receive wireless signals 45 from a corresponding transceiver located within the printer 46. The wireless signals 45 may include radio frequency (RF) radiation, visible light or infrared radiation.

Figure 4:
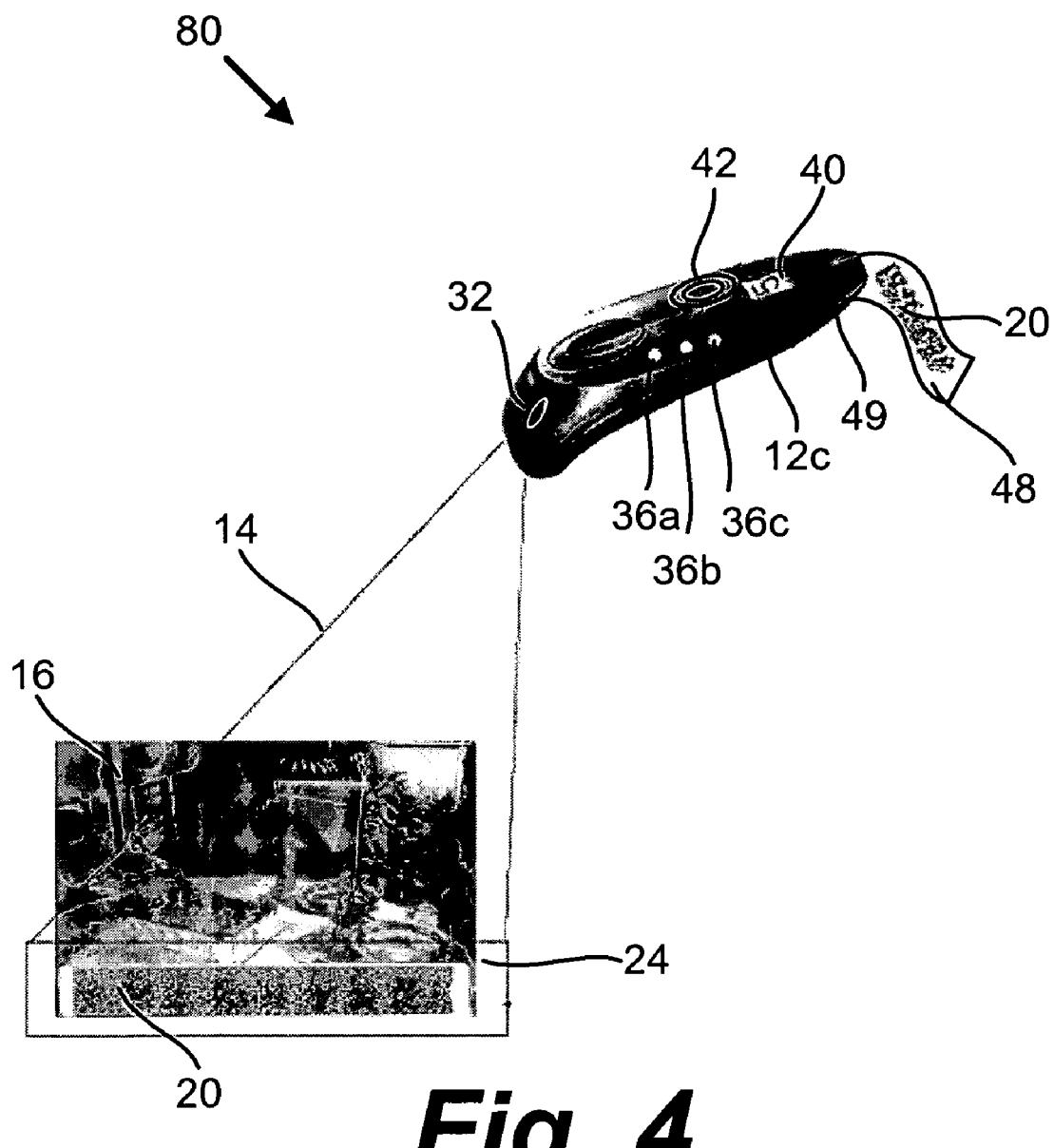
FIG. 4 is an isometric view of a handheld identifier reader system according to another embodiment of the invention.

FIG. 4 is an isometric view of a handheld reader system 80 that is operable to read and generate identifiers, according to another embodiment of the invention. The system 80 includes a reader 12c that incorporates a printer 49 located within the reader 12c. The printer 49 is configured to generate an identifier 20 that may be printed on a medium 48a that is stored within the reader 12c before printing. The medium 48a may be printed on any suitable flexible substrate material, such as a polymeric or a paper-based material. The medium 48a may also include an adhesive material applied to a side of the medium 48a so that the medium 48a may be adhesively affixed to a surface. Alternately, the printer 49 may also eject a stamped-out non-pigmented identifier 20.

Figure 5:
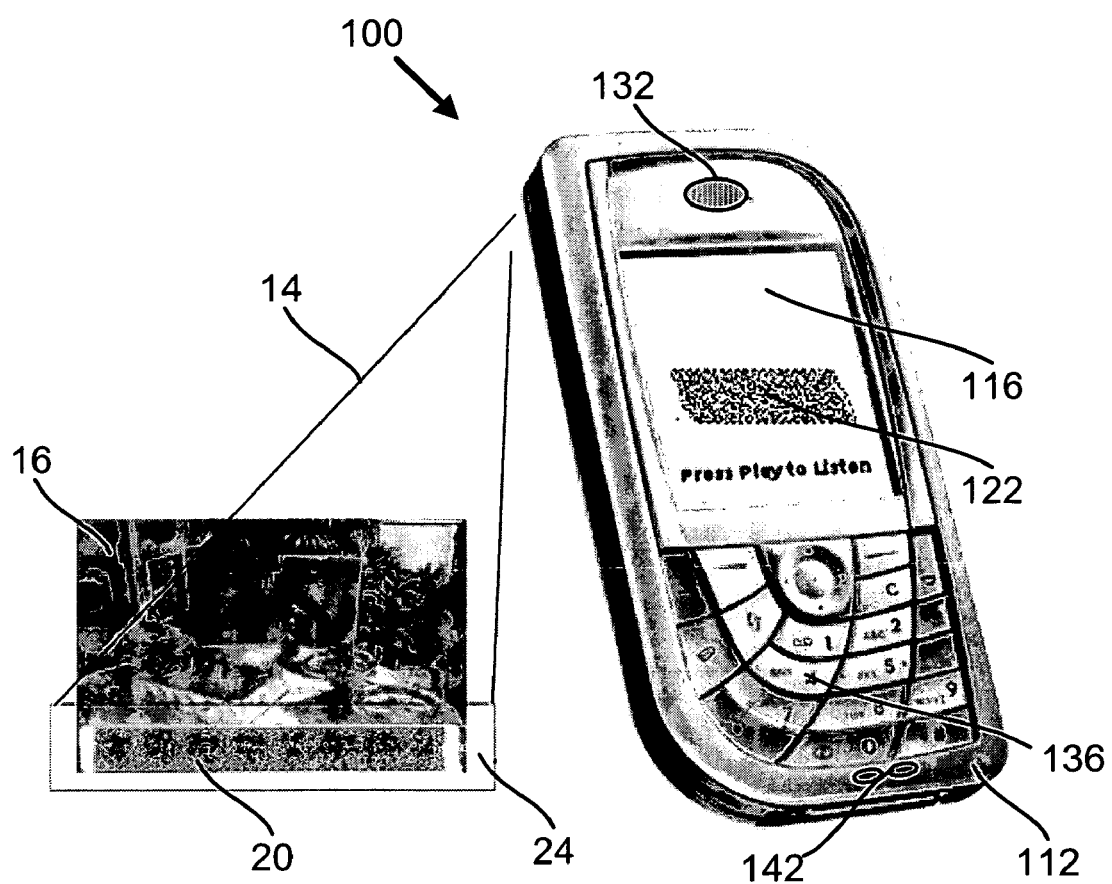
FIG. 5 is an isometric view of a handheld identifier reader system according to still another embodiment of the invention.

FIG. 5 is an isometric view of a handheld reader system 100 that is operable to read and generate identifiers, according to still another embodiment of the invention. The system 100 includes a lightweight, handheld computer 112 that is operable to perform many of the functions of the foregoing embodiments of the invention, as will be described in detail below. The handheld computer 112 may be readily incorporated into various known and commercially available devices, such as a cellular phone having a Personal Digital Assistant (PDA) function that is operable as a personal organizer, or a PDA or other microprocessor equipped device operable to execute algorithms configured to generate original voice or sound-encoded identifiers or to make replicates of original sound containing identifiers. The handheld computer 112 may also be incorporated into a cellular telephone or a cellular telephone having an integral digital camera. The handheld computer 112 includes a display surface 116 that is configured to communicate visual information to a user, a speaker 132 configured to communicate audible information to a user, and a keypad 136 that allows a user to communicate various commands to the computer 112. In the present embodiment, the computer 112 optically reads the identifier 20 and an image 122 of the identifier 20 is displayed on the display surface 116. The computer 112 may be configured to present a user with various "prompts" on the display surface 116 to engage the user to actuate a selected one of the keys on a keypad 136 in order to initiate a function corresponding to the selected key. For example, a prompt may direct a user to "press play to listen", whereupon the user presses a key on the keypad 136 to begin a play sequence that extracts the audio content from the identifier 20 and to audibly communicate the extracted audio content to a user through the speaker 132. Alternately, a pen or a stylus device may be used to select the prompt shown on the display surface 116, and to initiate the desired action. Suitable stylus devices are commonly used with PDA's and other similar devices. Alternate embodiments of the handheld computer 112 may include an integral microphone 142. As with the other printer embodiments of the prior devices, the identifier 20 may be of an ink-on-media or a variety of modified pitted surface or raised projections, i.e., non-pigmented pixel arrays.

Figure 6:
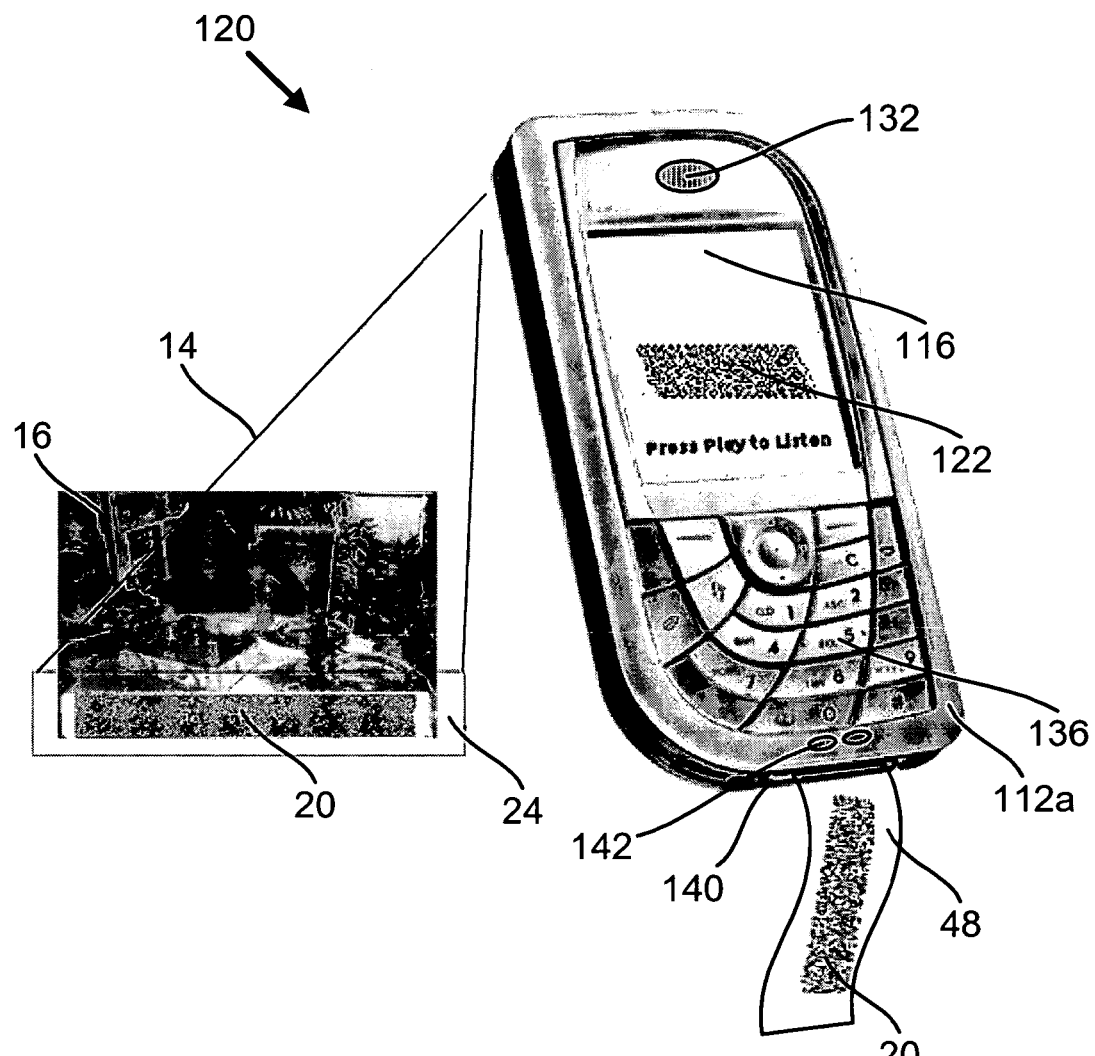
FIG. 6 is an isometric view of a handheld identifier reader system according to another embodiment of the invention.

FIG. 6 is an isometric view of a handheld barcode reader system 120 that is operable to read and generate identifiers, according to another embodiment of the invention. The system 120 includes the handheld computer 112 of FIG. 5, and further includes an integral printer 140 that is positioned within the computer 112. The integral printer 140 is operable to print an identifier 20 on a medium 48, as previously described. The computer 112 may also be incorporated into various commercially available devices, including cellular telephones and cellular telephones that incorporate digital cameras.

Still other embodiments of the computer 112 of FIG. 5 and FIG. 6 are possible. For example, the computer 112 may be configured to capture images from a printed identifier 20 and to transfer the data to digital devices using an infrared data link, a satellite data link, by means of the Internet or by other direct or indirect communication systems. Accordingly, data encoded on the identifier 20 may be emailed or faxed to a corresponding computer 112 by the reader 112. In another embodiment, the key pad 136 may be employed to allow commands to be input by a user that may be used to print, read or play the digital content coded in the identifier 20.

Figure 7:
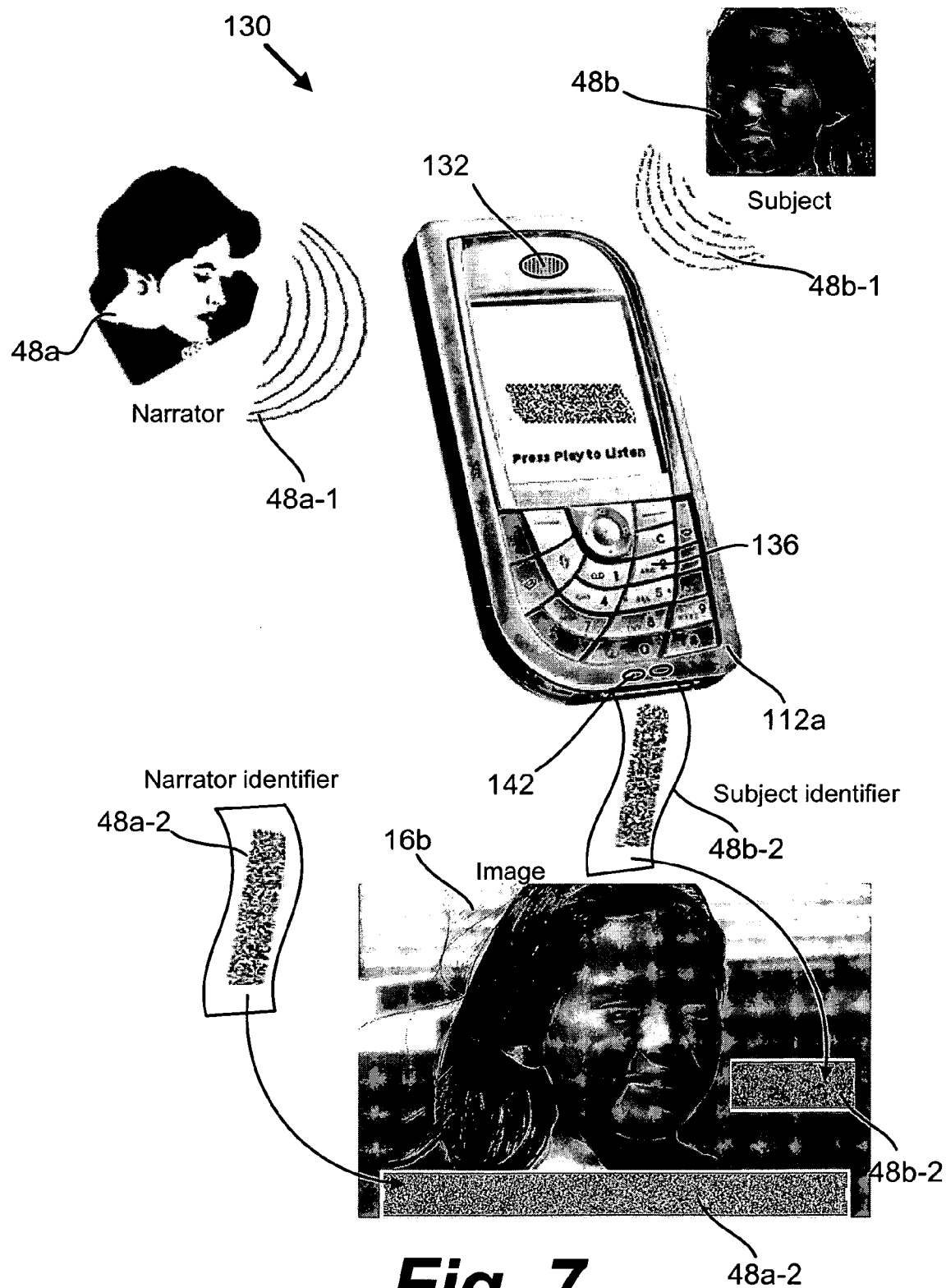
FIG. 7 is an isometric view that will be used to describe a method of recording and printing identifiers using a speaking narrator and a speaking subject, according to still another embodiment of the invention.

FIG. 7 is an isometric view that will be used to describe a method 170 of recording and printing identifiers using a speaking narrator 48a and a speaking subject 48b, according to still another embodiment of the invention. The narrator and subject, in this embodiment, provide different speech content to the identifier generator 112. The speaking subject 48b is part of the image 16b, while the narrator 48a is not a part of the image 16b. The narrator 48a speaks into the microphone 142 via sound waves 48a-1 and a narrator identifier 48a-2 is generated by the identifier generator 112. The narrator identifier 48a-2 may contain a narrator voice message having, for example, a commentary describing the significance of events associated with the image 16b. The subject 48b depicted within the image 16b also speaks into the speaker 142 via sound waves 48b-1 of the identifier generator 112a, and a subject identifier 48b-2 is generated by the identifier generator 112a. The subject identifier 48b-2 may contain, for example, a subject's voice message having content that describes the subject's response to events shown in the image 16b. The narrator identifier 48a-2 is associated or otherwise affixed to the image 16b, and the subject identifier 48b-2 is also affixed to the image 16b, but at a selected portion of the image 16b. For example, the subject identifier 48b-2 may be positioned on the image 16b at or near a mouth location of the subject shown within the image 16b. Although the narrator identifier 48a-2 is shown positioned along an edge of the image 16b, and the subject identifier 48b-2 is shown positioned on an interior portion of the image 16b, it is understood that the narrator identifier 48a-2 and the subject identifier 48b-2 may be located at other positions proximate to the image 16b.

Figure 8:
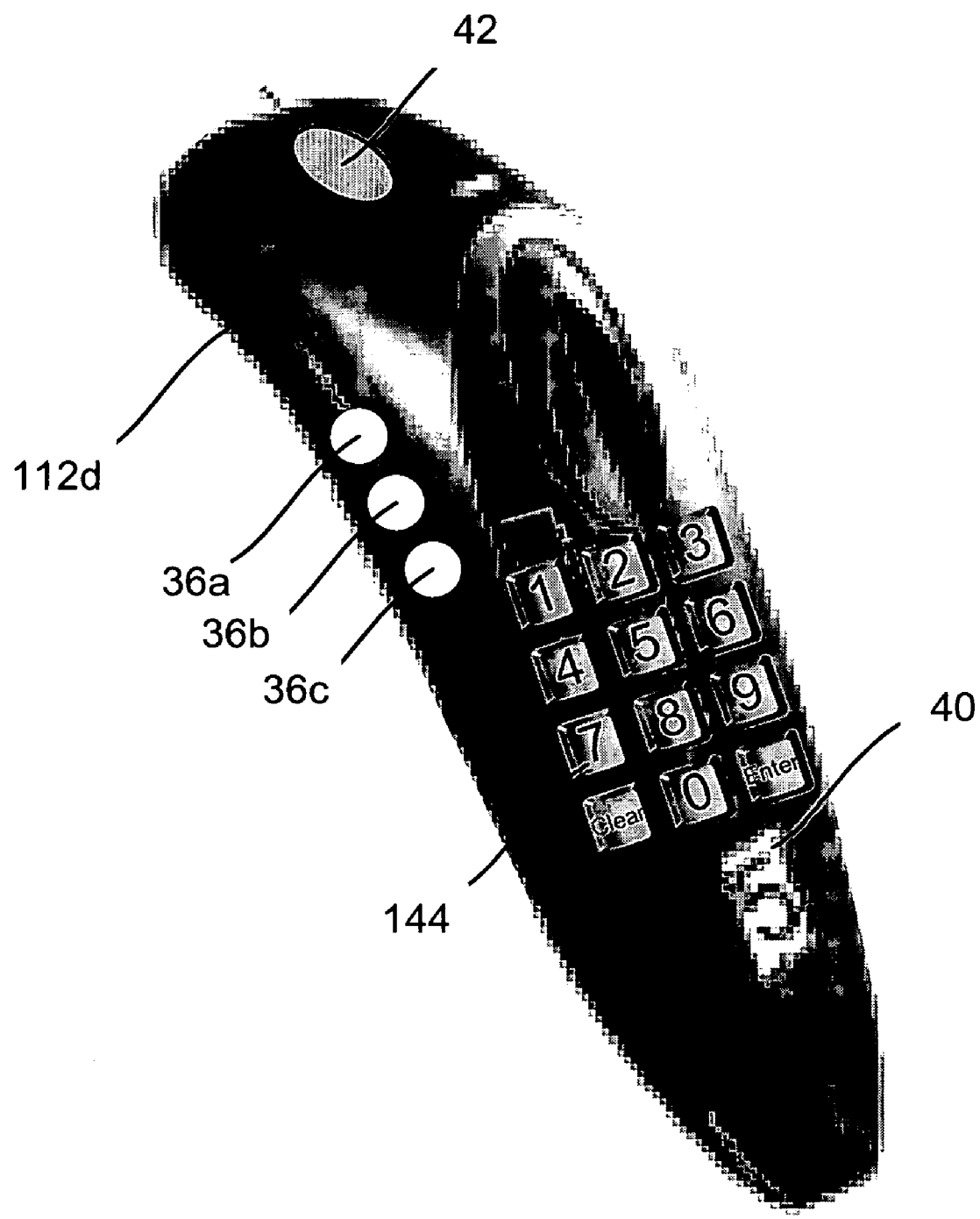
FIG. 8 is an isometric view of a reader according to still another embodiment of the invention.

FIG. 8 is an isometric view of a reader 112d, according to still another embodiment of the invention. The reader 112d includes function buttons 36a-c as previously described, and also includes a keypad 144. The key pad 144 permits a password code that may include a Personal Identification Number (PIN) or other sequence to be entered into the identifier generated by the reader 112d. Accordingly, when a password is associated with the identifier, a user is required to enter the password before the identifier is read by the reader 112d. The PIN may be stored in the identifier itself so that an authorized user can decode the identifier with a reader, or the PIN may be established to activate a reader to decode identifiers that have not been encrypted with a PIN based password.

Figure 9A:
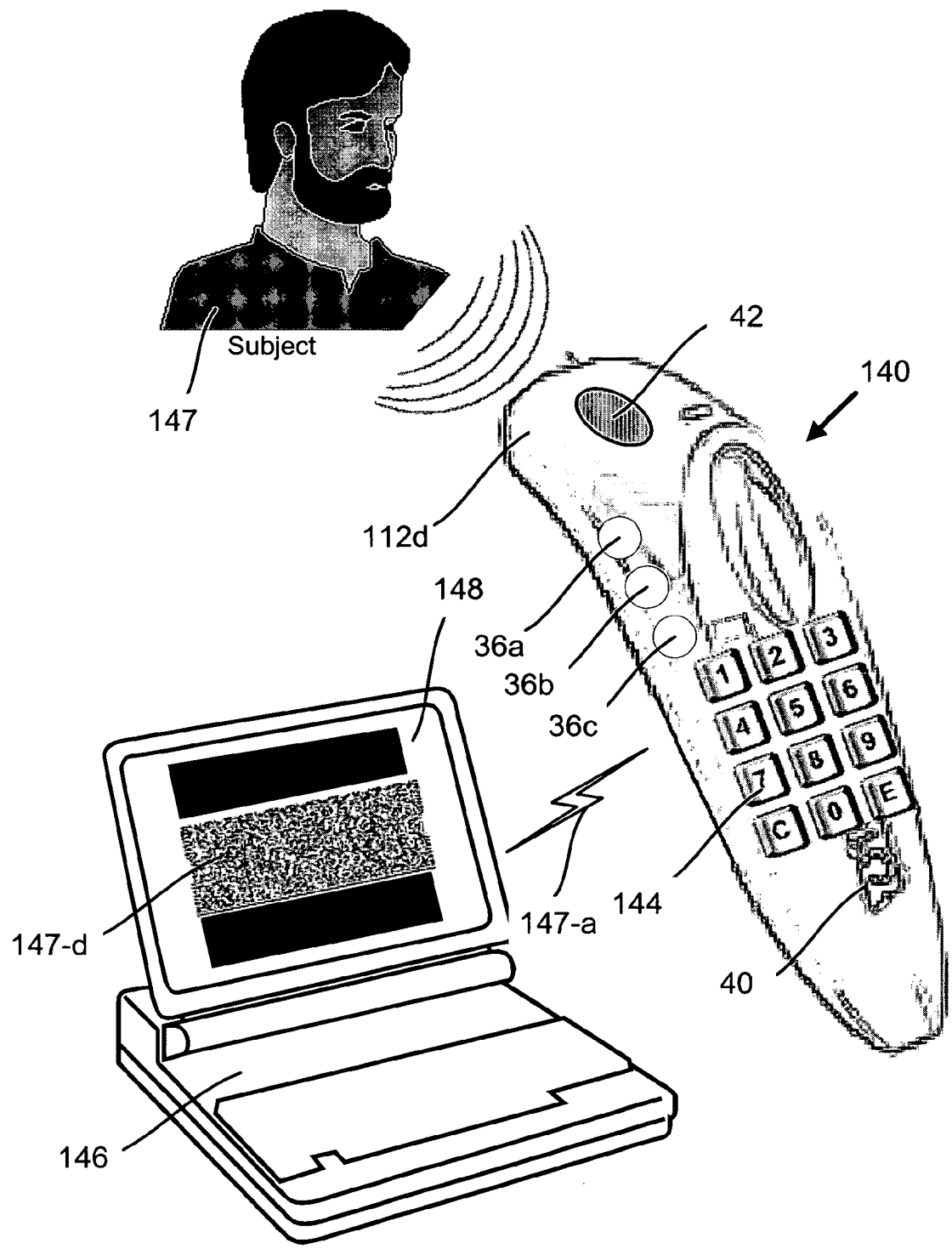
FIG. 9A is a depiction of an identifier manufacturing system using the reader of FIG. 8, according to yet another embodiment of the invention.

FIG. 9A is a depiction of an identifier manufacturing system 140 using the reader 112d of FIG. 8, according to yet another embodiment of the invention. The system 140 includes a general-purpose computer 146 or other similarly equipped microprocessor devices that also may include a display 148. Audio content from a speaking subject 147 is received by the microphone 42 of the reader 112d and are processed by the reader 112d and transferred to the general-purpose computer 146 by wireless signals 147a. The general-purpose computer 146 receives the wireless signals 147a and processes the signals using algorithms executable by the general-purpose computer 146. Accordingly, an image of an identifier 147d is presented on the display 148. Password encryption may be encoded within the signal 147a using the keypad 144 on the reader 112d. Alternatively, password encryption may also be provided using a keyboard or other entry means associated with the general-purpose computer 146.

Figure 9B:
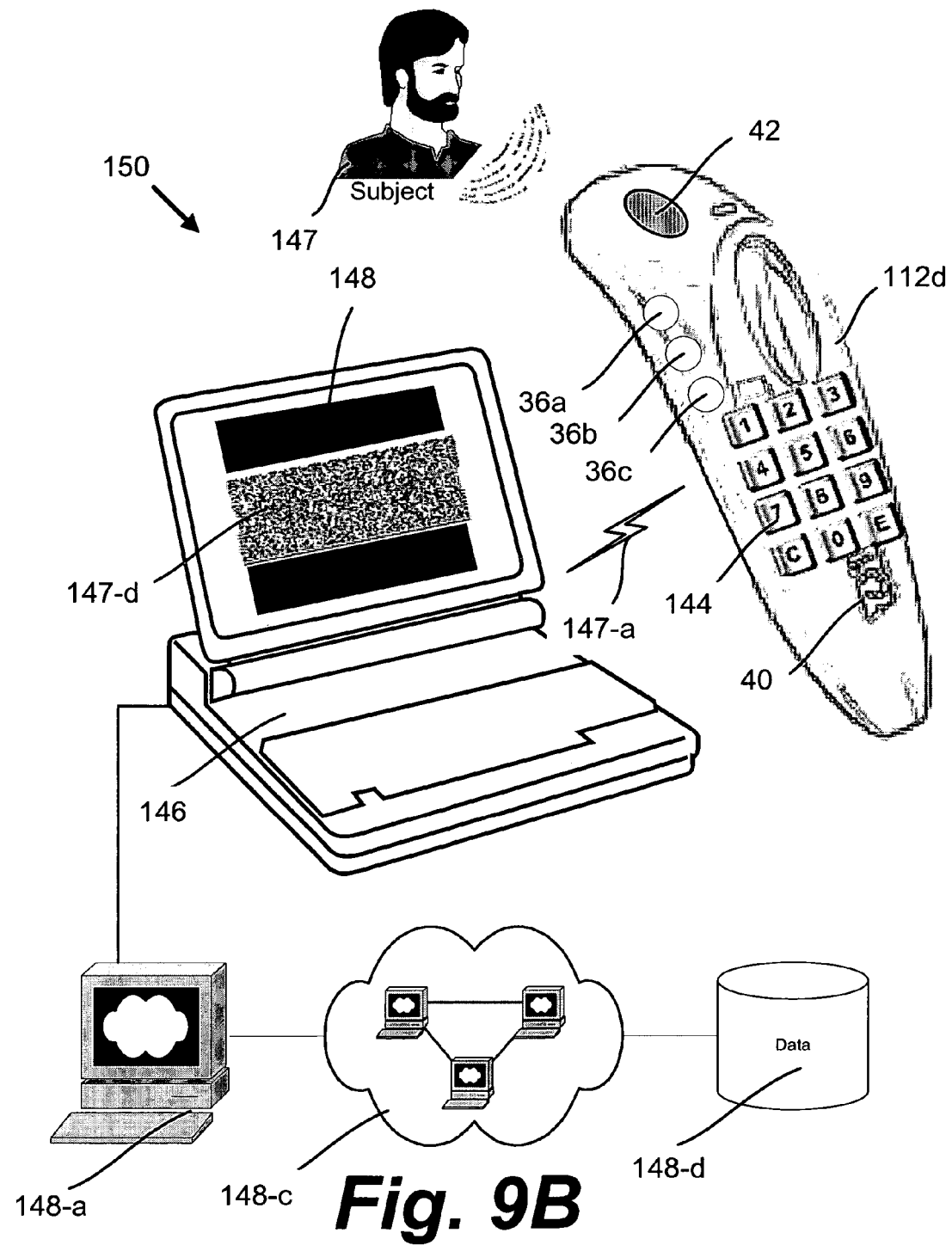
FIG. 9B is a depiction of the identifier manufacturing system of FIG. 9A that shows still other details of the embodiment.

Referring now to FIG. 9B and with continued reference to FIG. 9A, still other details of the embodiment shown in FIG. 9A will be described. The identifier 147d displayed on the display 148 may be routed to a server 148a that is coupled to a communications system 148c, such as the Internet, to a mass storage device 148d that includes a database. The reader 112d may also receive software updates through the communications system 148c.

Figure 10A:
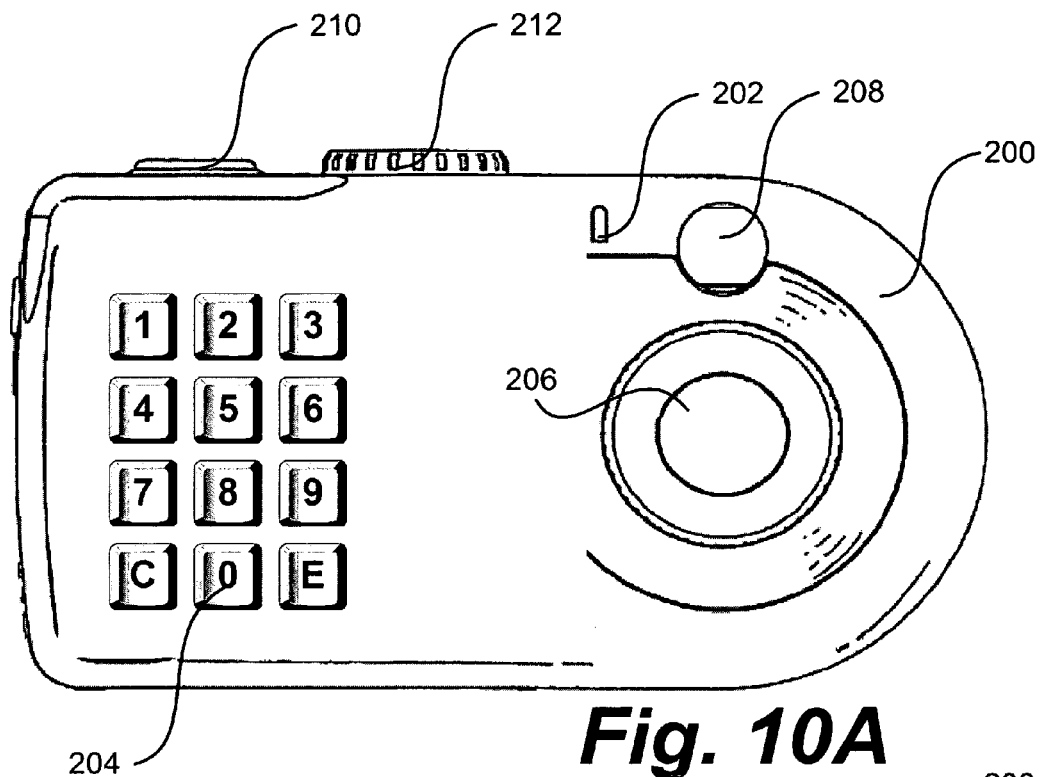
FIG. 10A and FIG. 10B are front and rear plan views, respectively, of a digital camera apparatus according to another embodiment of the invention.
Figure 10B:
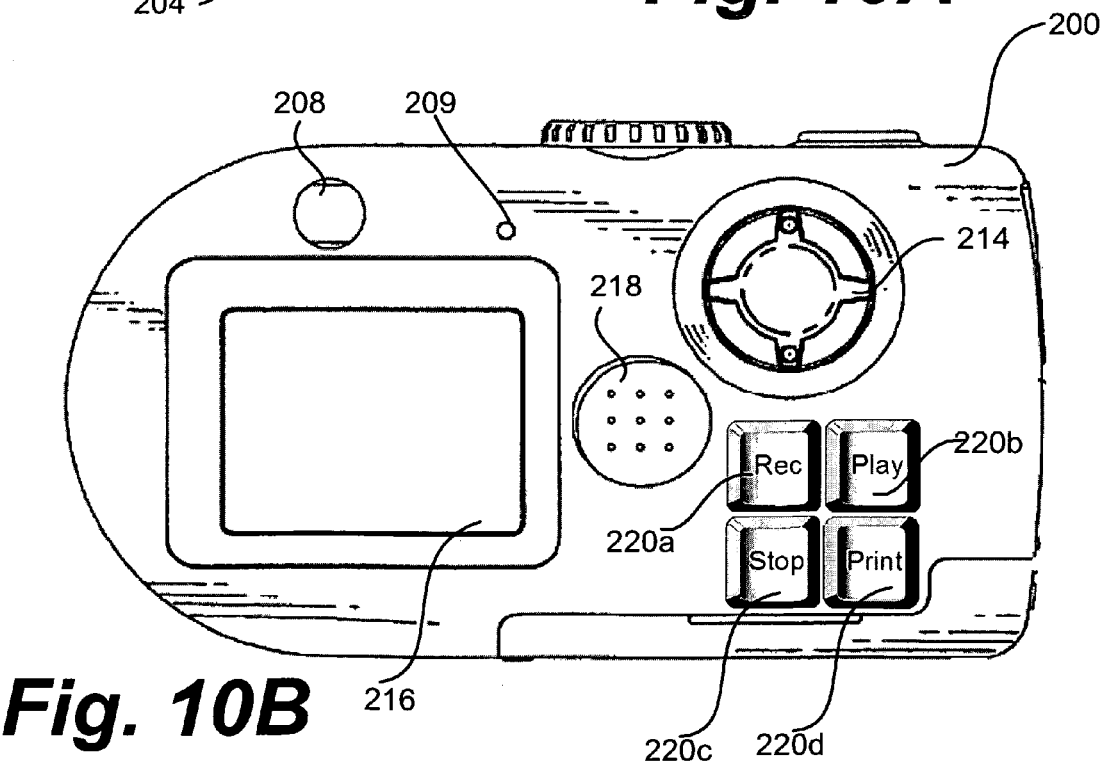

FIG. 10A and FIG. 10B and front and rear plan views, respectively, of a digital camera apparatus 200 according to another embodiment of the invention. The digital camera apparatus 200 includes various devices that are commonly associated with digital recording devices that cooperatively permit still or moving images to be captured and internally stored. Optionally, apparatus 200 may be equipped to encode a password or digital signature into identifier 20. The digital camera apparatus 200 includes a viewfinder 208, a lens 206, an exposure shutter release 210, a shutter control dial 212, as well as other known devices commonly associated with digital recording devices. The apparatus 200 also includes a keypad 204 and a microphone 202. The keypad 204 may include numerals 0-9, or alphabetical letters, or other suitable alphanumeric characters. The keypad 204 may also include various function buttons, such as "C", which is operable to clear an entry made on the keypad 204 by a user, and/or "E", which is operable to enter an entry made on the keypad 204. Referring now in particular to FIG. 10B, the digital camera apparatus 200 further includes a digital display 216 that is configured to display images within a field of view of the lens 206, and to view images stored within the apparatus 200. The apparatus 200 also includes a scrolling wheel 214 that is operable to select different magnification ranges so that a selected portion of an image displayed on the display 216 may be selectively enlarged or reduced. An image switch lever 218 is also included that is configured to selectably move an image of an identifier to a foreground portion of an image displayed on the display 216. The lever 218 may be a rocker switch in which an identifier image is brought forward and presented on the display 216. Function buttons 220a-220d are also present on the apparatus 200 that are operable to initiate selected functions. For example, a button 220a may correspond to a record function, a button 220b may correspond to a play function while a button 220c may correspond to a stop function. A button 220d may further correspond to a print function button.

Figure 10C:
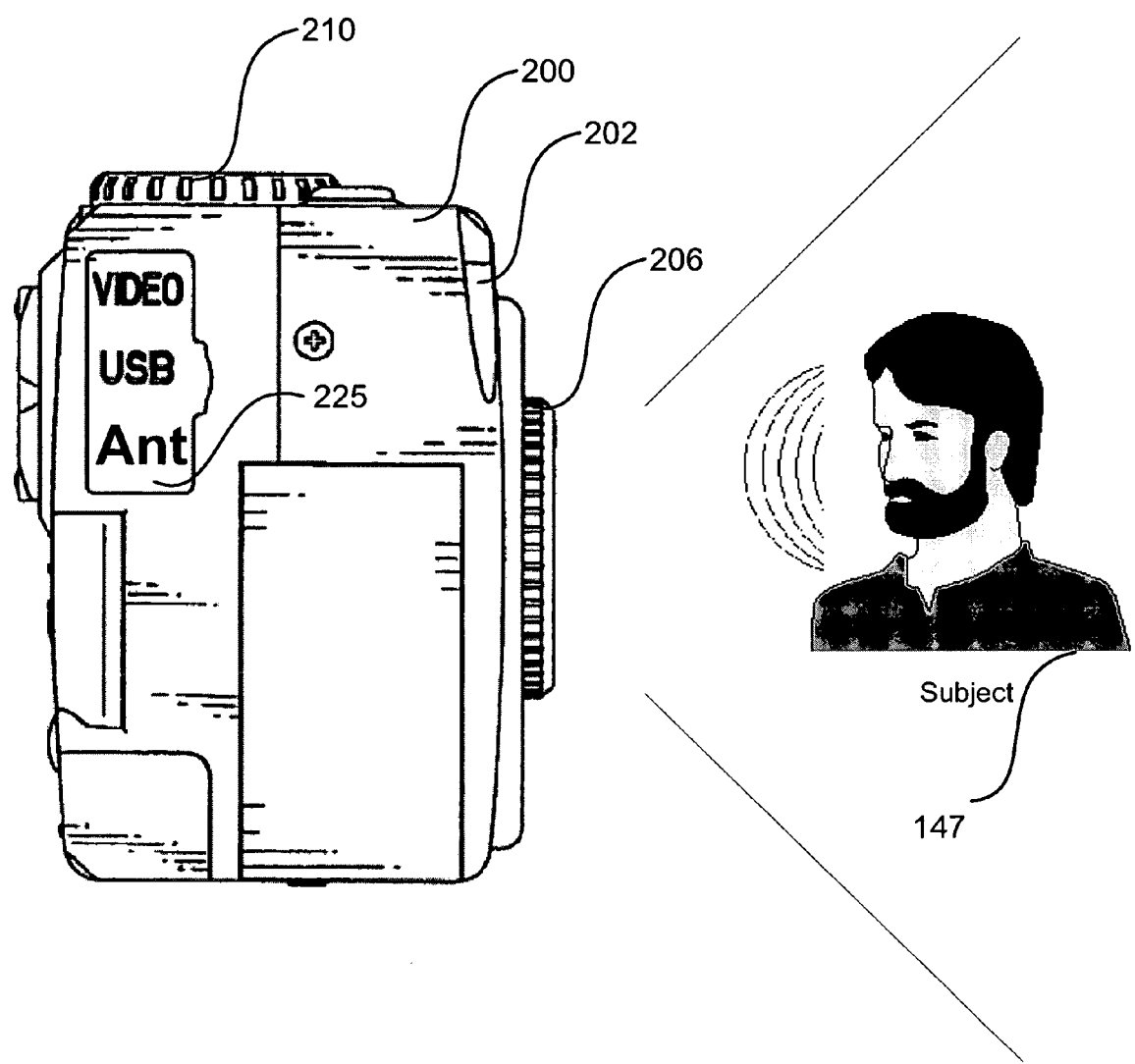
FIG. 10C is a side elevational view of the camera apparatus of FIG. 10A and FIG. 10B that are used to describe various operational details of the apparatus.

FIG. 10C is a side elevational view of the camera apparatus 200 of FIG. 10A and FIG. 10B that will be used to describe various optional operational details of the apparatus 200. The apparatus 200 records an image a subject 147 and also captures audible sounds, including speech from the subject 147. The camera apparatus 200 includes a communications panel 225 that provides various interface locations, which may include a video output interface (VIDEO) for an analog video signal output, a Universal Serial Bus (USB) interface that digital video signal output, and a wireless interface (ANT) that is operable to convey wireless analog and/or digital signals to a computer, a printer, or other microprocessor-based devices. For example, the VIDEO interface may be used to couple analog signals to other devices configured to accept analog signals, such as a television set or analog computer monitor. The USB interface may be used to couple digital signals to a computer, or other devices that are configured to accept digital signals in accordance with the USB data exchange protocol, while the ANT interface may be used to wirelessly couple the apparatus 200 to a variety of digital devices.

Still referring to FIG. 10C, audible sounds emanating from the speaking subject 147 are received by the microphone 202 and are converted into analog signals. The analog signals are converted to digital and stored in an audio digital file within the apparatus 200. Alternately, the audio digital file may be transferred to other devices that are communicatively coupled to the camera apparatus 200 by means of the interface locations in the communications panel 225.

Figure 10D:
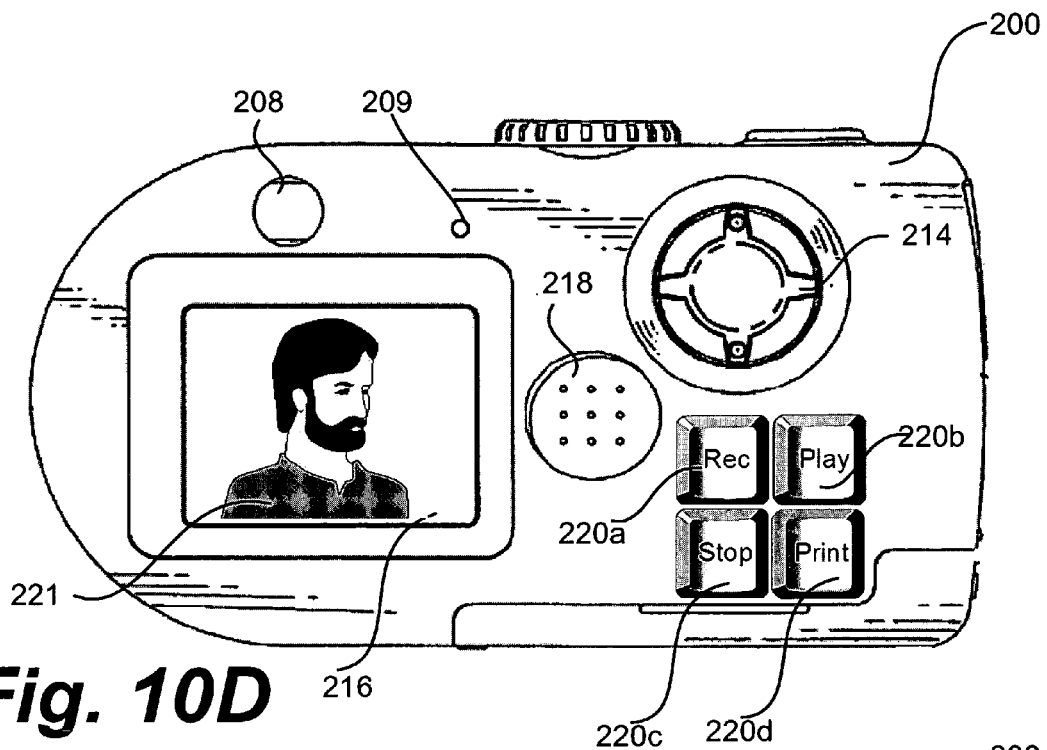
FIG. 10D is a depiction of the digital camera having a non-bar code image of the subject.
Figure 10E:
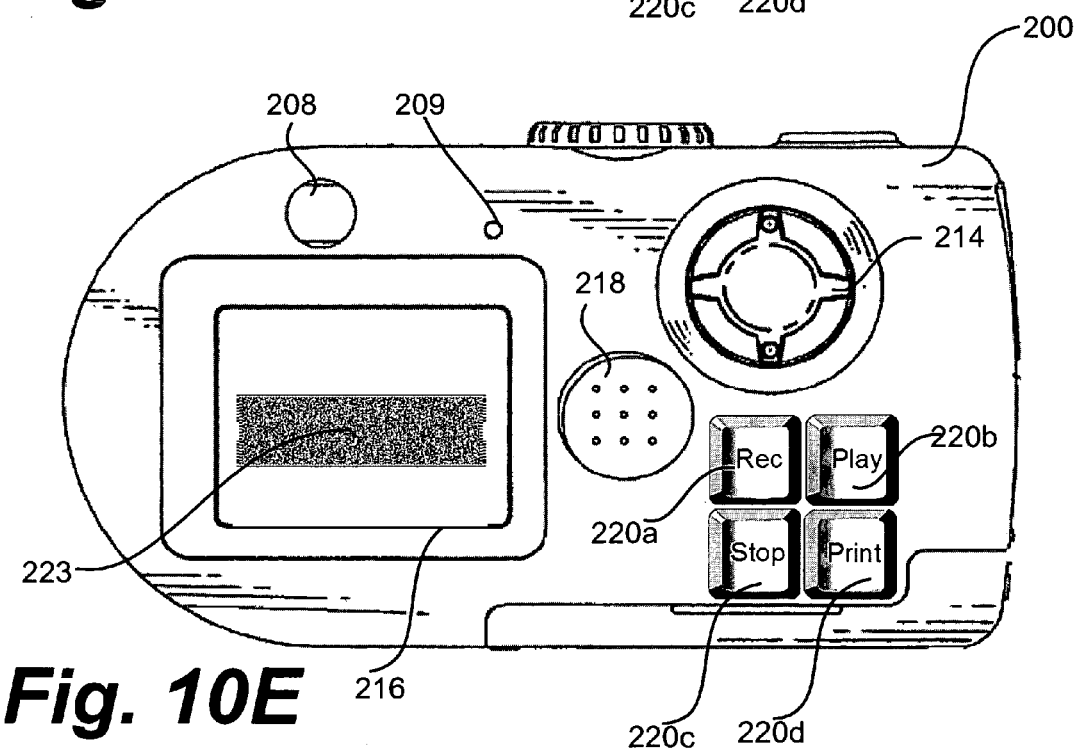
FIG. 10E is a depiction of the digital camera having an image of the 2D barcode from the speaking subject.

Referring now also to FIG. 10D and FIG. 10E, an image 221 of the subject 147 (FIG. 10C) is shown on the display 216. When the switch 218 is actuated, the image of the identifier 223 is presented on the display 216. The identifier 223 preferably includes a digital representation of the audible sounds and video content associated with the image 221 of the subject 147.

Figure 11:
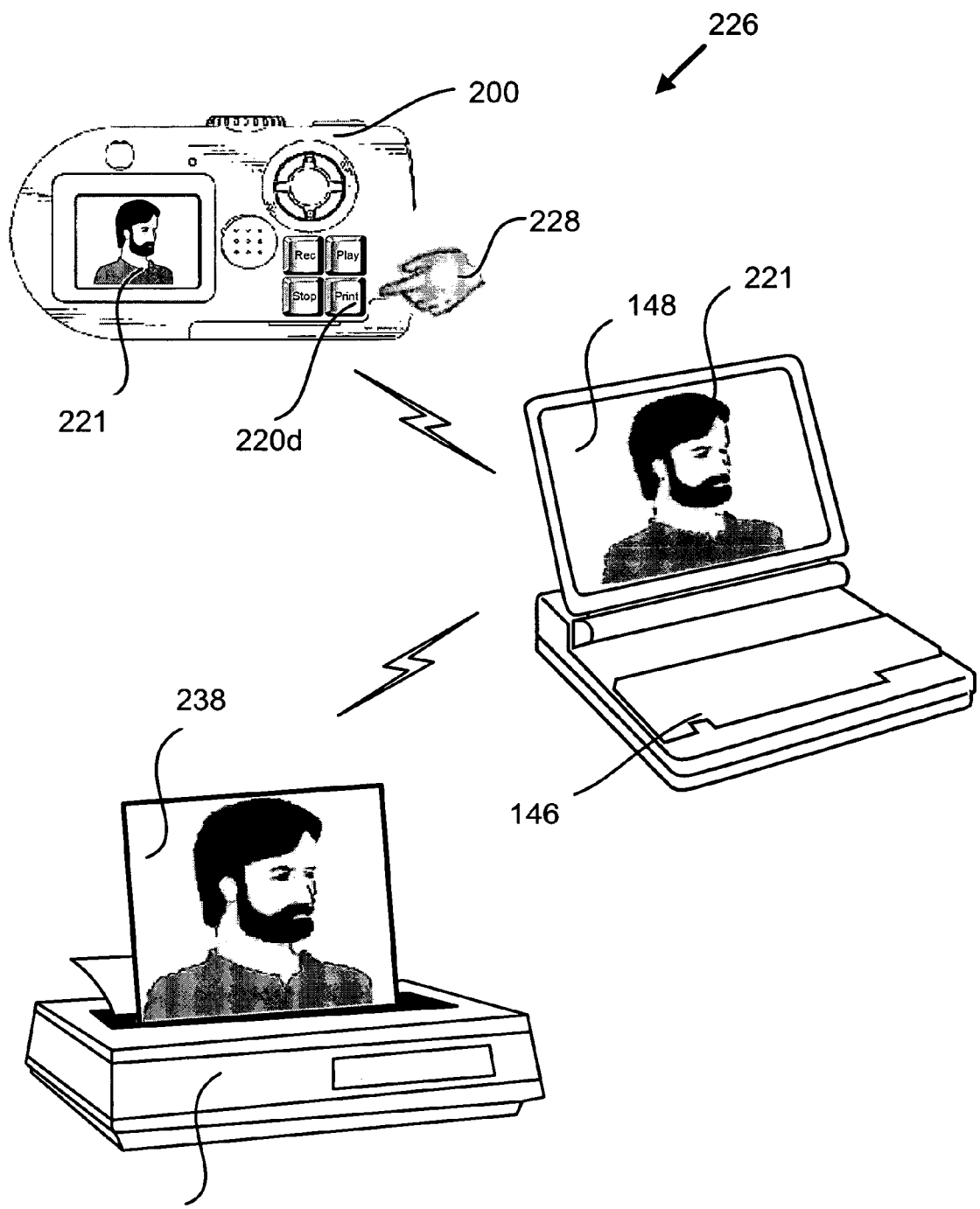
FIG. 11 is an isometric view of an image acquisition, presentation and transfer system according to another embodiment of the invention.

FIG. 11 is an isometric view of an image acquisition, presentation and transfer system 226 according to another embodiment of the invention. The system 226 includes the camera apparatus 200, as described in detail in connection with FIGS. 10A through 10E. The system 225 also includes a computer 146 and a printer 234 that are operatively coupled to the camera apparatus 200, by wireless, or other suitable means. In operation, a user 228 touches or otherwise activates a print key 220d and the apparatus 200 wirelessly transmits the image 221 to the computer display 148 of the computer 146. The computer 146 may, in turn, wirelessly relay the image 221 to a printer 234 so that the image 221 may be printed on a suitable print medium 238. Although FIG. 11 depicts the wireless exchange of signals between the apparatus 200, the computer 146 and the printer 234, it is understood that in other particular embodiments of the invention, one or more of the foregoing devices may be coupled using metallic, fiber optic or other conductors.

Figure 12:
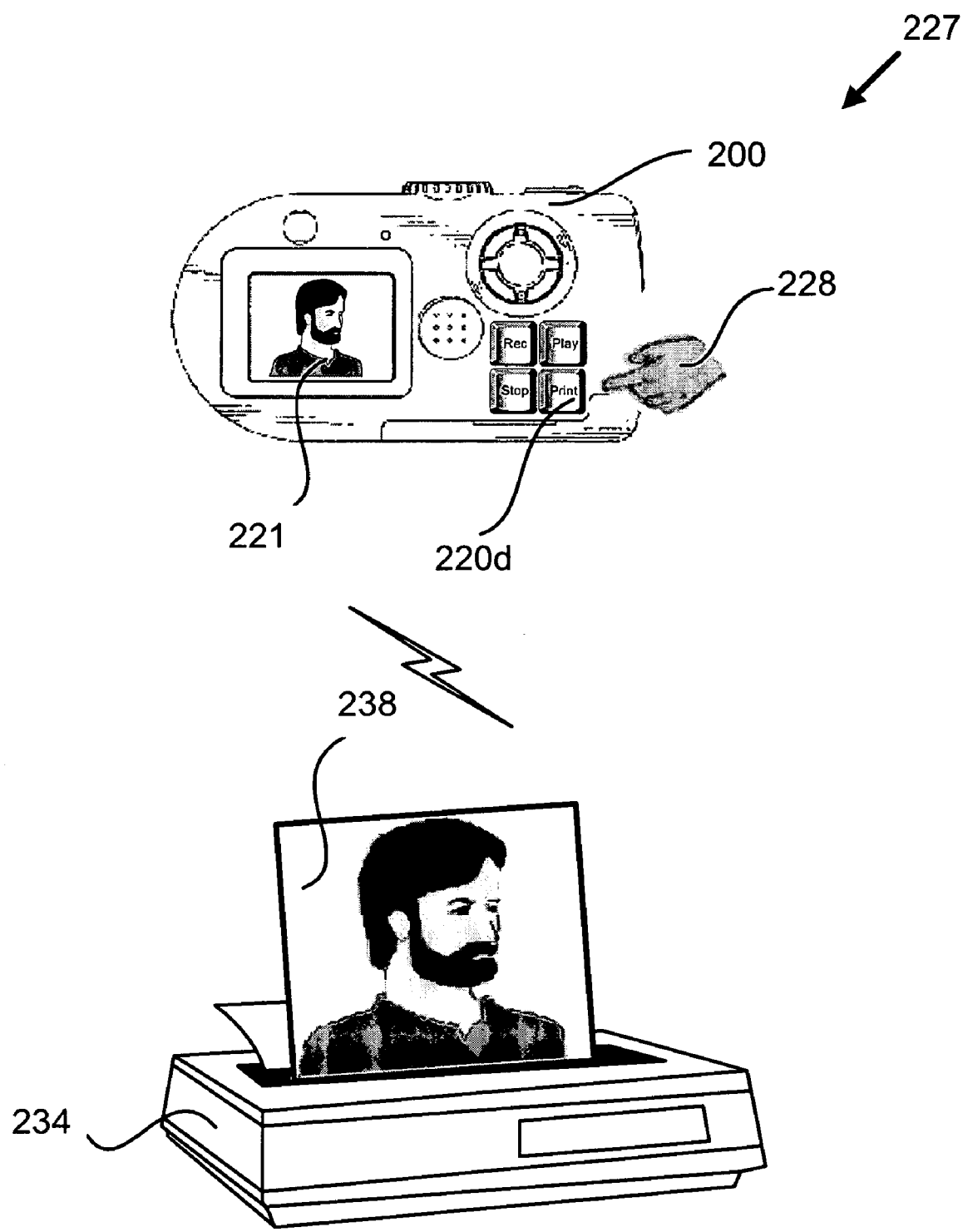
FIG. 12 is an isometric view of an image acquisition, presentation and transfer system according to another embodiment of the invention.

FIG. 12 is an isometric view of an image acquisition, presentation and transfer system 227 according to another embodiment of the invention. The camera apparatus 200 wirelessly communicates with the printer 234 so that the image 221 shown on the display 216 of the camera apparatus 200 is transferred to the printer 234. The transfer of the image 221 is affected when the user 228 actuates the print key 220d. When the printer 234 receives the image 221, the printer 234 reproduces the image 221 on a suitable print medium 238.

Figure 13A:
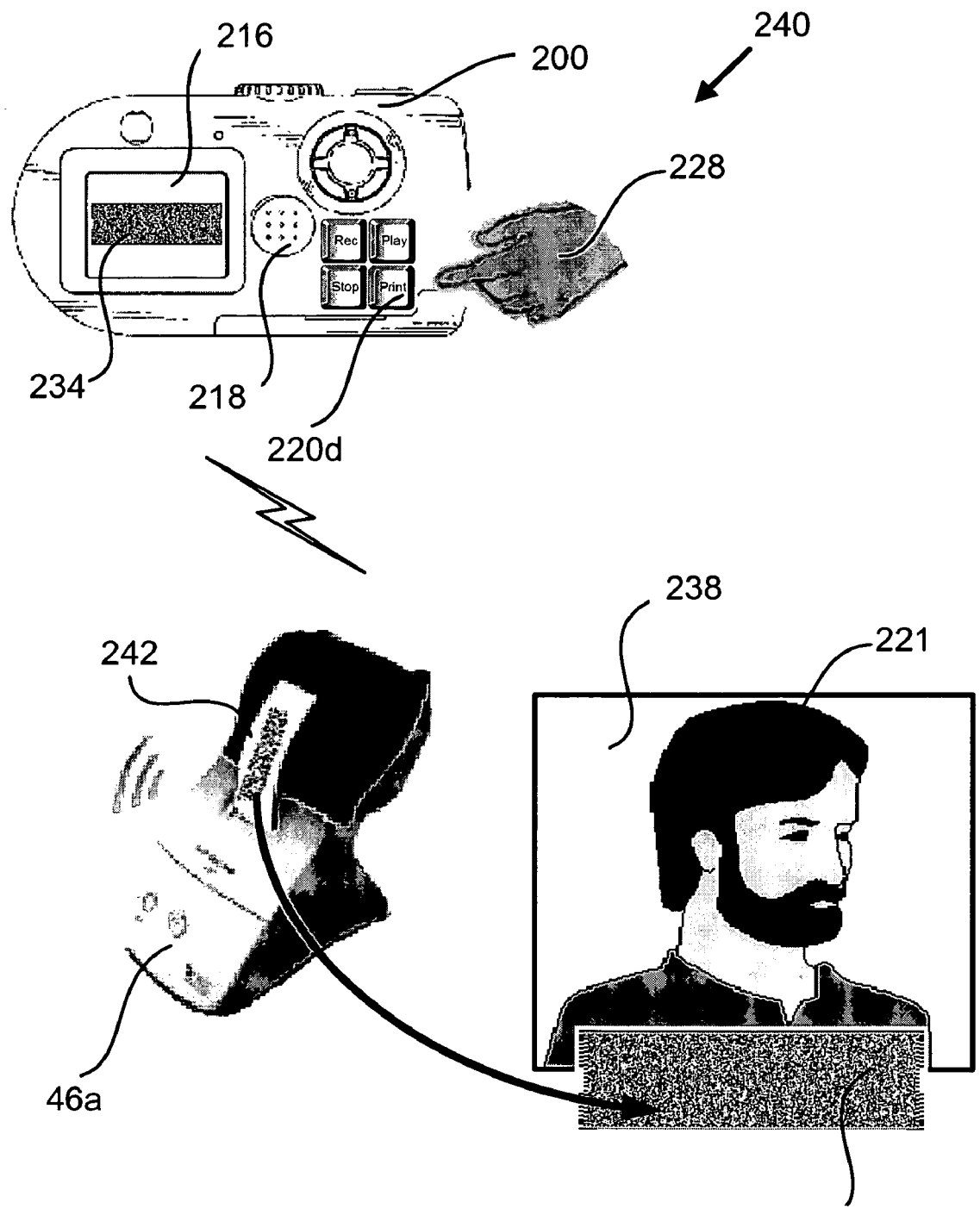
FIG. 13A is an isometric view of an image acquisition, presentation and transfer system 240 according to another embodiment of the invention.

FIG. 13A is an isometric view of an image acquisition, presentation and transfer system 240 according to another embodiment of the invention. The system 240 includes a camera apparatus 200 and a printer 46a configured to print an identifier 242. The display 216 of the camera apparatus 200 displays the identifier 234 that includes voice and audio encoded information. In operation, the print function button 220d is actuated by the user 228 so that the identifier 234 is wirelessly communicated to the printer 46a so that the identifier 242 is printed by the printer 46a on a suitable print medium. The identifier 242 is then ejected by the printer 46a, and removed from the printer 46a and associated or affixed to an image 238 of the subject 238 previously printed from the printer 234 of FIG. 12. In this operation, the identifier 242 that is generated as an original 2D barcode containing a voice message from the speaking subject 147 is not password coded with a PIN or any other similarly functioning password. For non-password coded operations, the camera apparatus need not be equipped with a keypad 204.

Figure 13B:
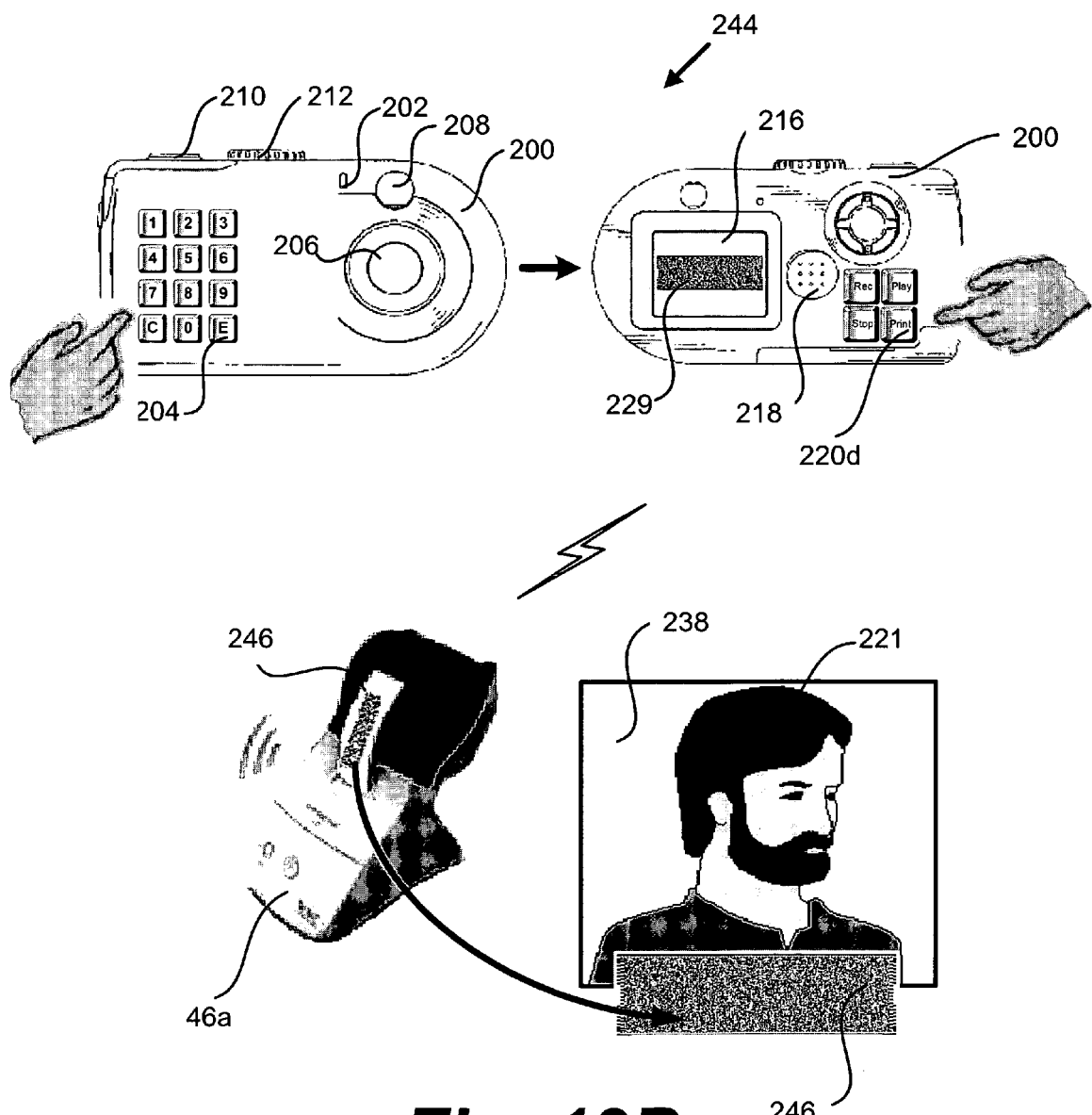
FIG. 13B is an isometric view of an image acquisition, presentation and transfer system according to another embodiment of the invention.

FIG. 13B is an isometric view of an image acquisition, presentation and transfer system 244 according to another embodiment of the invention. The camera apparatus 200 is operable to receive a password and to encrypt the password before the password is associated with the identifier. The encryption scheme may employ either the well-known private (or secret) key encryption, or it may rely upon public key encryption, thus affording greater security if encryption speed is not a concern. In a specific embodiment, a public key encryption method is combined with a private key method in a "digital envelope" to provide an enhanced level of security with greater speed. Accordingly, the user 228 may provide the password to the system 224 by entering the password on the keypad 204 of the camera apparatus 200. The password is then encrypted and transferred to the identifier 229 that is shown on the display 216 of the camera apparatus 200. A user 228 may then actuate the print function key 220d so that the apparatus 200 wirelessly transmits the identifier 229 to the printer 46a, whereupon an identifier 246 having an encrypted password is printed and ejected by the printer 46a. The identifier 246 having the encrypted password may then be affixed or otherwise associated with the image 221 that was previously printed on a suitable print medium 238.

The various embodiments of the foregoing identifier generation systems as shown in FIGS. 1-13B require the separate application of an independently generated identifier to be applied to the surface of an object or to the surface of an image or an object. Other embodiments advantageously avoid the separate application of a printed or stamped identifier to an object or object image. The microprocessor executable algorithms may be implemented either within the various readers and/or camera embodiments, or by a microprocessor attached to peripheral devices, such as the computer 146 or the printer 46. For example, sound files that are maintained in a separate database may be merged with image files from an image database, such that the combined sound and image file may be printed as an integral image having both the image 16 merged with the identifier 20. The microprocessor executable algorithms advantageously permit the placement of the identifier about the perimeter of the image 16 in a manner that minimizes the visual obstruction of details within the image 16. Other embodiments would include the computer 146 or printer 46 having a microphone, so that separate sound containing identifiers, are generated separately from the image 16 obtained by the readers 12, 12a-d, 112, or camera 200. Alternatively, an independently generated identifier may be digitally combined with the digital file of the image 16, positioned as desired, then printed as a composite identifier-picture image.

Figure 14:
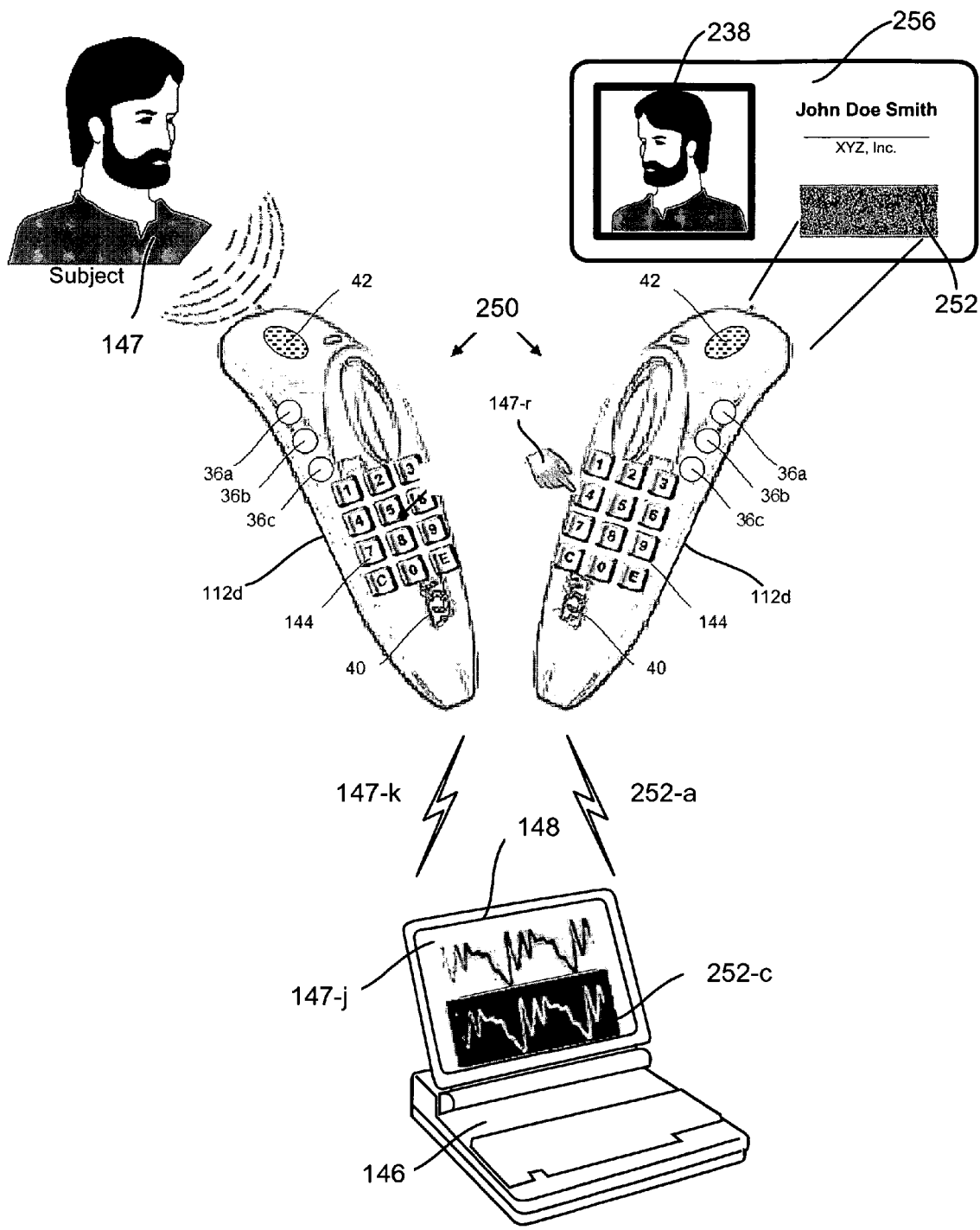
FIG. 14 is an isometric view of a speech analysis and voice identification system according to another embodiment of the invention.

FIG. 14 is an isometric view of a speech analysis and voice identification system 250, according to another embodiment of the invention. The system 250 includes at least one reader 112d, as previously described in connection with the embodiment shown in FIG. 8. Alternately, at least one camera apparatus 200, as described in detail in connection with FIG. 10A through FIG. 10E may also be used instead of one or both of the readers 112d. The system 250 also includes a computer 146, and an identification card 256 that includes an image 238 of the subject 147, and an identifier 252. The identifier 252 includes speech content that has been encoded on the identifier 252.

A preferred operation of the system 250 will now be described. In one operational mode, a subject 147 records a speech message on a selected one of the readers 112d. The subject 147 generally recites the same message that was previously encoded on the identifier 252, although other messages may be used. The reader 112d then transmits a wireless signal 147-k to the computer 146. For example, the subject 147 may recite the message "I am John Doe Smith, an employee of XYZ, Inc.", and the speech content is transferred to the computer 146 for further processing. The computer 146 includes speech recognition software, and an analytical image 147-j of the encoded message may be generated on the display 148.

In another operational mode, the identifier 252 on the identification card 256 is scanned by the reader 112d, and the audio content encoded on the identifier 252 is wirelessly communicated to the computer 146. The audio content may be processed by the computer 146 and compared to the record obtained from the subject 147 for the subject 147 in order to verify an identity of the subject 147. Simultaneously or asynchronously, the identification card 256 may be examined to verify that the image 238 corresponds to the subject 147.

Still referring to FIG. 14, the reader 112d may be operated by the subject 147, or alternatively, an approved user may enter a password on the keypad 144 of the reader 112d to unlock an encrypted audio content on the identifier 252. The unlocked audio content from the identifier 252 is then sent in a wireless signal 252a from the reader 112d to the computer 146. The pattern of the identifier-derived audio content is presented on the display 148 as an image 252c for comparison. If the speech processing analysis software indicates high probably match, an identity of the subject 147 is confirmed.

In other specific embodiments, the system 250 may include a database within the computer 146 having a plurality of stored audio records obtained from a plurality of different individuals. Moreover, the database may be remotely located from the computer 146 and accessed by the computer 146 through a communication system, such as a wide area network (WAN), a local area network (LAN) and the Internet.

Figure 15:
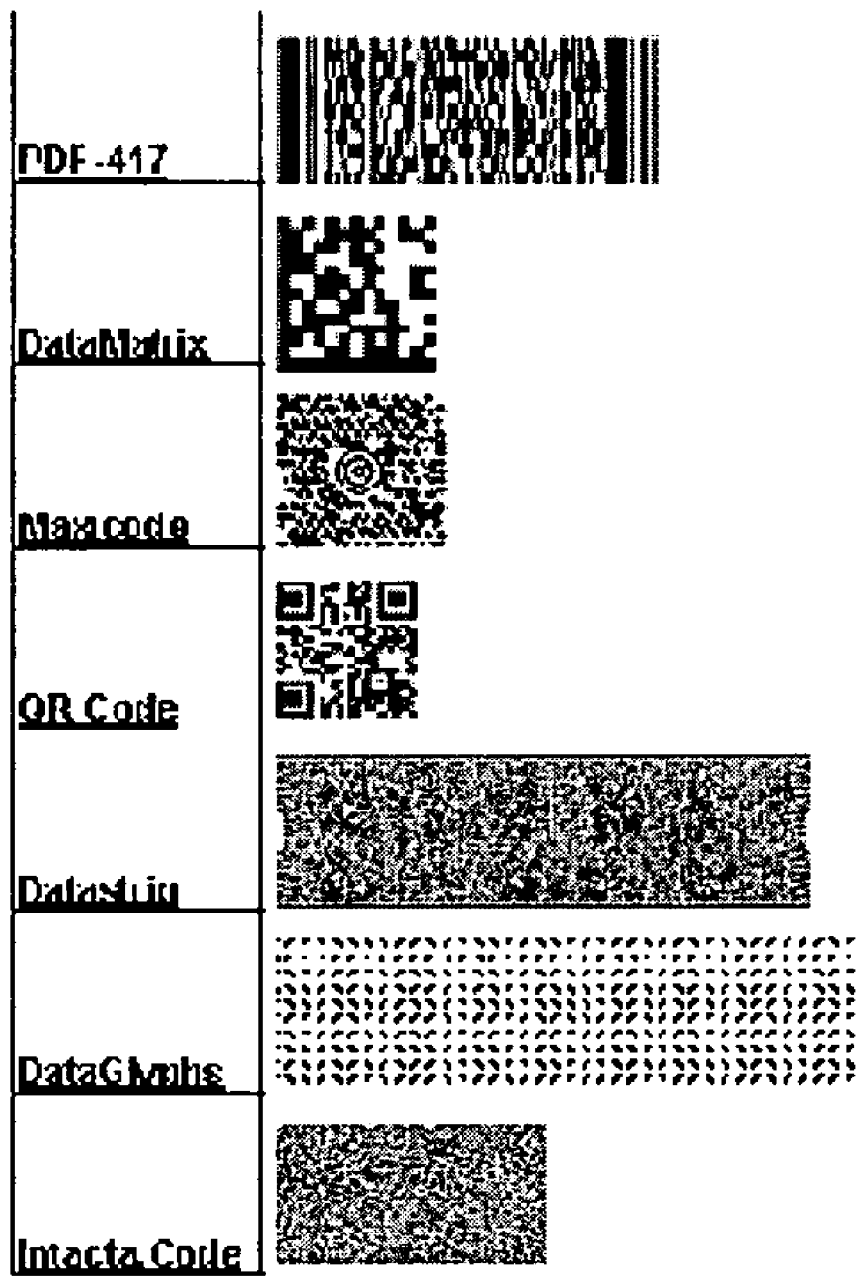
FIG. 15 is a plan view of respective patterns that may form a part of the identifier described in the foregoing embodiments.

FIG. 15 is a plan view of respective patterns that may form a part of the identifier described in the foregoing embodiments. The codes include a PDF-417 barcode pattern, a DataMatrix barcode pattern, a Maxicode barcode pattern, an QR Code barcode pattern, a DataStrip barcode pattern, a DataGlyphs barcode pattern, and an Intacta Code barcode pattern, although other suitable 2D patterns may also be used. The foregoing identifiers may be pigment-based identifiers that are applied to rigid and semi-rigid substrates. Alternately, the identifiers may include a pigment-base and/or be applied to a plastic film or to a paper product.

Figure 16:
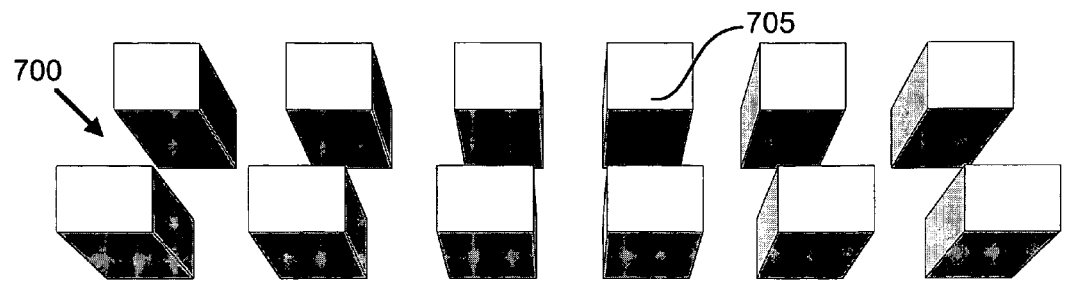
FIG. 16 is a plan view of a non-pigment-based identifier according to an embodiment of the invention.

FIG. 16 through FIG. 23 are respective plan views that show portions of non-pigment based identifiers that may be formed onto a surface of an object. The non-pigment-based identifiers may be formed by known stamping, embossing, etching engraving, photolithographic or other processes. FIG. 16 is a plan view of a non-pigment-based identifier 700 according to an embodiment of the invention. The identifier 700 includes an array of raised box-like structures 705 that may vary in relative spacing and size.

Figure 17:
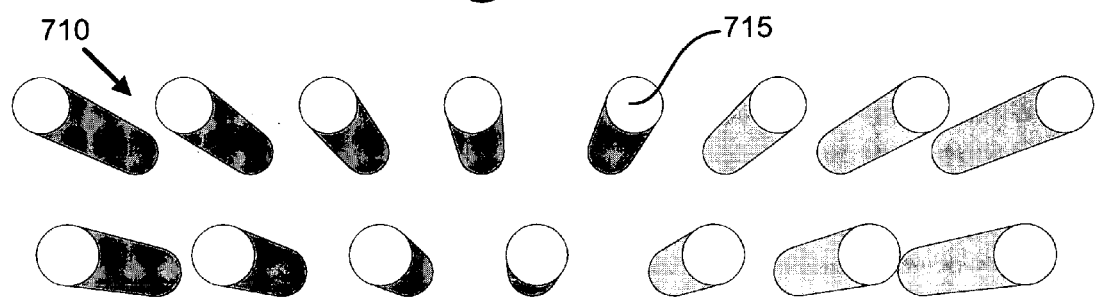
FIG. 17 is a plan view of a non-pigment-based identifier according to another embodiment of the invention.

FIG. 17 is a plan view of a non-pigment-based identifier 710 according to another embodiment of the invention. The identifier 710 includes an array of raised cylinders 715 that may have a different relative spacing, and/or different relative diameters.

Figure 18:
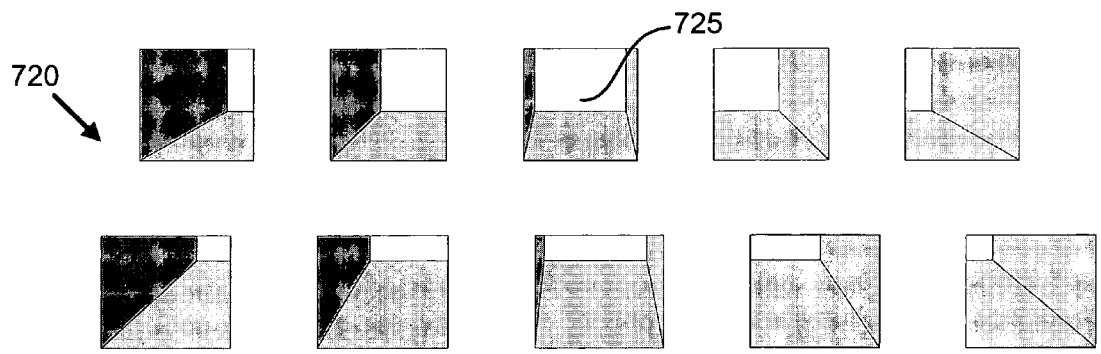
FIG. 18 is a plan view of a non-pigment-based identifier according to an embodiment of the invention.

FIG. 18 is a plan view of a non-pigment-based identifier 720 according to an embodiment of the invention. The identifier 720 includes an array of depressions 725 that extend inwardly into a surface. Although the identifier 720 shown in FIG. 18 is generally rectangular in appearance, it is understood that the depressions 725 may be applied to the surface in other arrangements. For example, hexagon, L-shaped, and circular arrangements may also be used.

Figure 19:
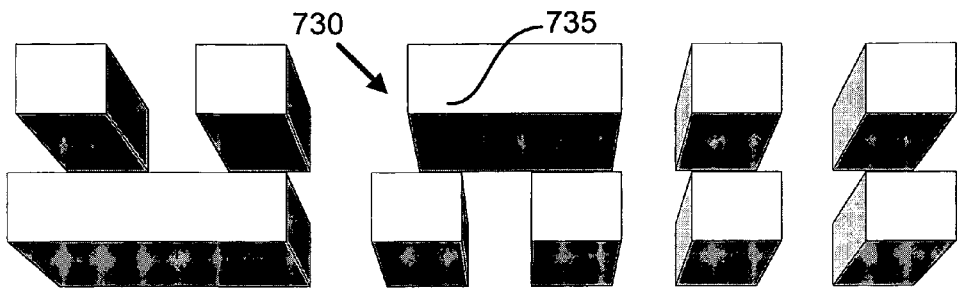
FIG. 19 includes respective plan views of a non-pigment-based identifiers according to another embodiment of the invention.
Figure 20:
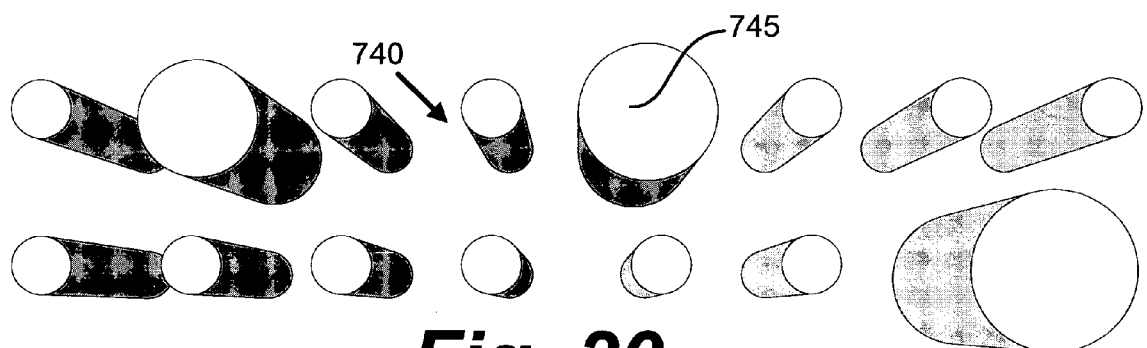
FIG. 20 includes respective plan views of a non-pigment-based identifiers according to another embodiment of the invention.

FIG. 19 and FIG. 20 are respective plan views of a non-pigment-based identifiers 730 and 740, according to another embodiment of the invention. The identifier 730 includes generally rectangular-shaped elements 735 that are arranged in a relatively rectangular pattern of the elements 735, although other patterns may be used. The identifier 740 of FIG. 20 includes generally cylindrically shaped elements 745 that may be arranged in a selected rectangular arrangement, or in other suitable arrangements.

Figure 21:
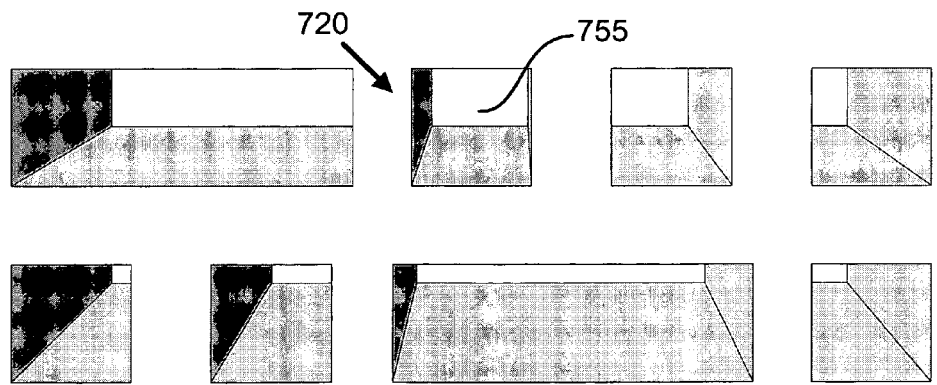
FIG. 21 is a plan view of a non-pigment-based identifier according to an embodiment of the invention.

FIG. 21 is a plan view of a non-pigment-based identifier 750 according to an embodiment of the invention. The identifier 750 includes generally rectangular-shaped depressions 755 that extend into a surface of an object. The elements 755 may be arranged in a selected rectangular arrangement, or in other suitable arrangements.

The foregoing embodiments may utilize the identifier patterns shown in FIG. 15 through FIG. 21 may incorporate Exchangeable Image File format (EXIF) coded information with the encoded sound or voice message by keypad or voice activated commands. The EXIF information is subsequently decoded and separately spoken along with the sound or voice container identifier The EXIF related information may be spoken before or after the subject-derived or narrator derived speech, or printed separately from the subject or narrator messages. For example, in a photographic device, selected exposure-related information such as f-stop (aperture setting) and exposure times may be EXIF incorporated into the identifier, and may also be printed alongside the identifiers in alphanumeric symbols. The EXIF or other alphanumeric encoded information may be further encoded with a synthesized voice in a non-subject voice field of the identifier to distinguish non-subject sourced speech from subject-derived speech located in the speaking subject voice field of the identifier. The synthesized voices may have robotic, male, female, or other voice characteristics. The identifier patterns may also be further encoded with the date and a number of times the identifier was created, revised and/or reproduced, along with version number and/or a serial number of the created or reproduced identifier in the non-voice pattern fields of the identifier. Particular EXIF embodiments of the foregoing reader and identifier generating systems permit the generation of original identifiers under optimal photographic conditions and to generate replicates of original sound-containing identifiers under the same optimal photographic conditions, thereby assuring consistent and controlled duplication of original identifiers.

Figure 22:
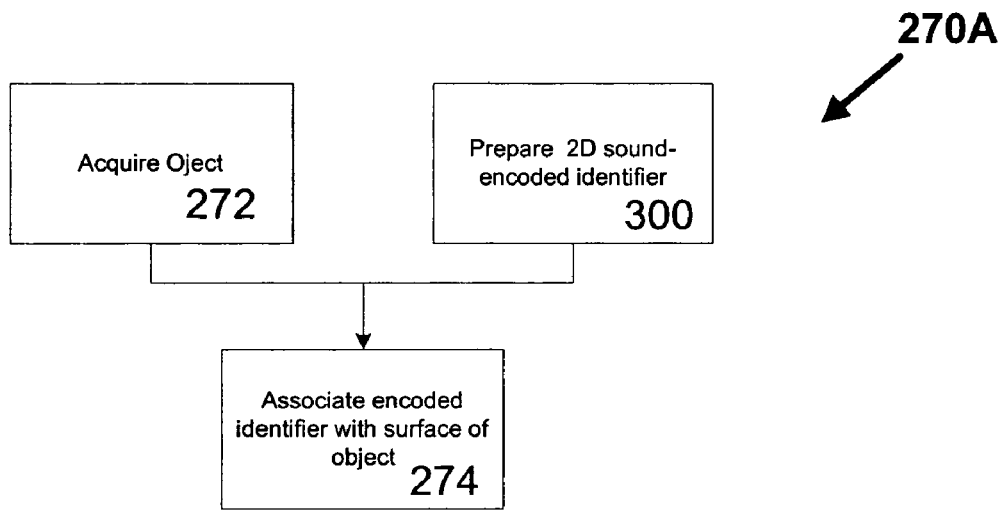
FIG. 22 is a flowchart that describes a method for associating an identifier with a surface of an object, according to an embodiment of the invention.

FIG. 22 is a flowchart that describes a method 270a for associating an identifier with a surface of an object, according to an embodiment of the invention. At block 272, a user acquires an object that is to be identified. The object may be a book, a menu, a medical record, a warning sign, a museum display board, a greeting card, or a newspaper to which an identifier is to be associated. At block 300, the user prepares the audio content and encodes the audio content onto the identifier. The encoded identifier may include voice or other environmentally recorded sounds that are pertinent to the objects. At block 274, the encoded identifier is associated with the surface of the object, by affixing the encoded identifier to a surface of the object.

Figure 23:
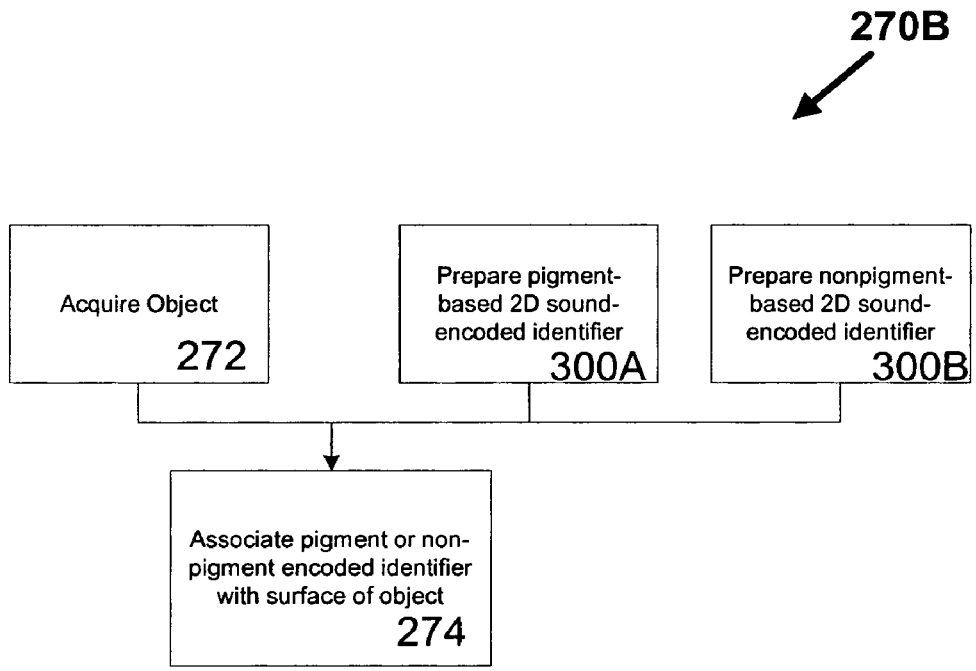
FIG. 23 includes respective plan views that show portions of non-pigment based identifiers that may be formed onto a surface of an object.

FIG. 23 is a flowchart that describes a method 270b for associating an identifier with a surface of an object, according to another embodiment of the invention. At block 272, a user acquires an object that is to be identified. At block 300a, a pigment-based identifier is prepared by encoding a desired audio content onto the identifier. Alternately, at block 300B, a non-pigment based identifier may be prepared by similarly associating a desired audio content onto the identifier. In a non-pigment based identifier, stamping, etching or subjecting the surface of the object alters the surface of the object. At block 274, either the pigment based or non-pigment based identifier are associated or otherwise preferably affixed to the surface of the object. The identifiers may also include magnetic stripes and RFID tags.

Figure 24:
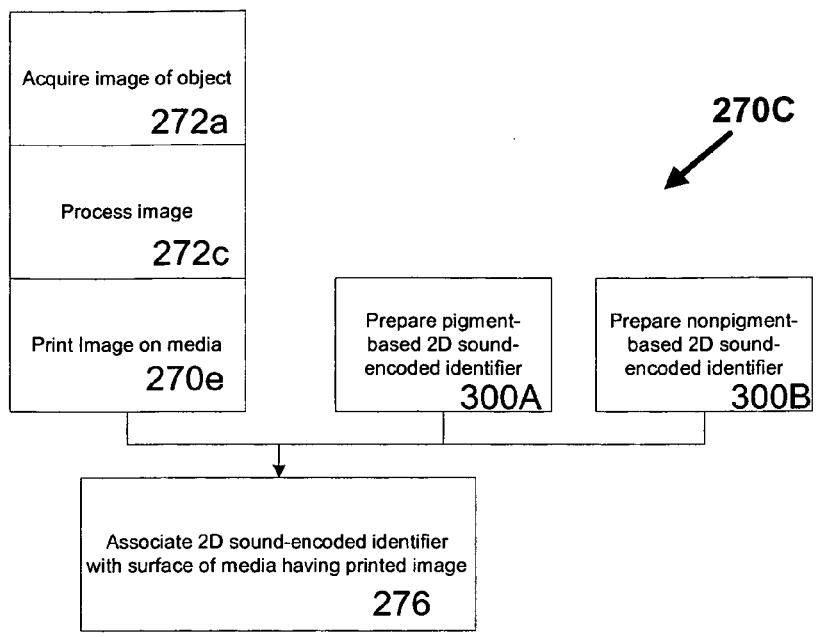
FIG. 24 is a flowchart that describes a method for associating an identifier with a surface of an object, according to another embodiment of the invention.

FIG. 24 is a flowchart that describes a method 270c for associating an identifier with a surface of an object, according to another embodiment of the invention. At block 272a, an image of the object is acquired. At block 272c, the image is processed. The suitably processed image may then be applied to a suitable media, as shown in block 270e. Suitable media includes a paper-based product such as copy paper, newsprint, cardboard, plastic, wood, or metal-based surfaces. At block 300a, a pigment-containing identifier is prepared by associating the desired audio content with the identifier. At block 300b, a non-pigment containing identifier may be prepared. Non-pigment containing identifiers are stamped or otherwise embossed on the surface. At block 276, at least one of the pigmented and the non-pigmented identifiers is then associated with a surface portion of the object.

Figure 25:
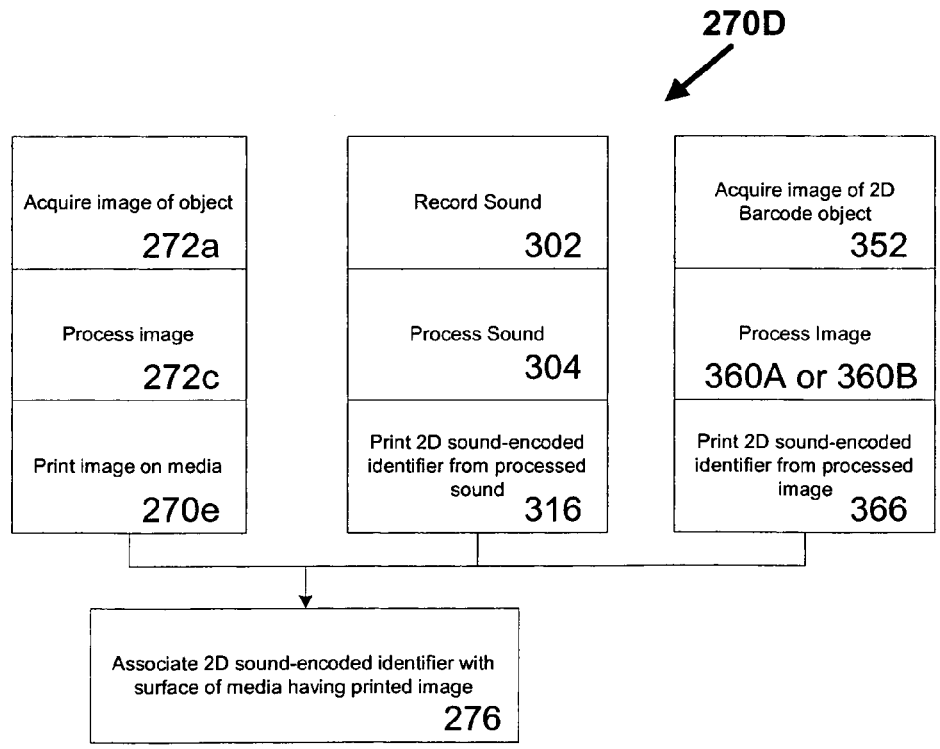
FIG. 25 is a flowchart that will be used to describe a method for associating an identifier with a surface of an object, according to another embodiment of the invention.

FIG. 25 is a flowchart that will be used to describe a method 270D for associating an identifier with a surface of an object, according to another embodiment of the invention. The method 270D includes expanding the method block 300a in the form of either preparing identifiers or making visual reproductions of original identifier-containing sound codes. Visual reproductions of identifiers also apply to reproductions of non-pigmented identifiers. The method 270-d includes expanding the block 300a of FIG. 25 into three sub-algorithms including recording sound at block 302, processing sound at block 304, and printing identifiers from at block 316. The sub-algorithms to reproduce either pigment-based identifiers or non-pigment based identifiers are shown in blocks 352, 360A or 360B, and 366. At block 352 an image of an identifier object is acquired. The image of the identifier is processed at block 360A or block 360B. Block 360A includes image processing and reproducing the same pixel shape as presented by the original identifier. Block 360B includes image processing and reproducing a pixel shape that differs from the original identifier. The processed image of the identifier may be printed from the processed image.

As previously described, the printed identifier may also be a stamped or non-pigmented copy of an identifier. The printed image of the media at block 270-e may be combined with one of the printed identifier from the process sound at block 316 and the copy of the original identifier object at block 366. The combination of printed image on the media and either the original identifier or the duplicate of the identifier is associated at block 276 with the surface of the media. Association includes affixing or otherwise attaching the corresponding identifiers to the surface of the media.

Figure 26A:
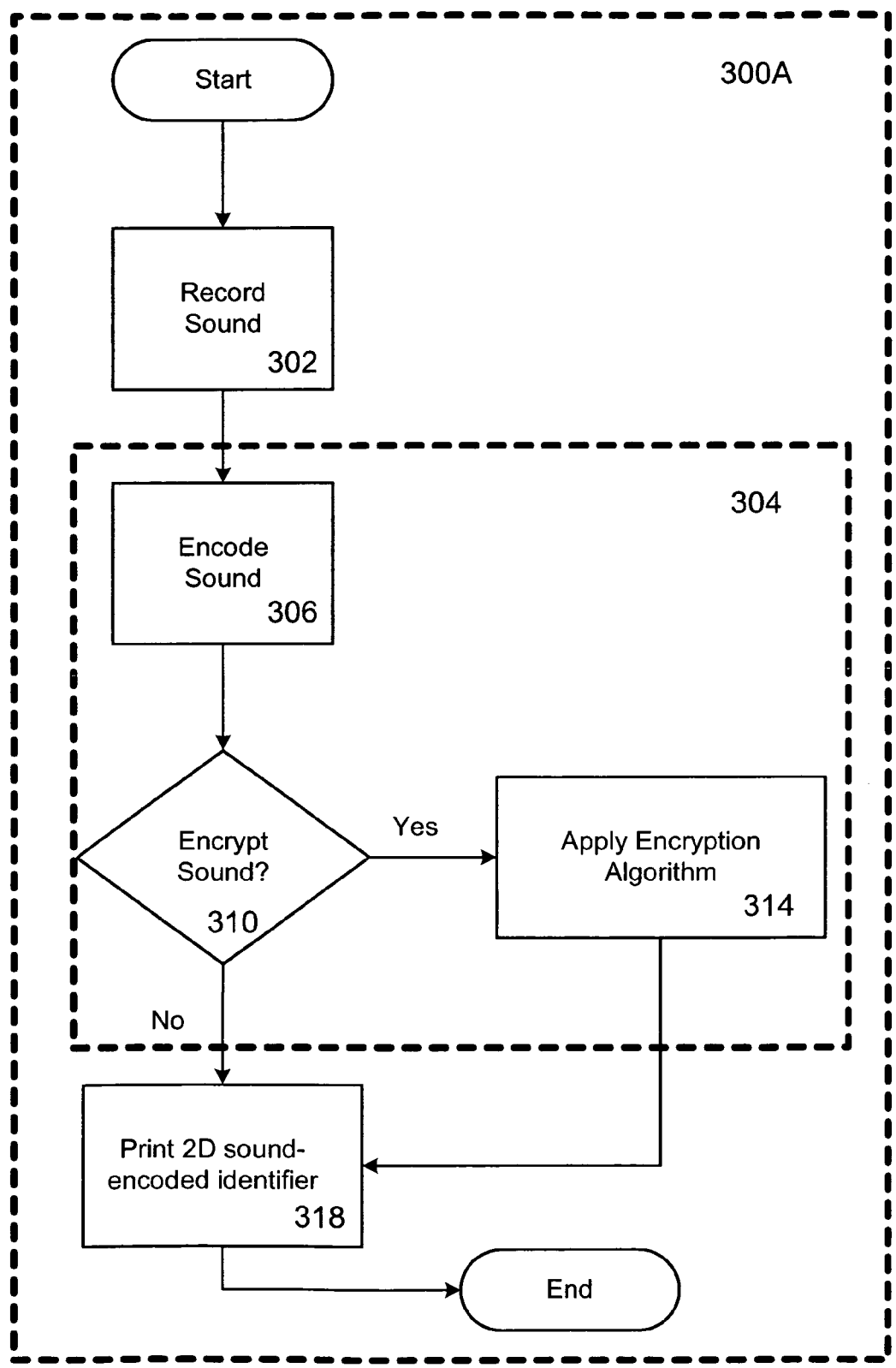
FIG. 26A is a flowchart that is a further expansion of the process sound block 304 of FIG. 25.

FIG. 26A is a flowchart that is a further expansion of the process sound block 304 of FIG. 25 to generate an identifier. At block 302, the sound is recorded, and the algorithm within block 304 includes encoding the sound at block 306 and then making a decision whether or not to encrypt the sound at decision diamond 310. If the decision is "no" then the identifier is printed at block 318. If the answer is "yes" to encrypt sound, then an encryption algorithm is applied at block 314. The encrypted identifier is printed at block 318.

Figure 26B:
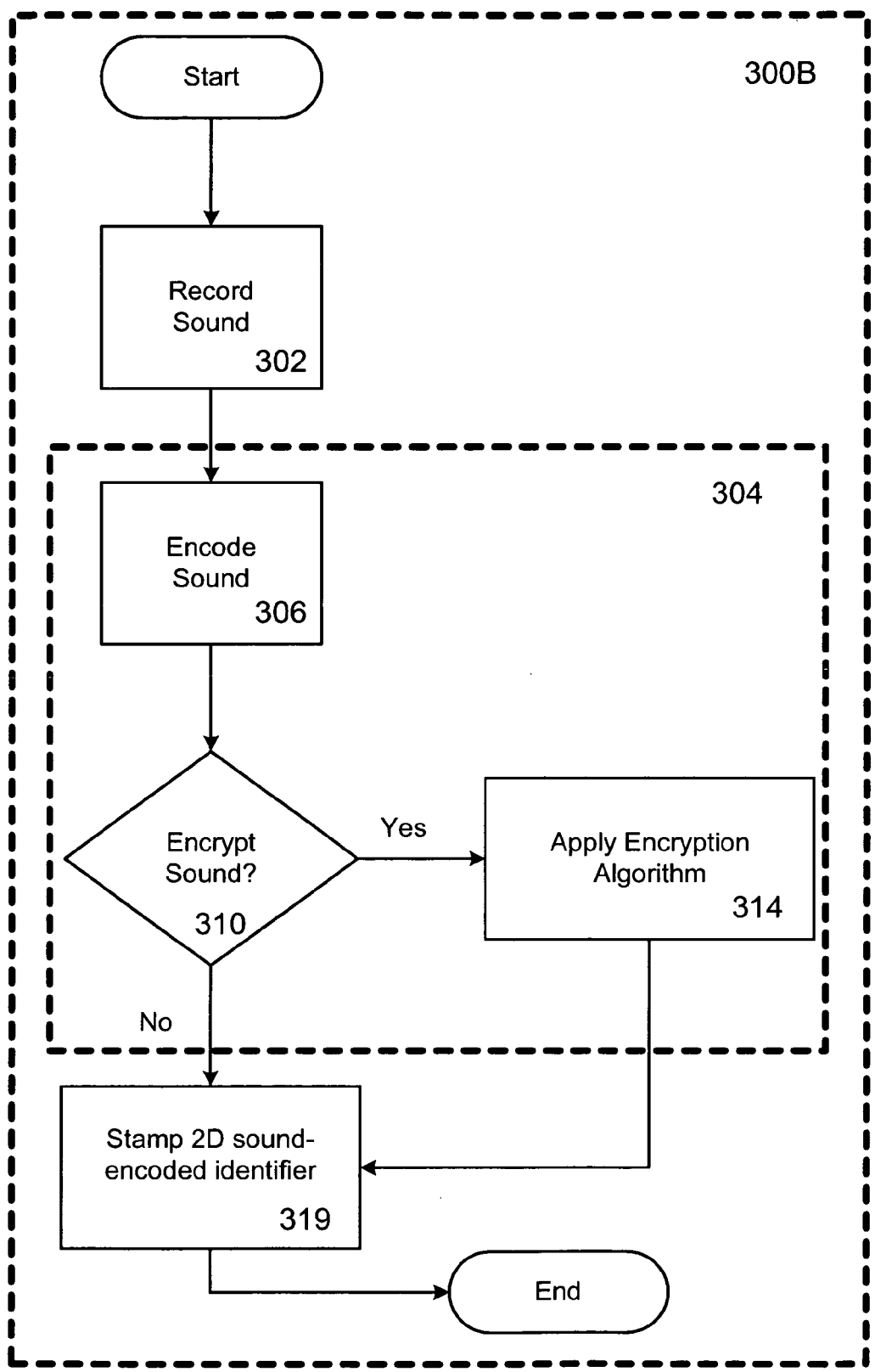
FIG. 26B is a flowchart that further illustrates the preparation of stamped identifiers by expanding the algorithm contained in block 304 of FIG. 26A.

FIG. 26B is a flowchart that further illustrates the preparation of stamped identifiers by expanding the algorithm contained in block 304 of FIG. 26A. At block 304, sound is encoded at block 306, and a decision to encrypt sound is made at block 310. One of the non-encrypted sound and the encrypted sound is stamped or embossed into an identifier at block 318.

Figure 27:
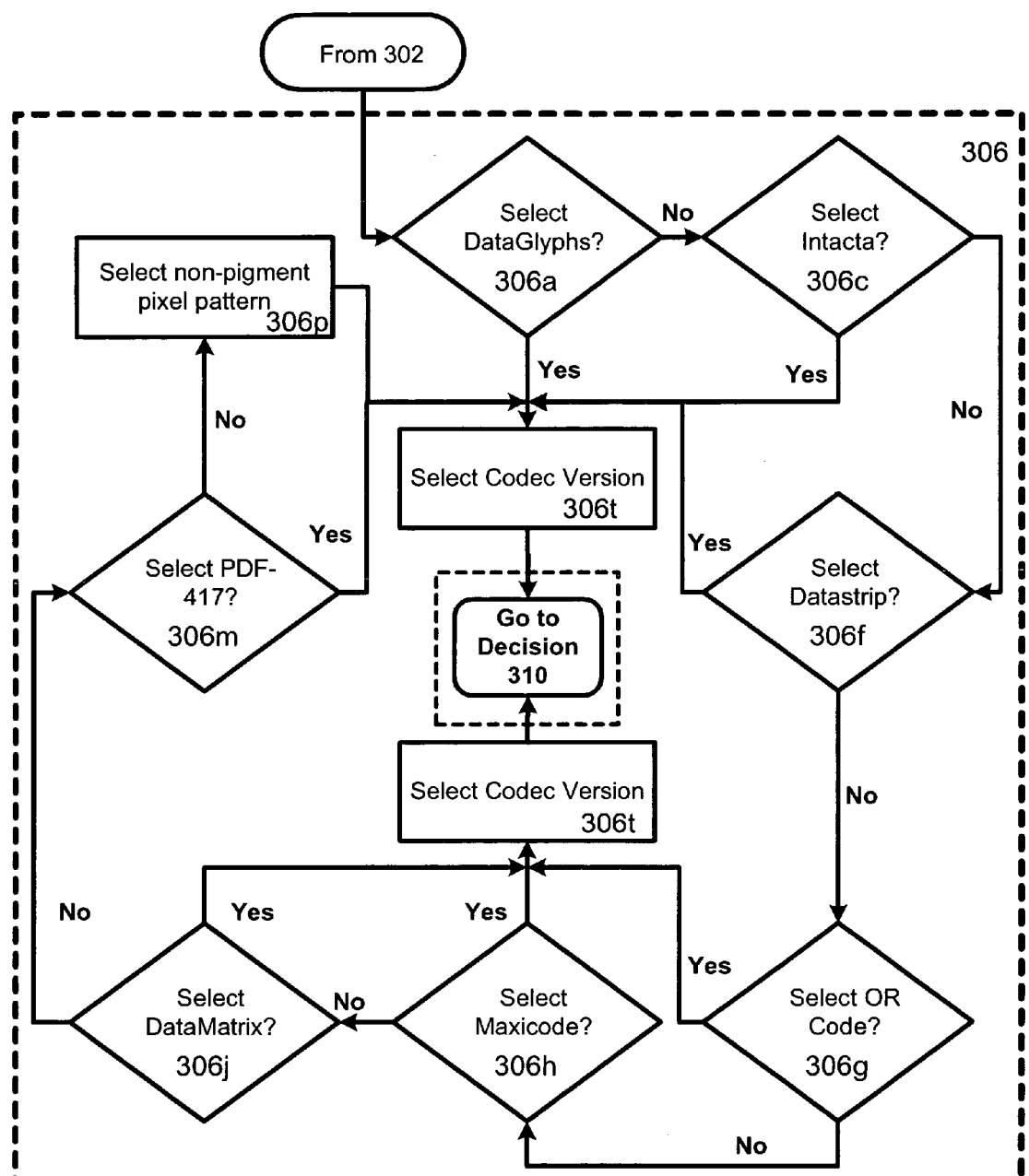
FIG. 27 is an expansion of the processes within block 306 of FIGS. 26A and 26B.

FIG. 27 is an expansion of the processes within block 306 of FIGS. 26A and 26B. Algorithm 306 includes deciding which pixel configuration format is selected for a pigmented identifier or which non-ink pattern is selected. The algorithms of block 306 include a series of decision diamonds to select a compression/decompression (CODEC) algorithm and which CODEC version number is to be selected. Beginning with block 306a a question is presented, and DataGlyphs, for example, is selected. If the answer is negative, then decision diamond 306c allows the selection of Intacta. If the decision is negative, then decision diamond 306f allows the selection of DataStrip. If the answer is negative, the decision diamond 306 allows the selection of OR code. Decision diamond 306h allows the selection of Maxicode. If the response is negative, decision diamond 306j is reached, that permits the selection of DataMatrix. A decision diamond 306m permits the selection of PDF-417. If all of the foregoing decisions are negative for printed identifiers, then the decision to select a non-pigmented pattern or a stamped or embossed pattern 306j decision diamond is reached. If any of these decision diamonds have an affirmative answer, then the CODEC version number is selected at block 306t.

Figure 28:
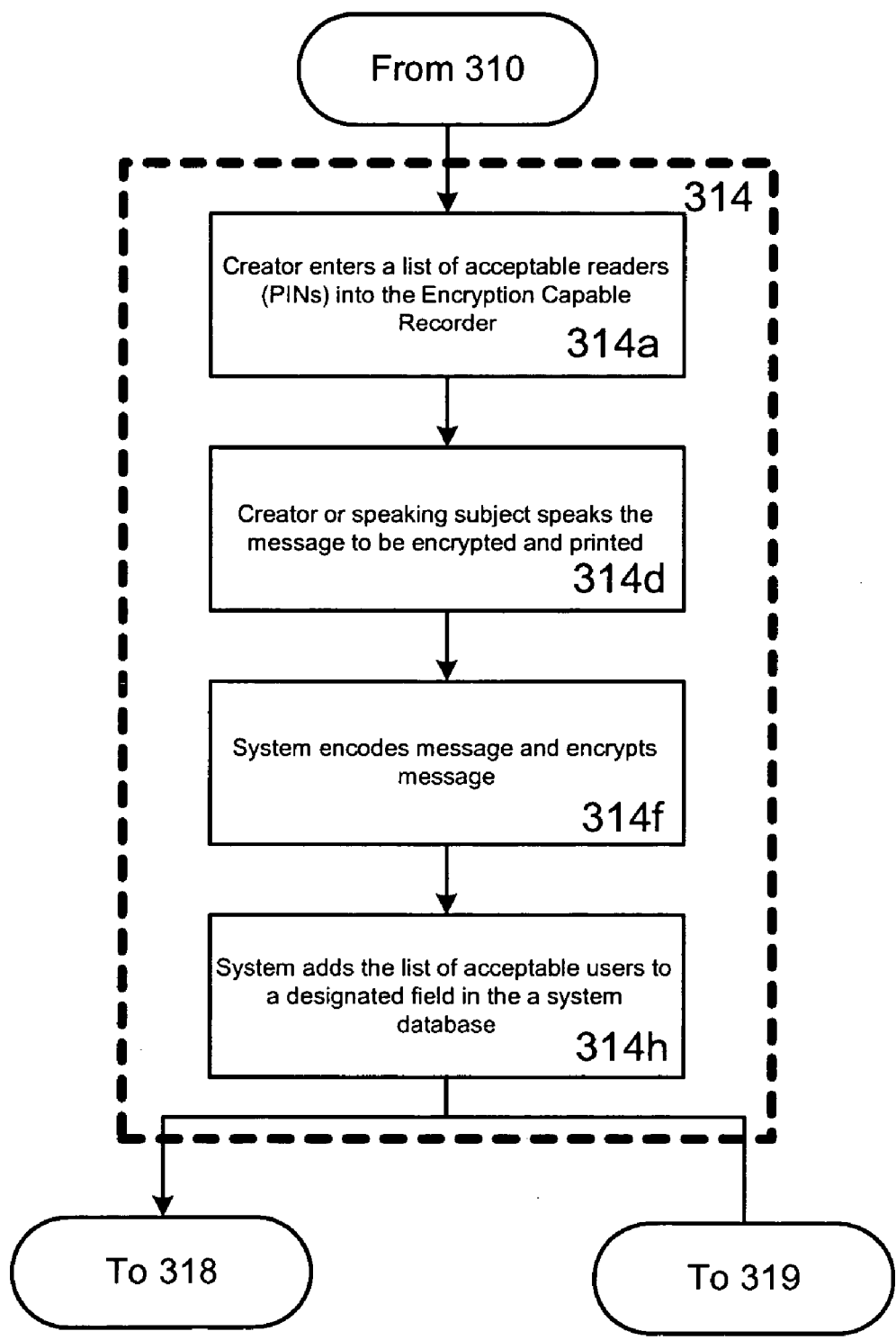
FIG. 28 is an expansion of the algorithms contained within block 314 of FIGS. 26A and 26B.

FIG. 28 is an expansion of the algorithms contained within block 314 of FIGS. 26A and 26B. Once the decision is made in the affirmative at decision diamond 310 to encrypt sound, the algorithms at block 314 for applying a friction algorithm begins at block 314a wherein a creator enters a list of acceptable readers and personal identification numbers (PINs) into the encryption capable reader. The encryption capable reader includes the devices previously described. For readers not having a keypad having an entry and a clear function, suitable keystrokes may be entered using a device coupled to the reader, such as a computer 146. Accordingly, the desired commands may be entered. At block 314d, the creator speaks the message to be encrypted and printed. Creator means the speaking subject 147 as previously illustrated. At a block 314f, systems as previously illustrated a message is encoded and encrypted. The encryption block 314 completes the encryption, and at block 314h, a list of subsequent users is written to a field in the database. The database may be located within a computer in communication with the reader or alternately, the database may be accessible through a communications system, such as the Internet. In the database, a special field is listed for the types of encryption code utilized. At block 314h, the method returns to one of printing an identifier at block 318 and stamping a non-pigmented identifier, as shown at block 319. In one embodiment, the stamping may be accomplished by having the surface topology of the receiving media correspondingly modified to have square or circular projections, irregularly shaped or regularly shaped, or pitted equivalents into any receiving media.

Figure 29:
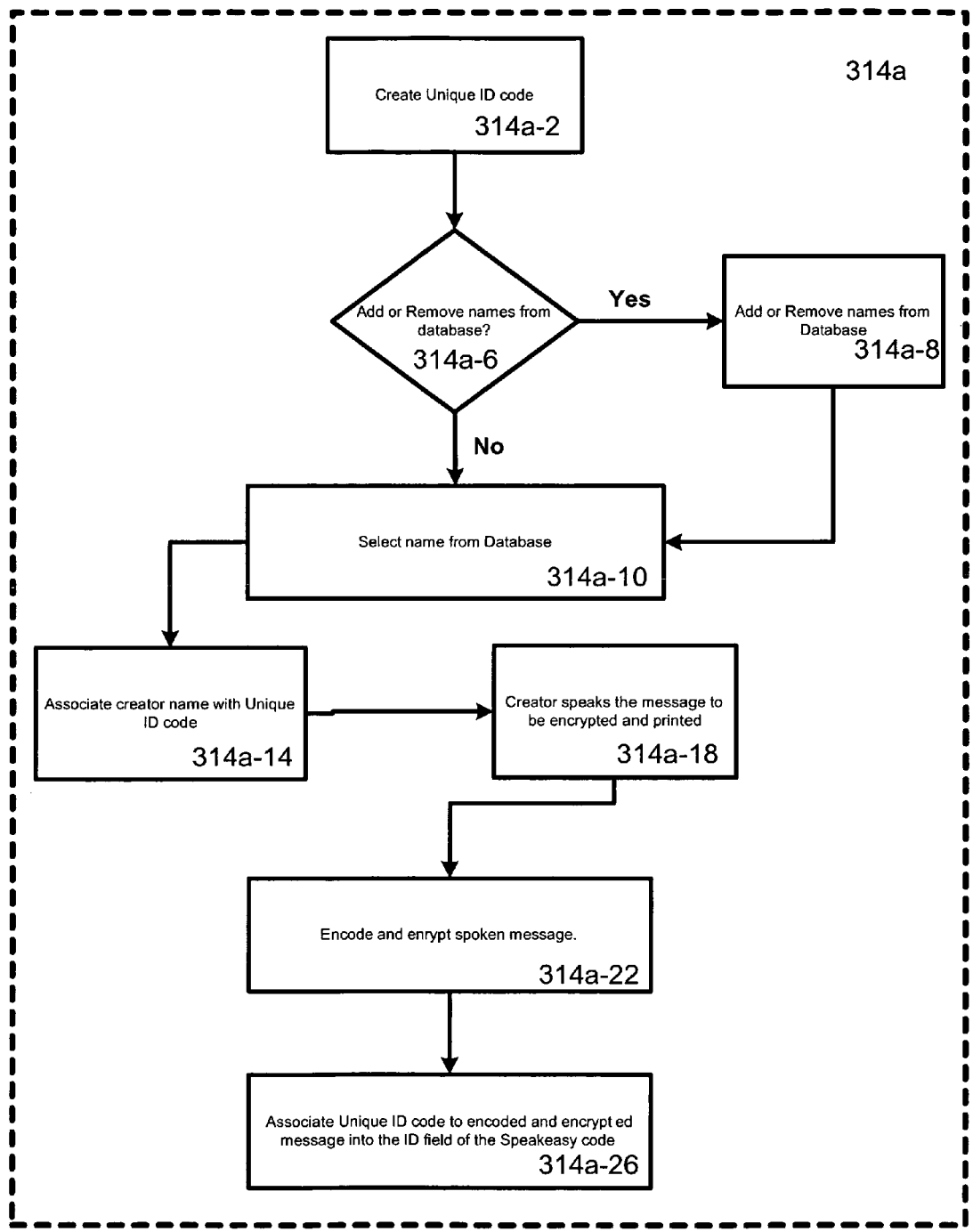
FIG. 29 is an expansion of the create list block 314a of FIG. 28.

FIG. 29 is an expansion of the create list block 314a of FIG. 28. The algorithm at block 314a begins with block 314a-2 where a unique ID code is created. Thereafter, a decision is presented to add or remove names of the database at decision diamond 314a-6. If there is no need to add or remove names from the database, then a name selected is selected from the database at process block 314a-310. If on the other hand, there is a reason to add or remove names from the database, then block 314a-8 permits names in the database are either added or removed. Block 314a-8 proceeds to select one or more names from database process block 314a-10. Once a name is selected from the database at a process block 314a-14, the creator or subject name is associated with a unique ID code. Once the code is assigned to a particular speaker or creator at a process block 314a-18, the creator or subject speaks the message to be encrypted and the spoken message is printed. After the subject speaks the message, it is encoded and encrypted at a process block 314a-22. The algorithm contained in block 314a is completed at process block 314a-26 wherein the unique ID code is associated to the encoded encrypted message in the ID field of the encryption code.

Figure 30:
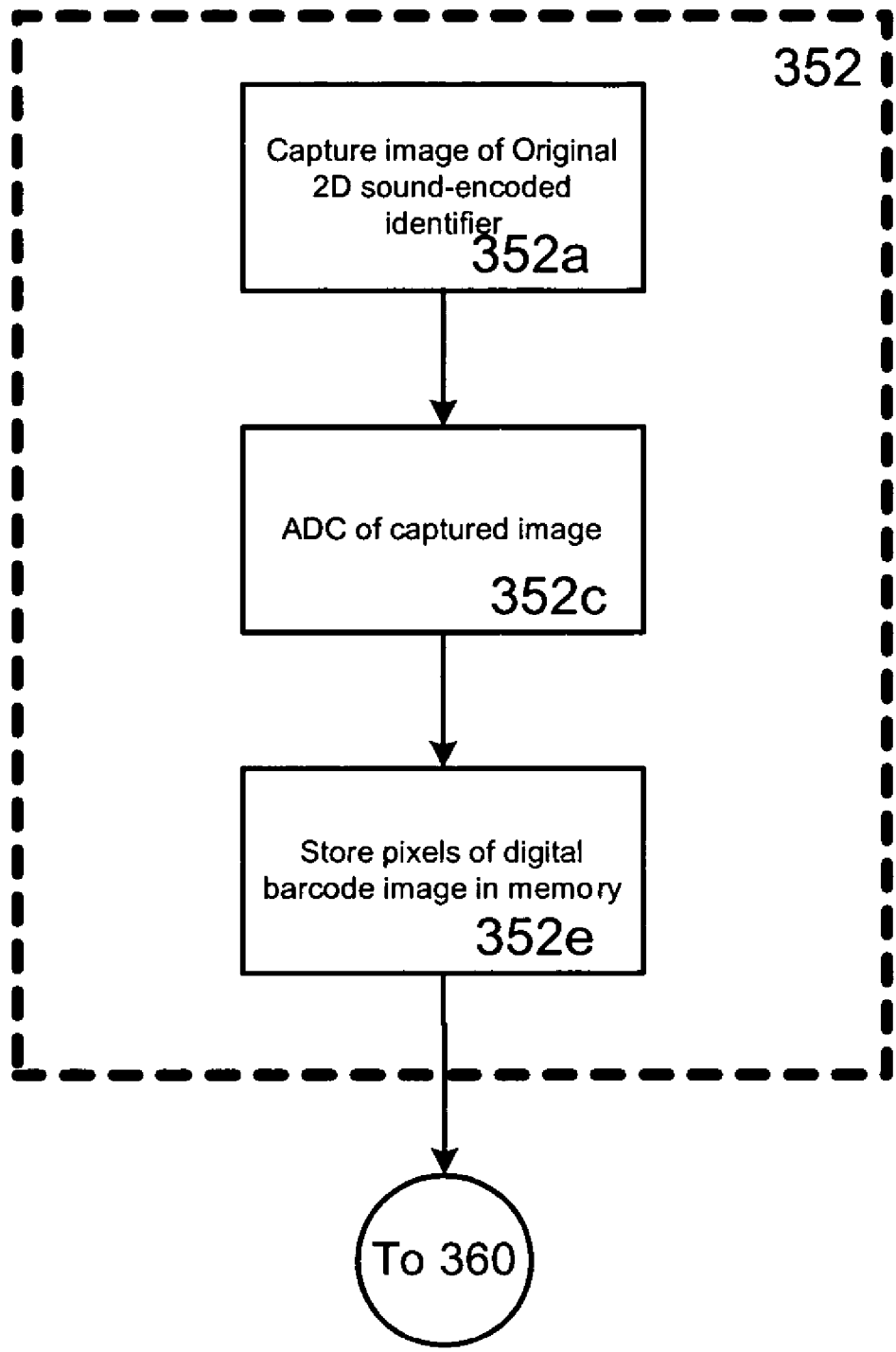
FIG. 30 is a further elaboration of the process shown in block 352 of FIG. 25.

FIG. 30 is a further elaboration of the process shown in block 352 of FIG. 25. Process block 352 begins with capturing an image of an original identifier at a process block 352a. The captured image is then analog-to-digital (A/D) converted at process block 352c and included in a digital file. At process block 352e, the pixels of the captured digital identifier image contained within the digital file is stored in memory. The process block 352 then proceeds to process block 360.

FIG. 31A through FIG. 33 describe image processing and distortion-correcting methods that may be used to decode and reproduce visual images of pigmented and non-pigmented identifiers. The pigmented and non-pigmented identifiers generally include pixel arrays that may be rectangular, orthogonal, circular, or oval configured patterns. The shape of individual pixels may be similarly configured to be rectangular, oval, angled lines, L-shaped, or other shapes. Suitable image filtering methods may include edge detection algorithms, contrast adjustment algorithms, and pixel block estimation algorithms as described in detail in: Kimberly Moravec, *A Grayscale Reader for Camera Images of Xerox DataGlyphs*, Paul L. Rosin, A. David Marshal (Eds.), 698-707, *Proceedings of the British Machine Vision Conference 2002*, BMVC 2002, Cardiff, UK, 2-5(September 2002), which is incorporated herein by reference.

Figure 31A:
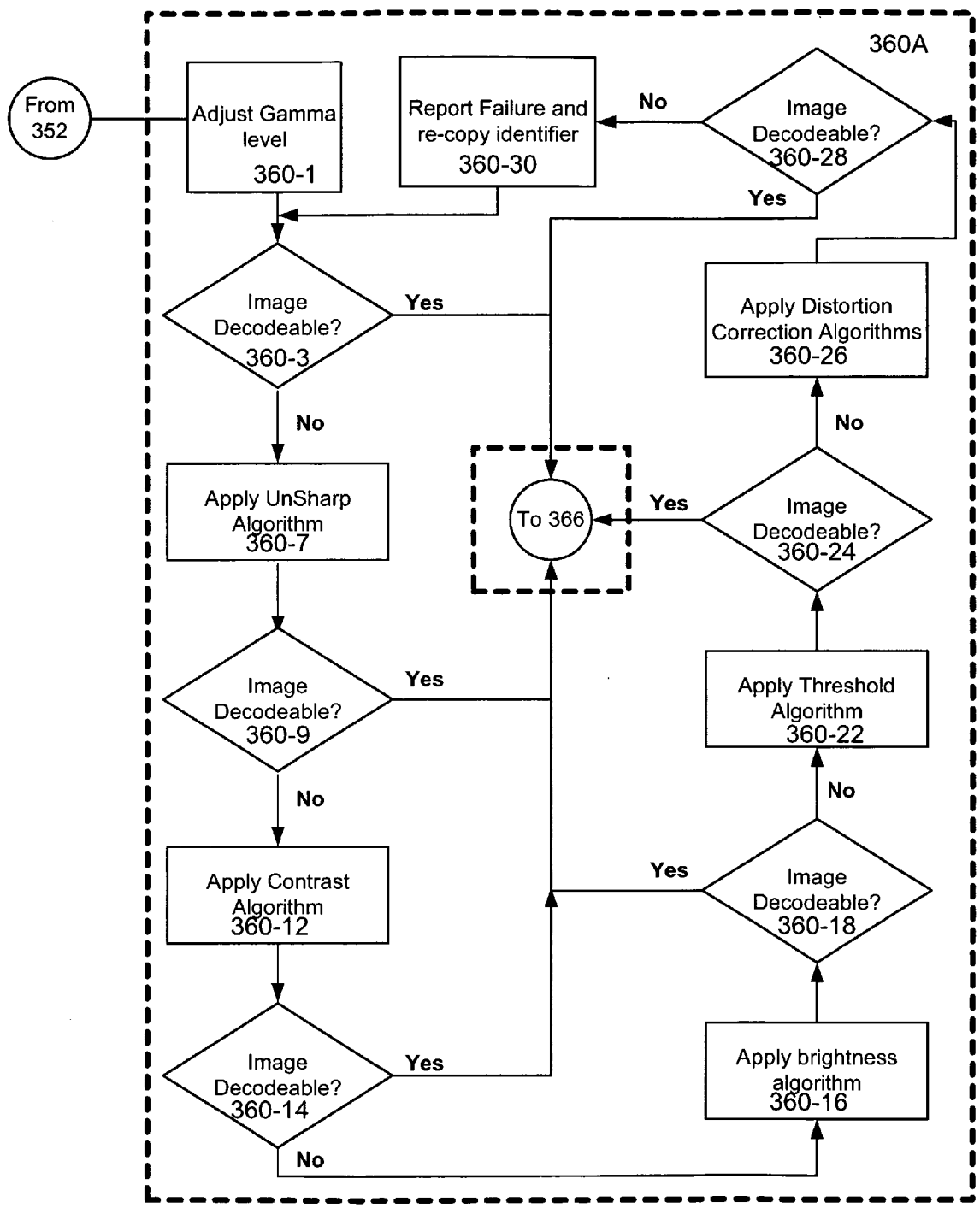
FIG. 31A describes image processing and distortion-correcting methods that may be used to decode and reproduce visual images of pigmented and non-pigmented identifiers.

FIG. 31A is an expansion of the algorithm contained within the block 360A of FIG. 25. The processes performed in block 360A may be performed in a sequential mode that offers the advantage of performing only those processes that are needed to optimize the image processing and to compensate for any identifier image distortion. A single correcting process may be used, or a series of processes may be used depending on whether the image is decodable after applying a single or multiple process series. The following processes may be engaged independently and in separate or different sequences as described. By way of example, at block 360-1, a gamma level adjustment is performed. A query is made if the image is decodable at decision diamond 360-3. If the image is not decodable, then an unsharp algorithm is applied at block 360-7. At decision diamond 360-9, if the image is not decodable, then a contrast algorithm is applied at process block 360-12. At decision diamond 360-14, a determination is made to determine if the image is decodable. If it is not decodable, then brightness adjust algorithm may be applied at block 360-16. At decision diamond 360-18, if the image is not decodable, then the threshold of the pixels is modified at process block 360-22. At decision diamond 360-24, a test for image decodability is performed if the image is still not decodable. If not decodable, distortion correcting algorithms are applied at a process block 360-26. After applying the distortion correction algorithms, the image is checked for decodability at decision diamond 360-28. If it is still not decodable, then a failure to image process is reported at process block 360-30 and the original identifier is copied and the processing loop cycles again at decision diamond 360-3.

Figure 31B:
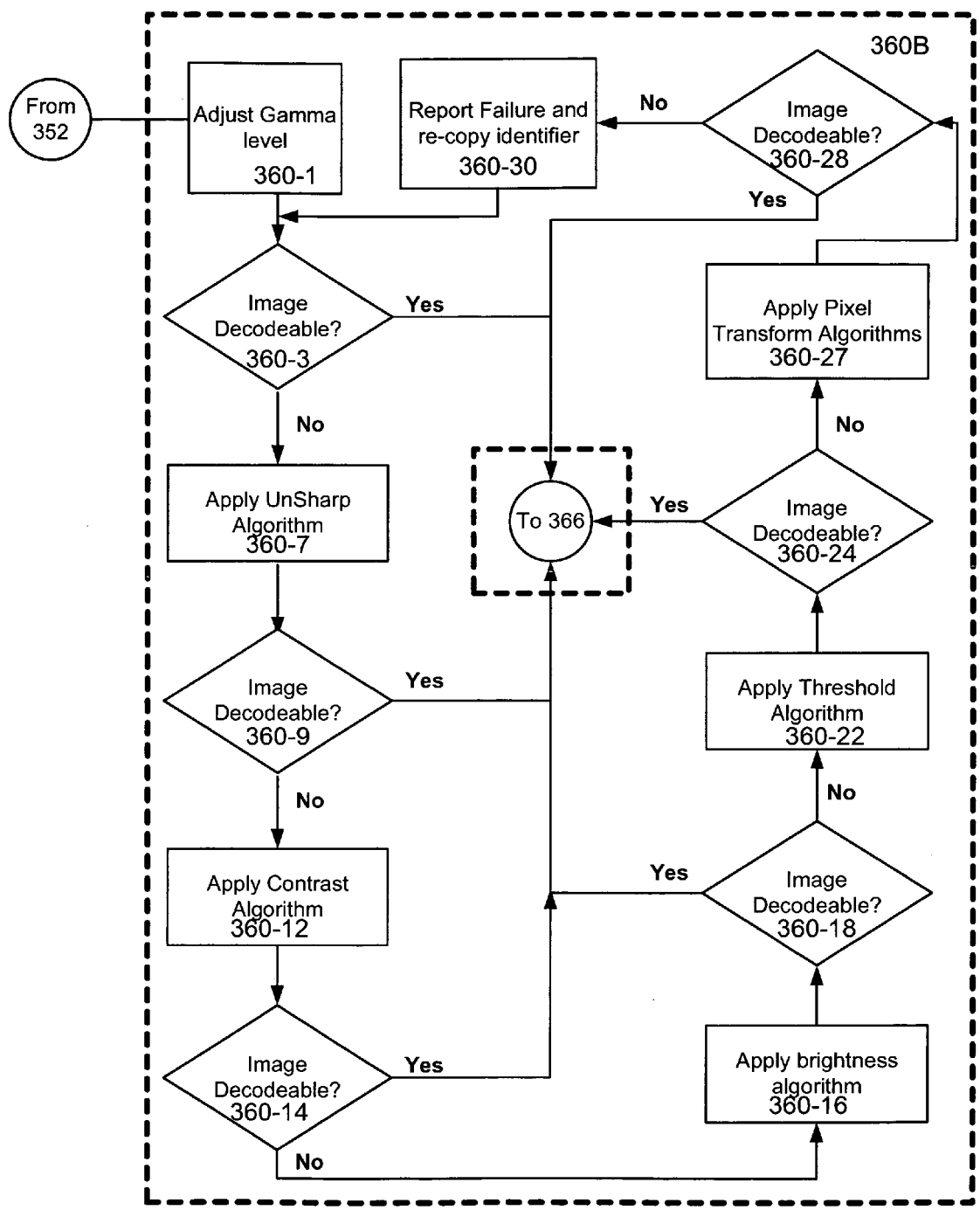
FIG. 31B is an expansion of the algorithm contained within block 360B of FIG. 25.

FIG. 31B is an expansion of the algorithm contained within block 360B of FIG. 25. Block 360B concerns image processing and reproducing a different pixel shape from that as presented by the original barcode. Block 360B has the same process blocks and decision diamonds as for block 360A, except block 360B lacks the applied distortion correcting algorithms process block 360-26. Instead, block 360B has an applied pixel transform algorithm at block 360-27. The applied pixel transform algorithm block 360 27 describes how the originally shaped pixels from the original identifier are transformed into a different shape in the reproduced image of the identifier. The processes performed in block 360B, like 360A, may be performed in a sequential mode so that a single correcting process may be used, or a series of processes may be used to correct an identifier image depending on whether or not an image is decodable after applying a single or process series.

Figure 32:
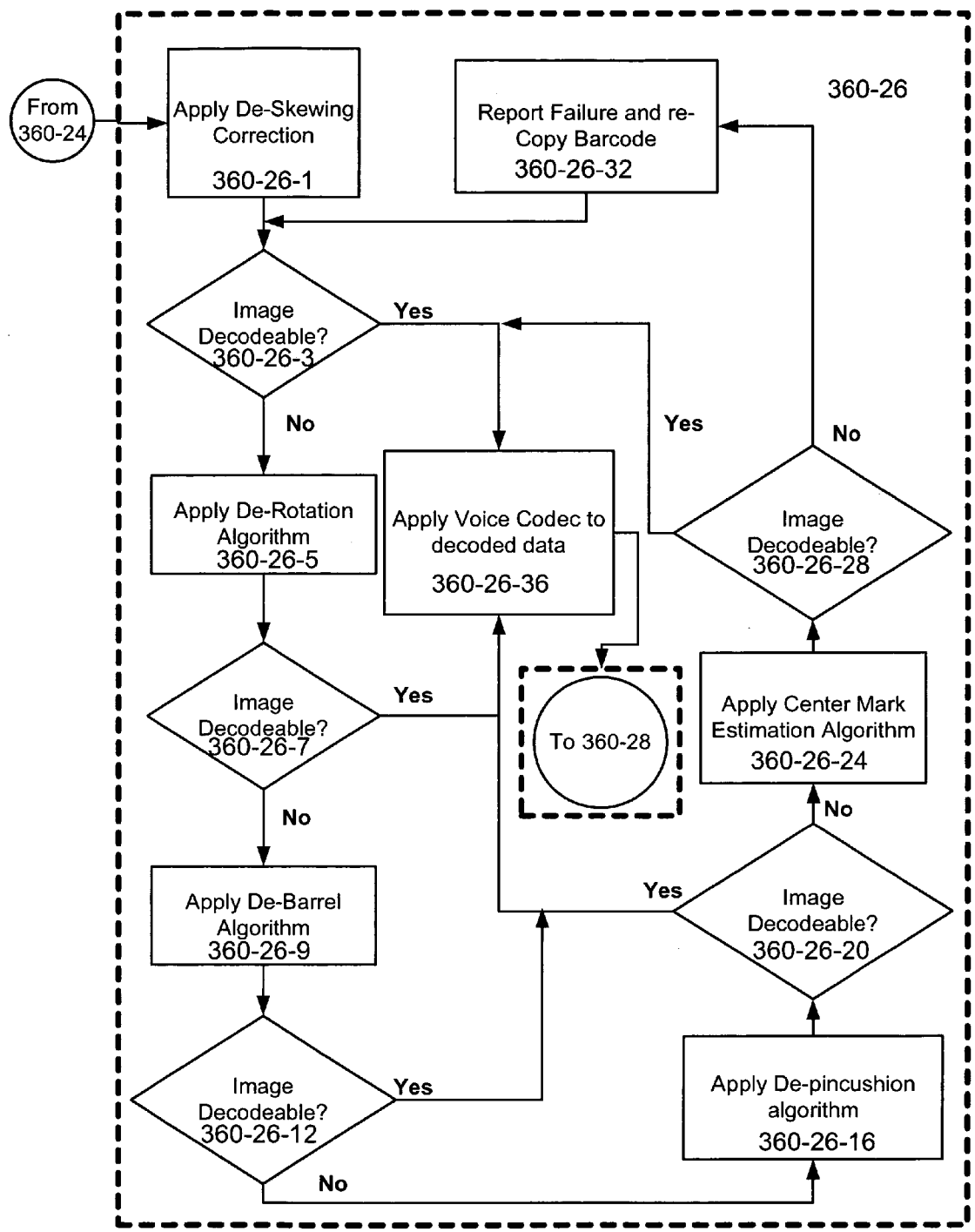
FIG. 32 is an expansion of the block 360-26 from FIG. 31A.

FIG. 32 is an expansion of the block 360-26 from FIG. 31A. The distortion-correcting algorithms of process block 36-26 is primarily, though not exclusively limited to, correcting rectangular or stacked linear array pixel patterns. Angled lines, such as used in the slashed-based DataGlyph pixel patterns, unless severely distorted, may not require the skewing and perspective-correcting algorithms. Process block 360-26 begins with applying a de-skewing correction process at block 360-26-1. A test for image decodability is attempted at decision diamond 360-26-3. If it is not decodable, then a de-rotation algorithm is applied at process block 360-26-5. A query or test for image decodability at decision diamond 360-26-7 is attempted and if it is not decodable, then a de-barrel algorithm is applied at process block 360-26-9. Upon testing for image decodability at decision diamond 360-26-12, should the image still not be decodable, then a de-pincushioning algorithm is applied at a process block 360-26-16. If the image is still not decodable at decision diamond 360-26-20, then an apply center mark estimate algorithm is attempted at a process block 360-26-24. Upon applying the center mark estimation algorithm, the query is asked if the image is decodable and if the image is not decodable, then a failure is reported and the barcode is recopied at process block 360-26-32. The distortion algorithm is reapplied on the recopied barcode beginning at decision diamond 360-26-3.

Figure 33A:
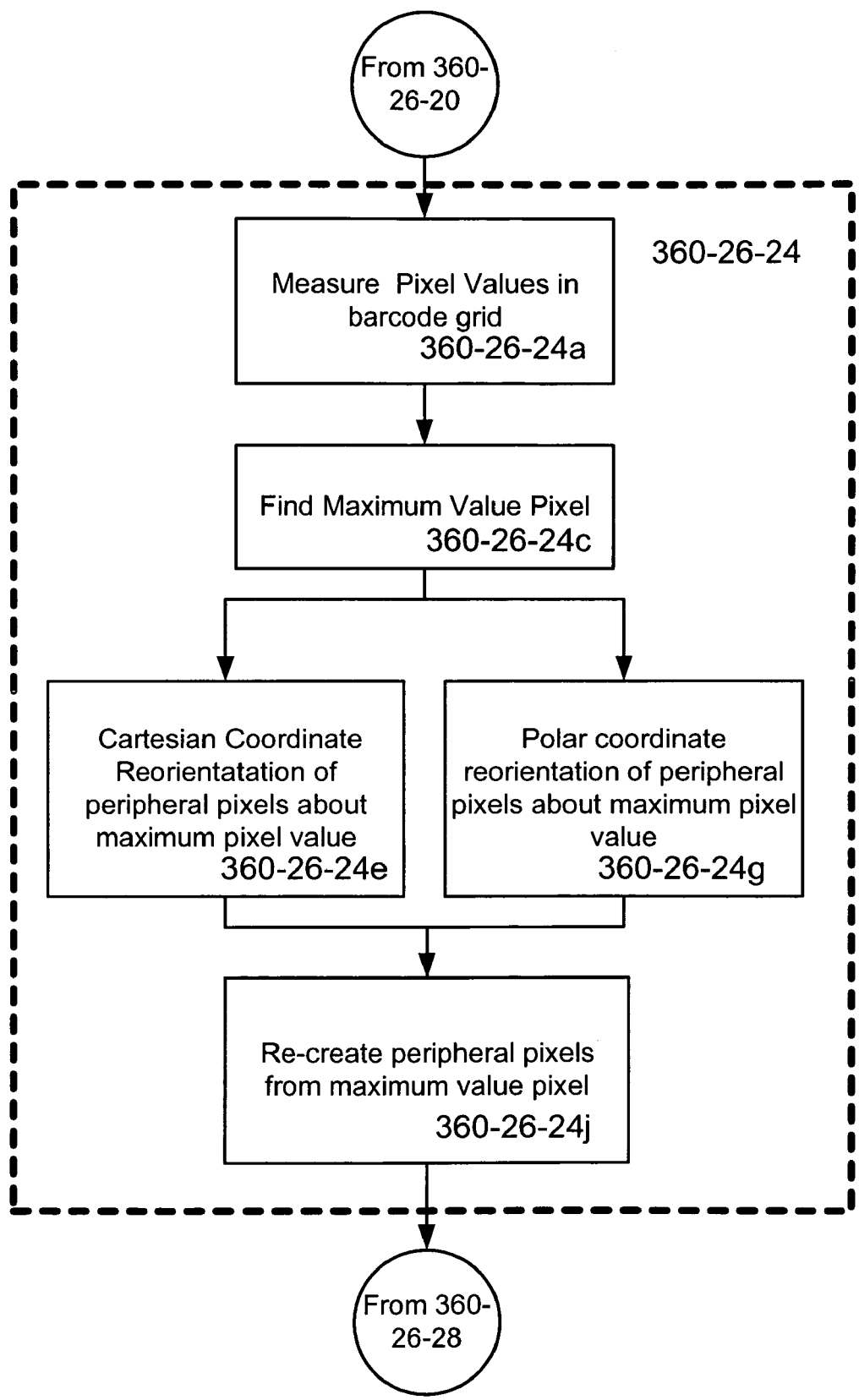

FIG. 33A is an expansion of the algorithm contained within block 360-26-24 from FIG. 32. The apply center mark estimation algorithm includes measuring pixel values in the barcode grid at process block 360-26-24a. Thereafter, a determination to find the maximum value pixel is made at a process block 360-26-24c. Upon finding the maximum value pixel, there are two options to pursue depending upon the type of reference coordination used in the pixel array. If the reference coordination is based upon Cartesian coordinates, then at process block 360-26-24e, the peripheral pixels are reoriented about the maximum pixel value in a Cartesian coordinate or XY fashion. If, on the other hand, the pixels are distributed about a circular array, then the peripheral pixels are reorientated in polar coordinates about the maximum value pixel at process block 360-26-24g. Thereafter depending upon which coordination system that was used in making the pixel arrays of the identifiers at process block 360-26-24j, the peripheral pixels are recreated either in a pigment-based printing process or in a stamping based process for non-pigmented pixels within the identifiers.

Figure 33B:
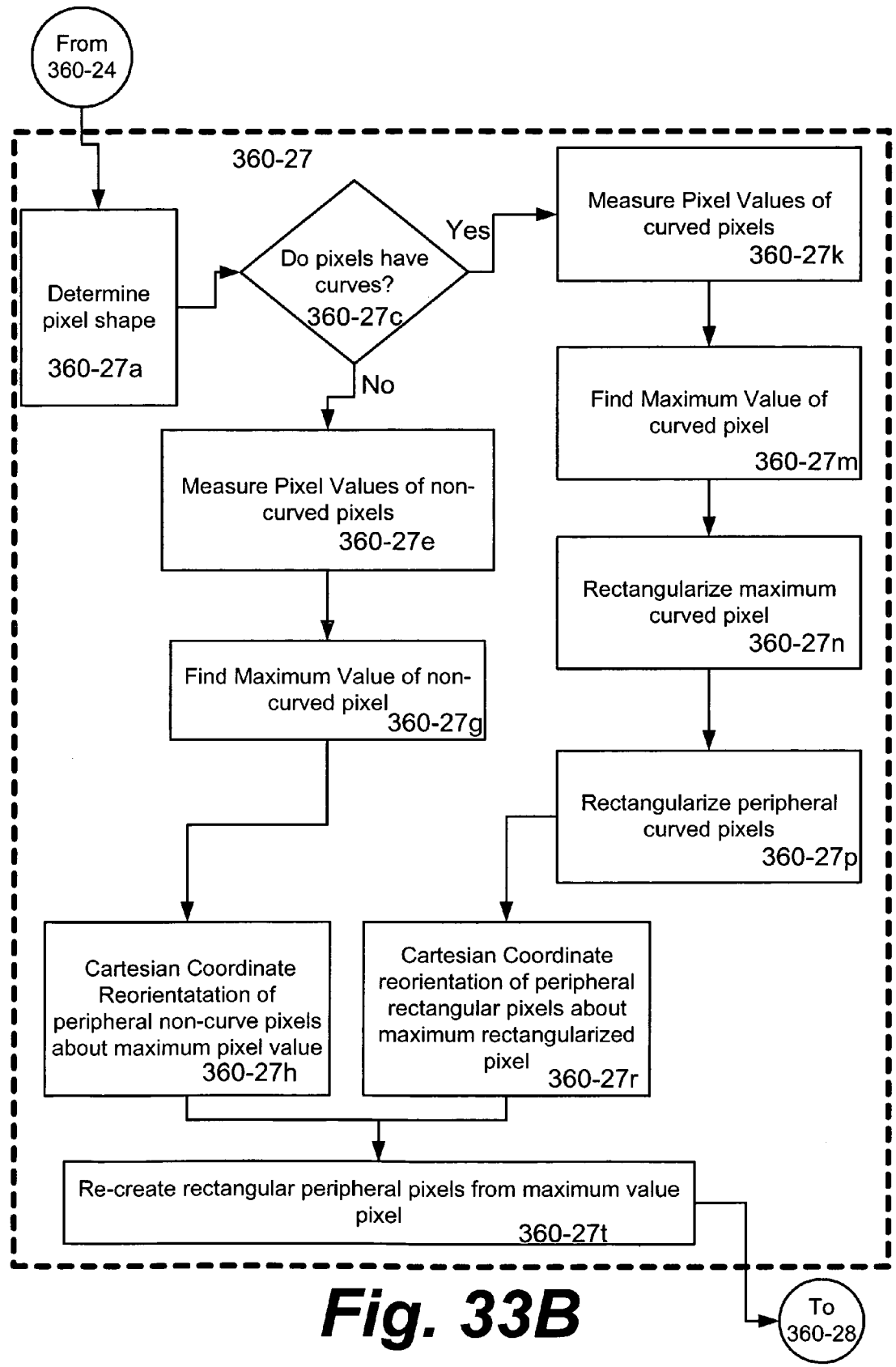

FIG. 33B is an expansion of the algorithm contained within block 360-27 from FIG. 31B. Block 360-27 concerns changing the shape of a pixel from its original shape in the original identifier to a different shape in a reproduced identifier. Block 360-27 begins with block 360-27a to determine the pixel shape. Thereafter, at decision diamond 360-27c, a query is presented, "Do pixels have curves?" If the answer to this question is no, then process block 360-27e is reached wherein pixel values of non-curved pixels are measured. By pixel values, it is meant the intensity level of the pixel. At process block 360-27g, a maximum value of non-curve pixel process block is reached. Once the maximum value of the non-curve pixel is determined, then at process block 360-27h, a reorientation of peripheral non-curve pixels about the maximum non-curve pixel along Cartesian coordinance is performed at process block 360-27h. Once re-orientation along Cartesian coordinates has occurred, then at process block 360-27t, the rectangular peripheral pixels are recreated from the maximum value pixel. Process block 360-27 is exited to decision diamond 360-28 of the prior illustrated method figures. Returning to decision diamond 360-27c, for the query, "Do pixels have curves?" If the answer is "yes" to this query, then process block 360-27k is reached wherein the pixel value intensity of curved pixels is measured. At process block 360-27m, the maximum value of the curved pixel is determined. At process block 360-27n, the maximum curved pixel is rectangularized or "squared up". The rectangularization of the maximum curved pixel is achieved via a mathematical algorithm that has the effect of taking 90° tangents to the external curved regions and filling in the intersecting 90° tangents with an intensity value equivalent to the maximum curved pixel. After rectangularization of the maximum curved pixel, at process block 360-27p, the rectangularization of peripheral curved pixels is achieved. Similar to the enclosing or circumscribing of 90° tangent lines process of 360-27n, a similar fill-like process for the peripheral curved pixels is undertaken, wherein rectangularized and filled in peripheral pixels are formed in process block 360-27p. Once the maximum curve and peripheral curve pixels are rectangularized and filled in, the peripheral rectangularized pixels are then reoriented about the maximum rectangularized pixel along Cartesian coordinates in process block 360-27r. The rectangular peripheral pixels are recreated from the maximum value pixel at process block 360-27t. Then process block 360-27 is exited to decision diamond 360-28.

Figure 34:
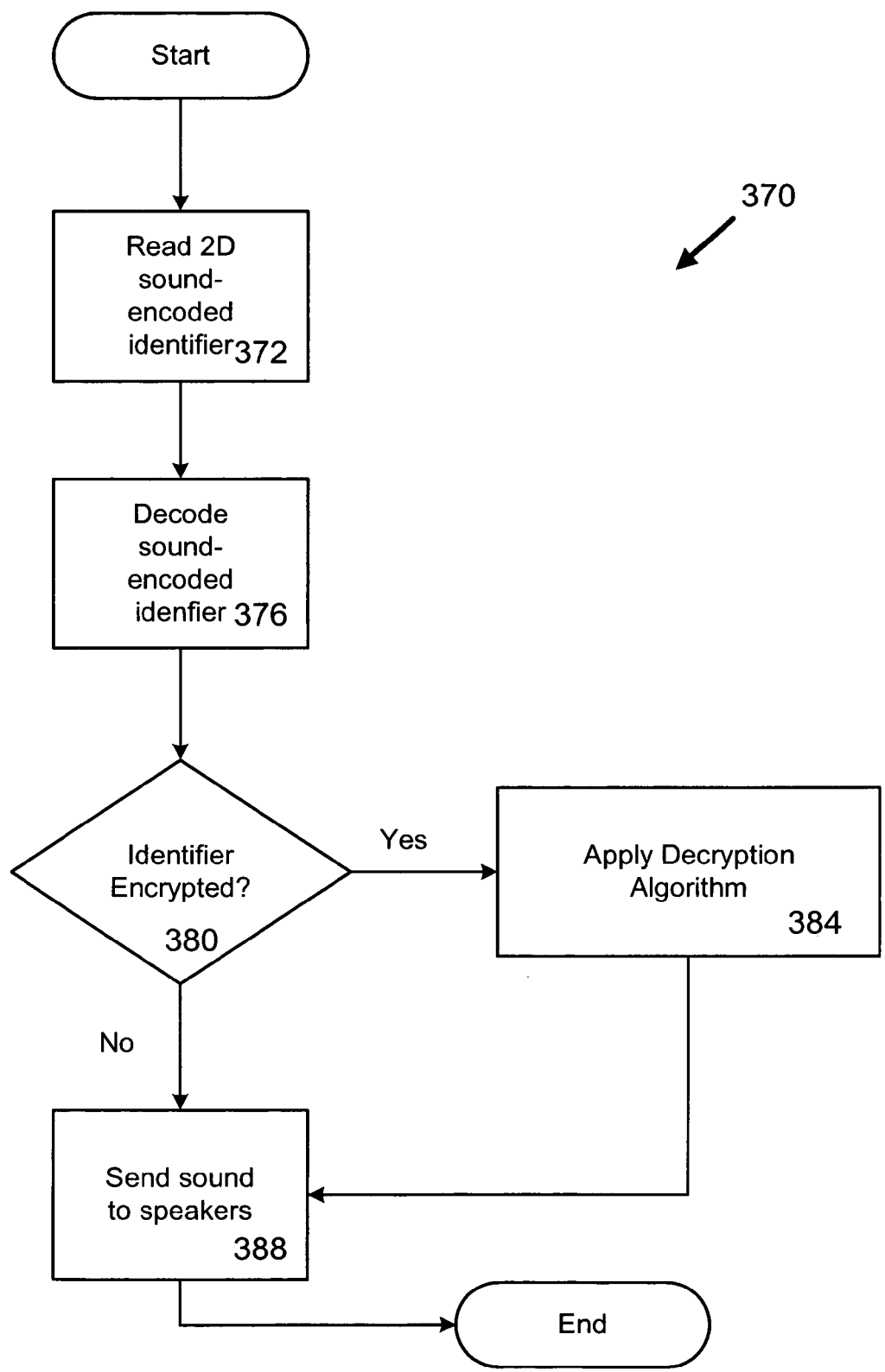
FIG. 34 is a flowchart that describes a read-and-decode method for the decryption of identifiers, according to another embodiment of the invention.

FIG. 34 is a flowchart that describes a read-and-decode method 370 for the decryption of identifiers, according to another embodiment of the invention. At block 372, the identifier is read using one of the disclosed embodiments, as discussed in detail above. At block 376, the identifier is decoded. At block 380, it is determined whether the identifier is encrypted. If the identifier is not encrypted, then the audio content is transferred to a speaker, as shown at block 388. On the other hand, if the identifier is encrypted, then a decryption algorithm is selected and applied to the audio content at a process block 384.

Figure 35:
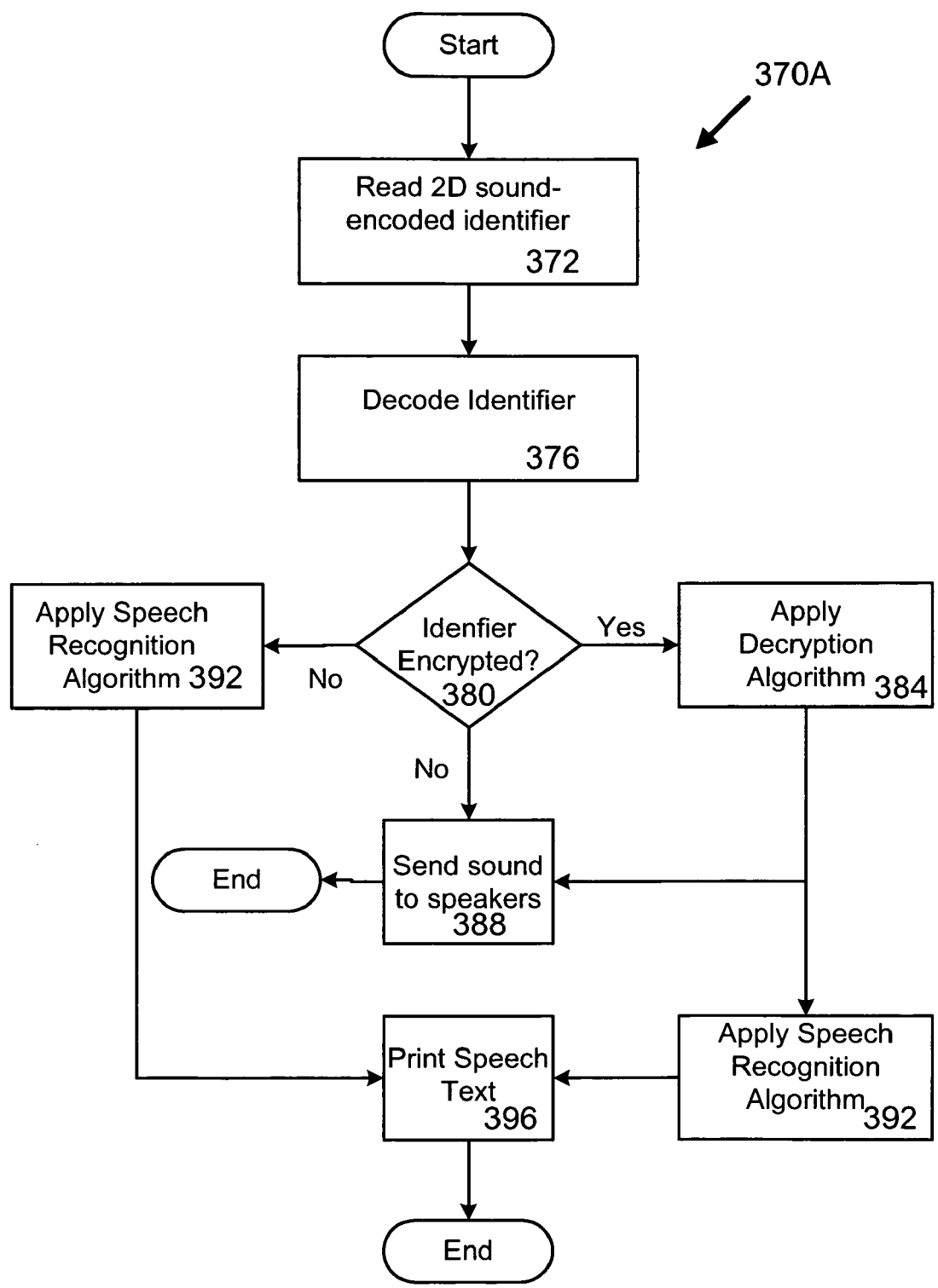
FIG. 35 is a flowchart that describes a speech read-and-decode method for the decryption of identifiers, according to another embodiment of the invention is a method embodiment of a speech read-and-decode algorithm.

FIG. 35 is a flowchart that describes a speech read-and-decode method 370A for the decryption of identifiers, according to another embodiment of the invention. At block 372, the identifier is read. At block 376, the identifier is decoded by a reader, as described in detail above. At block 380, it is determined whether the identifier is encrypted. If the identifier is encrypted the method 370A branches to block 384, and a suitable decryption algorithm is applied. A speech recognition algorithm may then be applied, as shown at block 392. If the identifier is not encrypted, the method 370A branches to a block 392, and a speech recognition algorithm is applied, and a printed text of the audio content is generated at block 396. Alternately, a voice recognition algorithm operable to associate an identity with a voice may also be applied at block 392. The method 270A may also branch to block 388 if the identifier is not decrypted so that the audio content extracted from the identifier may be a speaker, as shown at block 388.

Figure 36:
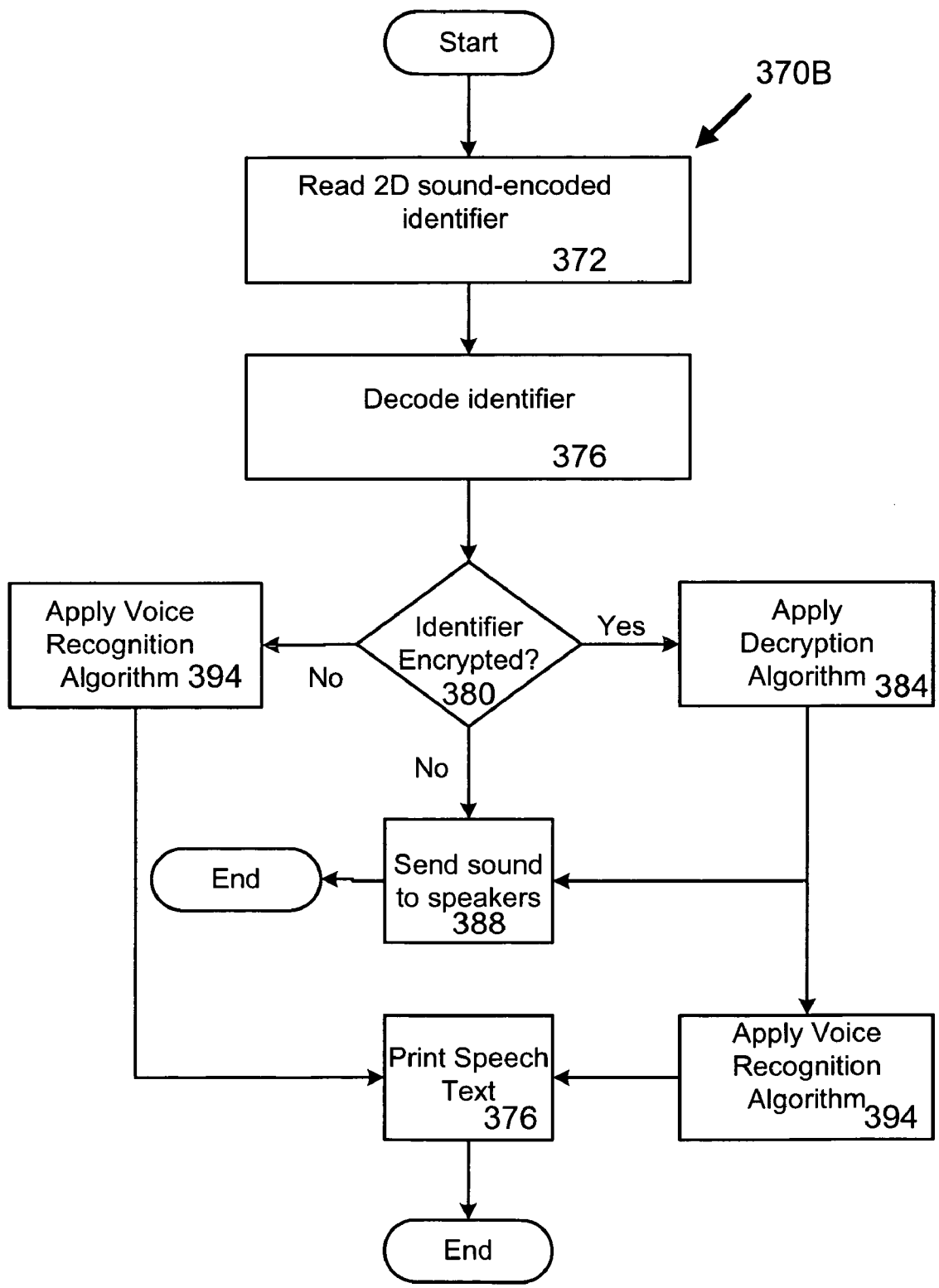
FIG. 36 is a flowchart that illustrates a method of voice read-and-decode algorithm decoding, decrypting, and identifying a voice encoded within an identifier, according to an embodiment of the invention.

FIG. 36 is a flowchart that illustrates a method 370B of voice read-and-decode algorithm decoding, decrypting, and identifying a voice encoded within an identifier, according to an embodiment of the invention. The decoding process 370b resembles the decoding process 370a, and includes a voice recognition algorithm at block 394.

Figure 37:
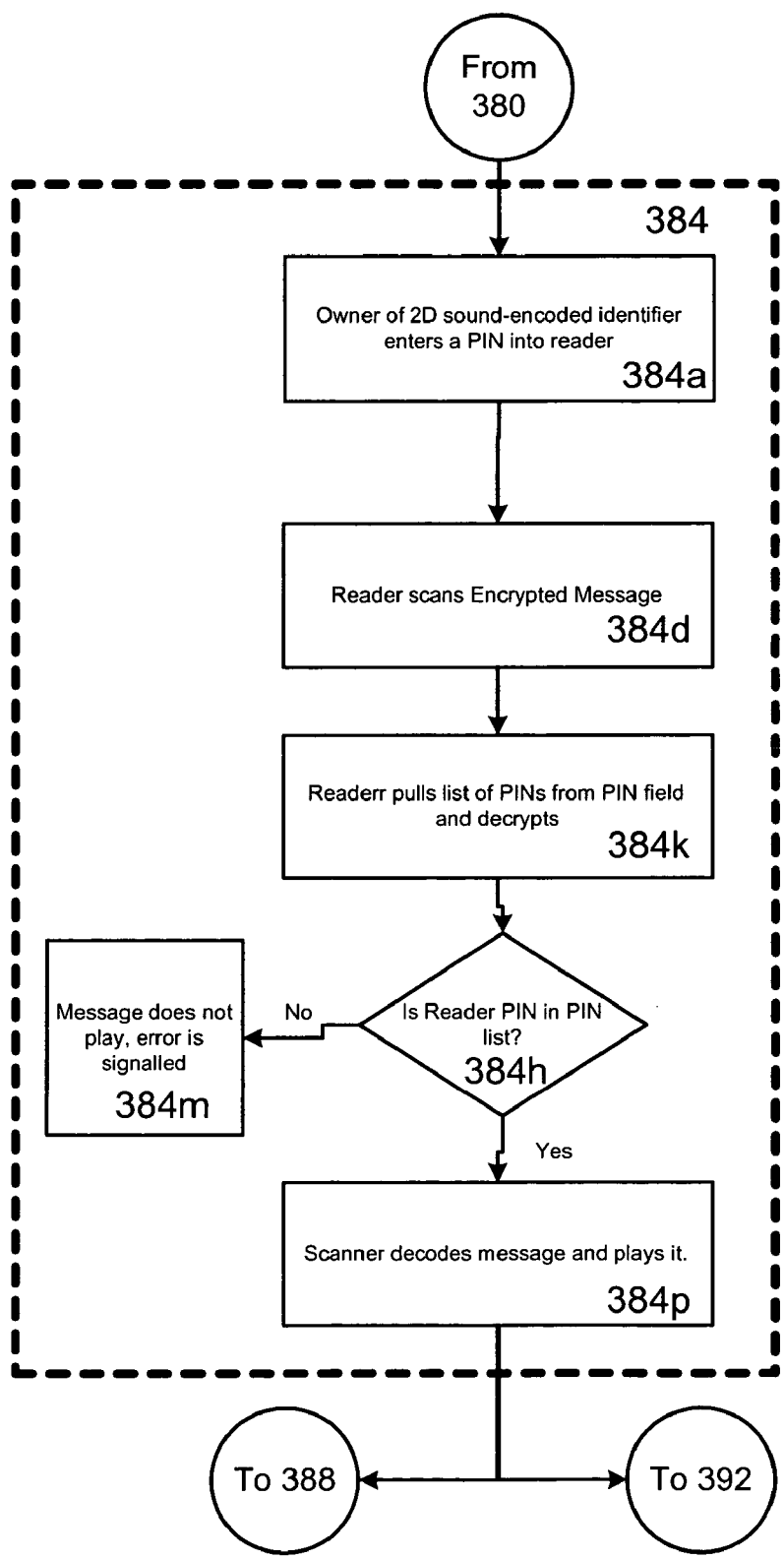
FIG. 37 is a flowchart that will be used to further describe the block 384 of FIGS. 34 35, and 36.

FIG. 37 is a flowchart that will be used to further describe the block 384 of FIGS. 34 35, and 36. Block 384 block 384a allows an owner of an identifier to enter a personal identification number (PIN) or a public/private key combination into a reader. At block 384d, the reader scans the encrypted message. At block 384k, the reader retrieves a list of PIN numbers from a PIN field stored in a database and decrypts them. At block 384h a determination is made as to whether the reader PIN is in the retrieved PIN list. If the reader PIN is not in the PIN list, the audio content is not reproduced (on a speaker or a printer, for example) and an error is presented, as shown at block 384m. If, on the other hand, the reader PIN number is present in the PIN list, the reader decodes the message and reproduces the message, as shown at block 384p.

Figure 38:
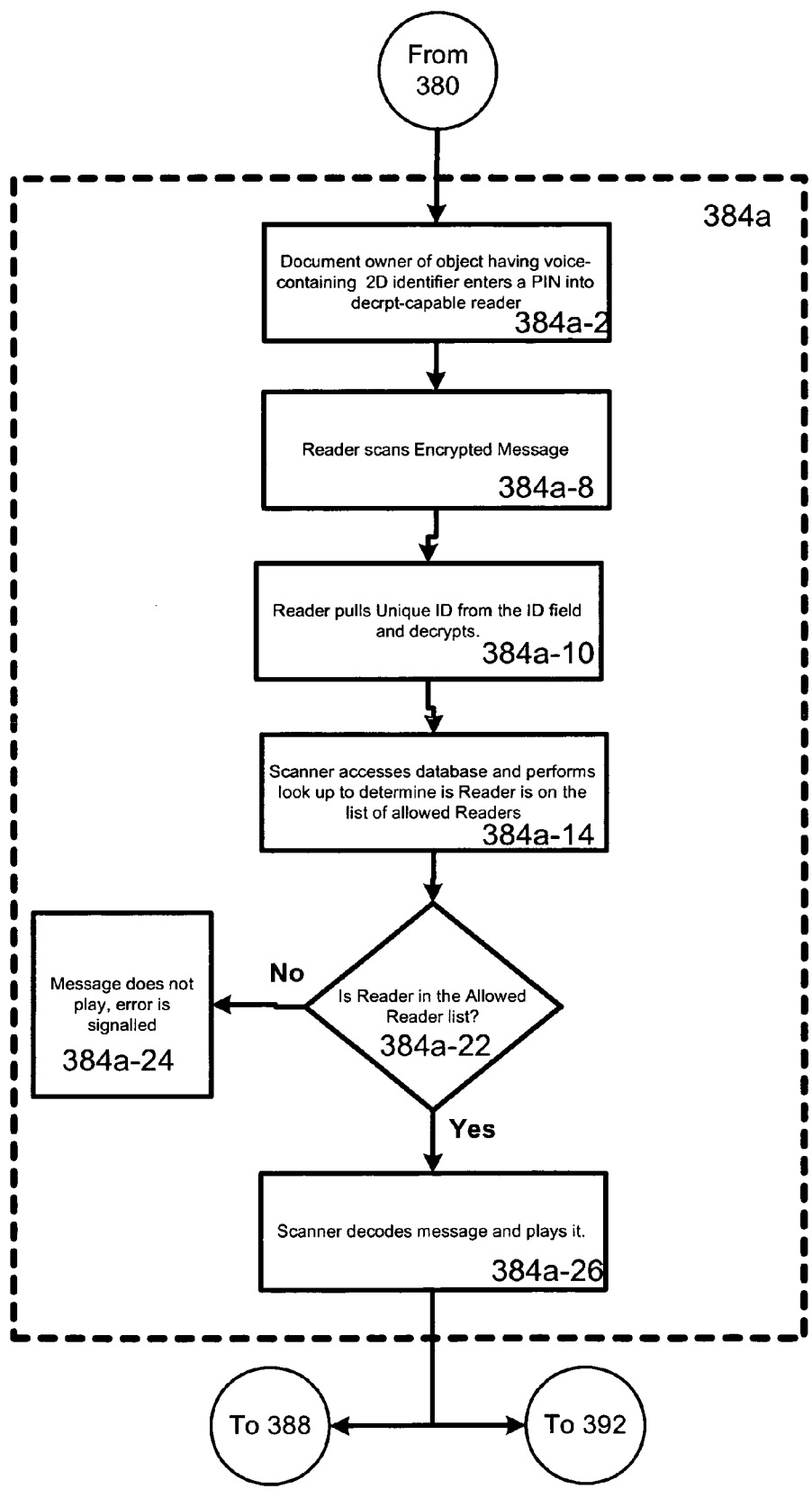
FIG. 38 is a flowchart that will be used to further describe the block 384a of FIG. 37.

FIG. 38 is a flowchart that will be used to further describe the block 384a of FIG. 37. At block 384a-2, a document owner or object owner having an identifier affixed to the document or object enters the personal identification number (PIN) or public/private key combination into the reader. The reader scans the encrypted message at a block 384a-8. At block 384a-10, the scanner retrieves an identification (ID) number from the ID field and decrypts. At block 384a-14, the reader accesses the database and performs a look-up routine to determine if the reader is on a list of allowed readers. At block 384a-22, it is determined if a reader is an allowed reader. If the reader is not allowed, then at the message is not reproduced, as shown at block 384a-24, and an error message is generated. Alternately, if it is determined that the reader is not allowed the reader decodes the message and reproduces it, as shown at block 384a-26.

Figure 39:
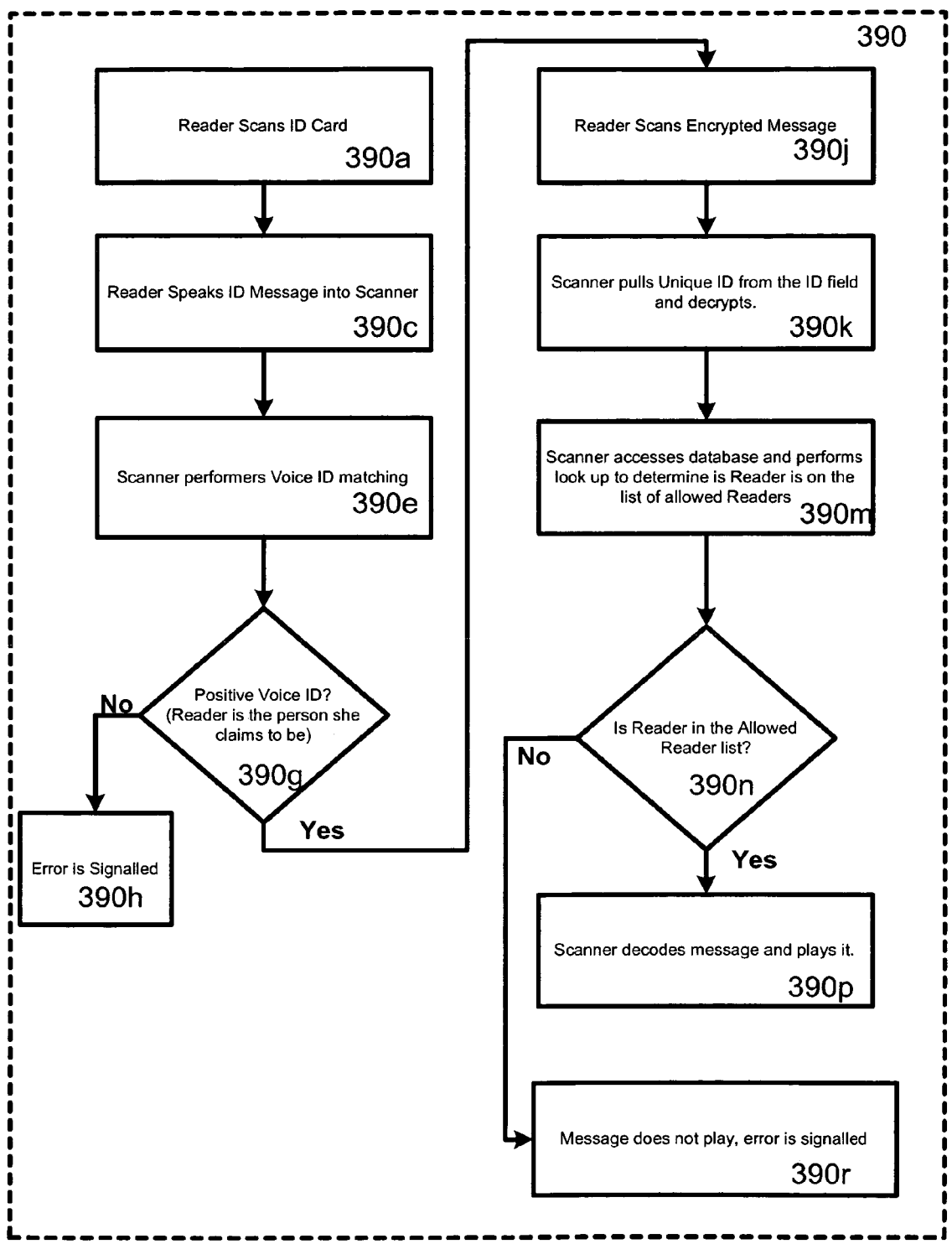
FIG. 39 is a flowchart that will be used to describe a voice identification method for the system shown in FIG. 14.

FIG. 39 is a flowchart that will be used to describe a voice identification method 390 for the system 250 shown in FIG. 14. At block 390a, a reader scans an identification (ID) card, such as the identification card 256 of FIG. 1. The identification card 256 has an identifier 252. The scanner 112D (FIG. 1) scans the identifier 252 to decode and decrypt the identifier 252. At block 390c the subject speaks an identifying message into the reader. At block 390e, the reader performs voice ID matching so that the signals 147k (FIG. 14) derived from the speaking subject 147 are conveyed to the computer 146 (also shown in FIG. 14). The voice encoded within the identifier 252 is relayed as a signal 252-a to the computer 146 and is displayed as a voice pattern signal 252-a on a display of the computer 146. At block 390g, a determination is made whether a positive voice identification is made. If the voice is not identified, an error message is generated at block 390h. If the voice is identified, however, the reader scans the encrypted message, as shown at block 390j. At block 390k, the reader retrieves the ID from the ID field and decrypts the ID. At block 390m, the reader accesses the database and searches a look-up table to determine whether the reader appears on the list of allowed readers. At block 390n, a determination is made as to whether the reader appears in the allowed reader list. If the reader is not on the list the message is not reproduced and an error is generated, as shown at block 390r. Alternately, if the reader appears on the list, then the reader decodes the message and reproduces the message, as shown at block 390p.

Figure 40A:
FIG. 40A through FIG. 40C illustrate different arrangements of associating or affixing identifiers with a printed image, according to an embodiment of the invention.
Figure 40B:
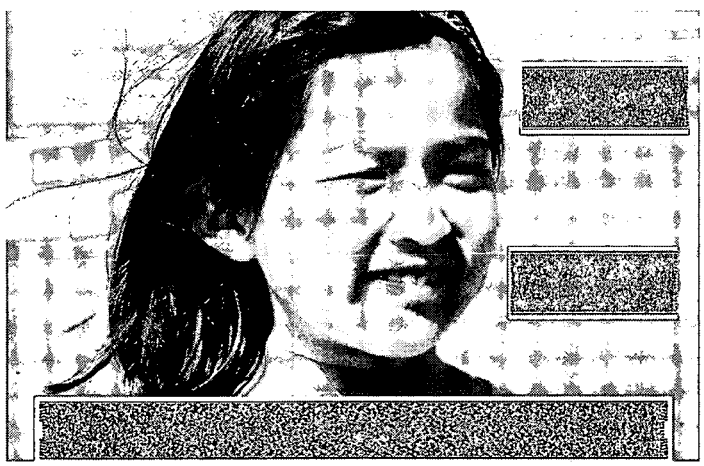
Figure 40C:
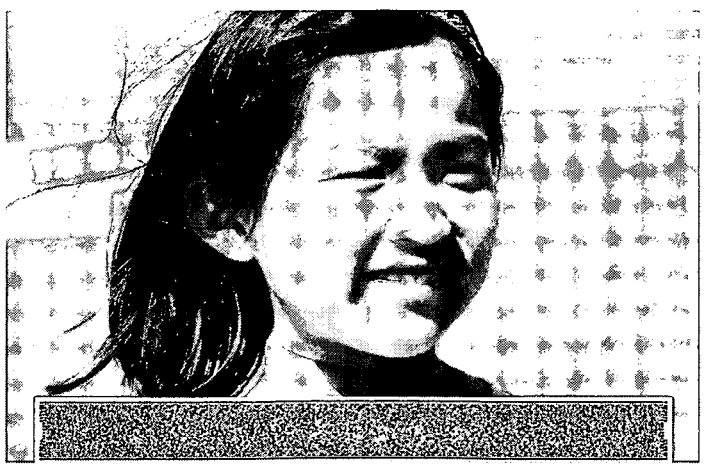

FIG. 40A through FIG. 40C illustrate different arrangements of associating or affixing identifiers with a printed image, according to an embodiment of the invention. In FIG. 40A, a single identifier is affixed to an image near the bottom of the image. In FIG. 40B, more than one identifier is affixed to the image. The identifiers applied to the image may be of different lengths, and may be positioned at different locations on the image. For example, the identifier positioned near the bottom edge of the image may include audio content obtained from a narrator describing the significance of the image. Other identifiers may include a commentary obtained from the person that appears in the image, or other suitable subject-related audio content. In FIG. 40C, more than one identifier may be affixed at a bottom edge of the image. The identifiers include audio content that permits a more detailed explanation of the image content by a narrator or the subject.

Figure 41:
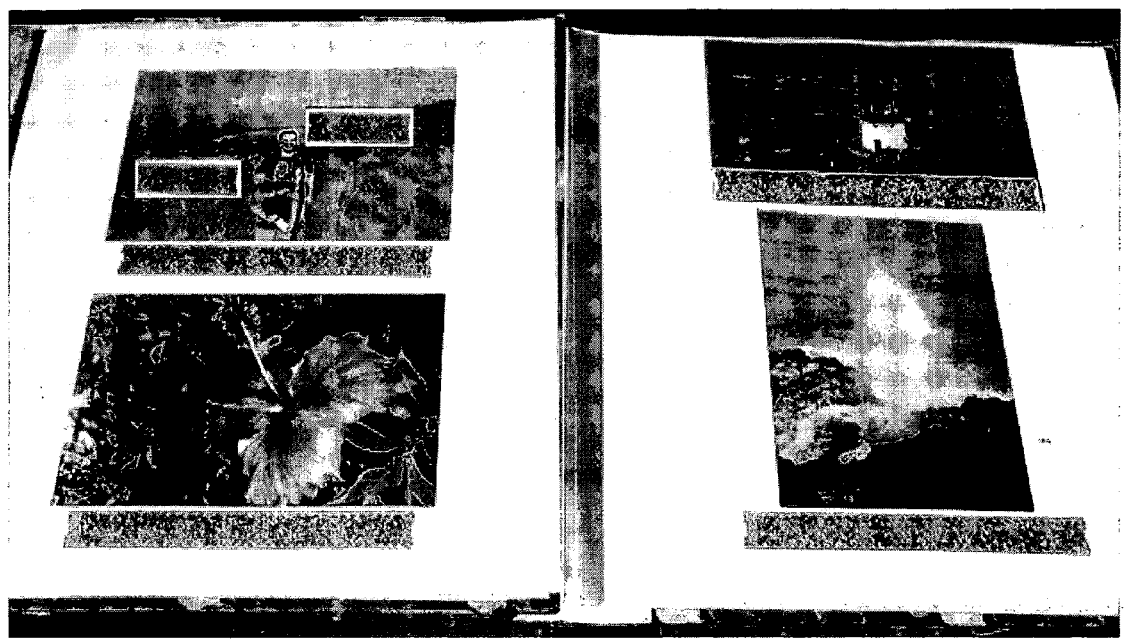
FIG. 41 is a pictorial view of a scrapbook that will be used to describe an application of the disclosed embodiments of the present invention.

FIG. 41 is a pictorial view of a scrapbook that will be used to describe an application of the disclosed embodiments of the present invention. The scrapbook includes a plurality of articles, such as photographs, clippings, or other similar materials having identifiers affixed near the bottom of the images or at other selected locations.

Figure 42:
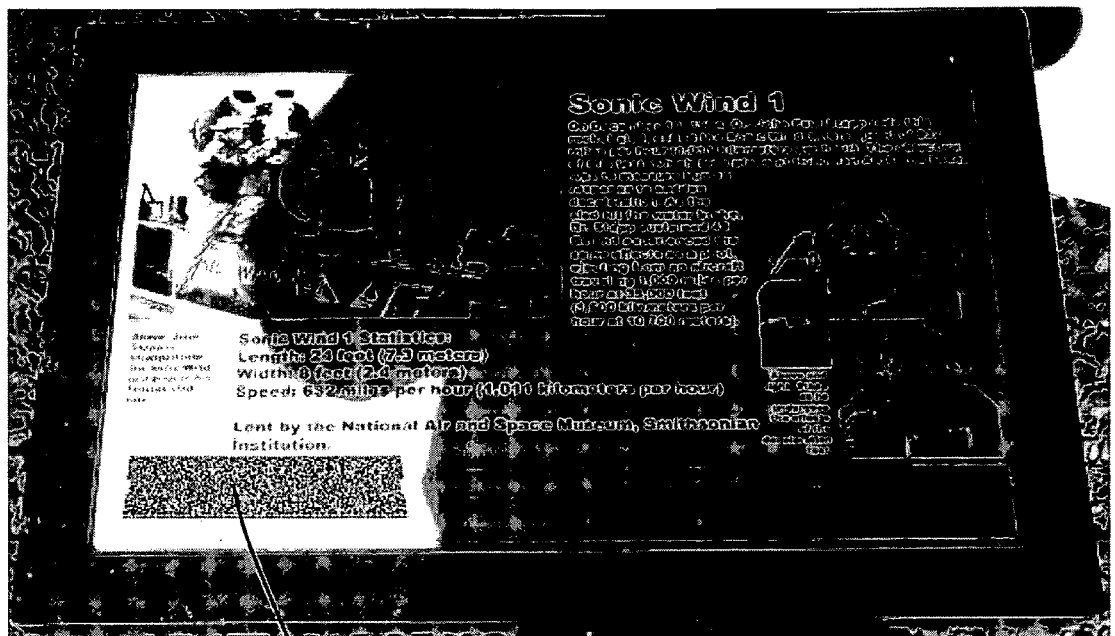
FIG. 42 is a pictorial view of a museum presentation panel that will be used to describe another application of the disclosed embodiments of the present invention.

FIG. 42 is a pictorial view of a museum presentation panel that will be used to describe another application of the disclosed embodiments of the present invention. The museum presentation panel includes one or more identifiers that are affixed to the panel that include audio content that may be suitably decoded to provide a further description of the subject matter on the panel.

Figure 43:
FIG. 43 is a pictorial view of a public display sign that will be used to describe still another application of the disclosed embodiments of the present invention.

FIG. 43 is a pictorial view of a public display sign that will be used to describe still another application of the disclosed embodiments of the present invention. The public display sign includes one or more identifiers having audio content that may be decoded to provide further information. For example, an identifier positioned on the "no smoking" sign may include audio content that may be used to direct a person that decodes the audio content to an area where smoking is permitted.

FIG. 44A through FIG. 44D are pictorial views that will be used to describe still another application of the disclosed embodiments of the invention. In the present application, multiple identifiers are applied to a manufactured article, such as, for example, a box of candy. In FIG. 44A, an identifier, such as a sem@code is generated by a reader, as described in greater detail above. In FIG. 44C, the reader reads the sem@code and the sem@code is applied to a selected candy article. In FIG. 44D the candy article having the sem@code is positioned adjacent to another piece of candy labeled with a different identifier from FIG. 44B.

Figure 45:
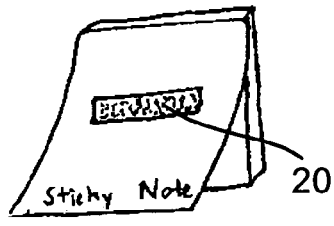
FIG. 45 are pictorial views that will be used to describe still further applications of the disclosed embodiments of the invention.
Figure 45:
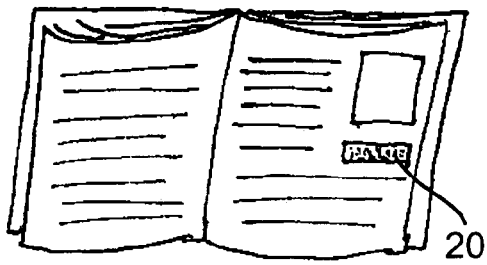
Figure 45:
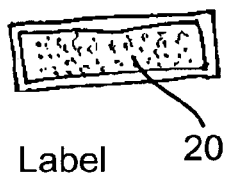
Figure 45:
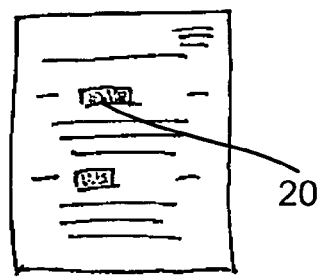
Figure 45:
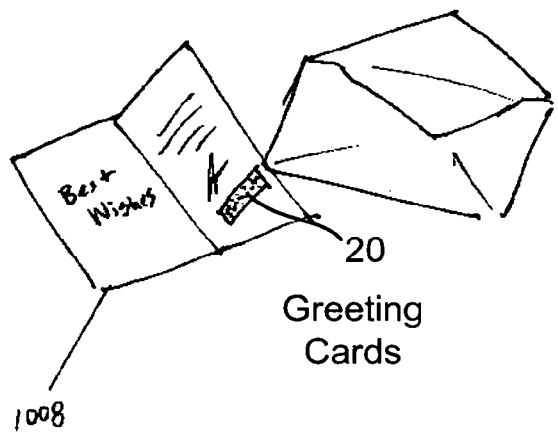
Figure 45:
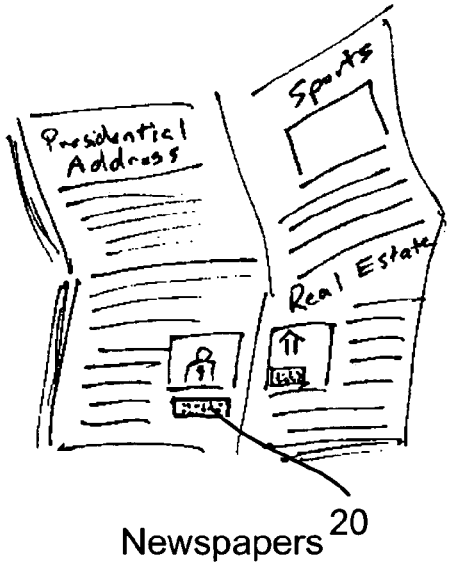
Figure 45:
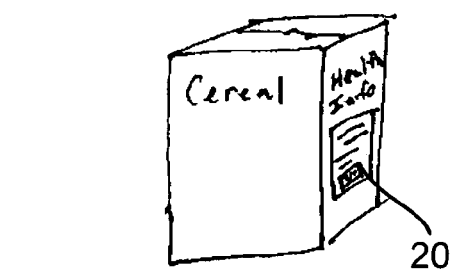

FIG. 45 are pictorial views that will be used to describe still further applications of the disclosed embodiments of the invention. In the present application, an identifier 20 is applied to a notepad book, a label, a resume, a greeting card, a newspaper, and on a container, such as a side of a box. A particular embodiment includes the identifier 20 having EXIF, pre-defined messages and time and/or date stamps. Under EXIF, generating replicates of original sound-containing identifiers are consistently duplicated to maintain the voice and sound fidelity of the original identifier. Other applications are possible, wherein one or more identifiers are applied to semi-rigid materials, or rigid materials, such a metal by stamping, embossing, or by other similar processes. For greeting cards, for example, the identifier 20 may contain pre-recorded messages, such as "Merry Christmas" or "Happy New Year".

Figure 46:
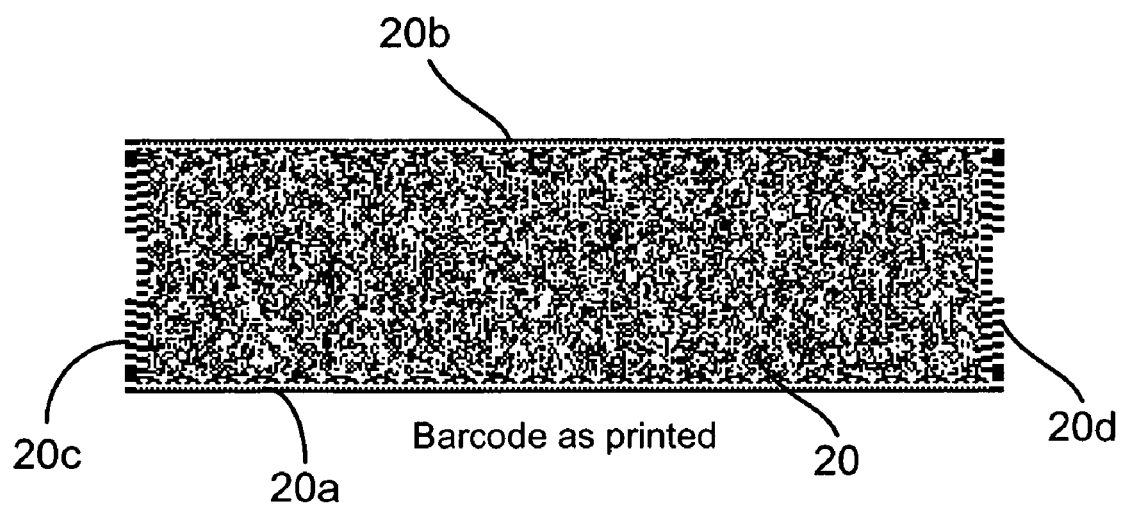
FIG. 46 is an illustration of a printed identifier according to an embodiment of the invention.

FIG. 46 is an illustration of a printed identifier 20 according to an embodiment of the invention. The identifier 20 includes an internal region 20b having a predetermined pattern of black and white boxes that form pixels. The arrangement of the pixels or equivalent digital data units generally depends on a selected coding algorithm used to encode speech and sound signals. The arrangement is further generally dependent on a desired degree of redundancy in the identifier. In a particular embodiment, up to 25% to 50% or more digital data units may be repeated. Such redundancy would prevent the loss information in a portion of the identifier that was damaged or loss. The pixels contained within the identifier 20 may also be subdivided into different regions that provide alphanumeric information and/or sound or a selected combination of alphanumeric information and sound. Various portions of the pixels within the identifier 20 may also provide a password protection using a PIN, public key cryptography, or password-challenge systems. Along a perimeter of the identifier 20, code patterns 20a and 20b may provide data information governing the framing and shape of the identifier 20. Patterns 20c and 20d may be left and right headers, respectively, and provide data information regarding image density of the pixels or other digital forms contained within the identifier 20. Digital data units may alternatively be stored in three dimensions. In one specific embodiment, a horizontal axis is less than approximately about six inches in length and a vertical axis is less than approximately about one-inch in length, although other suitable dimensions may also be used. In another embodiment, the digital data units may be configured to store up to a predetermined amount of speech or audio content. In a specific embodiment, the predetermined amount of speech or audio content is approximately about eight seconds. Data storage capacity may be increased by increasing an area of the identifier and/or by providing a higher pixel density. Digital data units may encode sound data, voice data, text data, image data, software, or any other data including encryption data. In one specific embodiment, the digital data units encode voice sounds. Therefore, in this embodiment, the digital data units are not merely reference data that points to pre-recorded voice sounds stored in a in memory device.

Figure 47A:
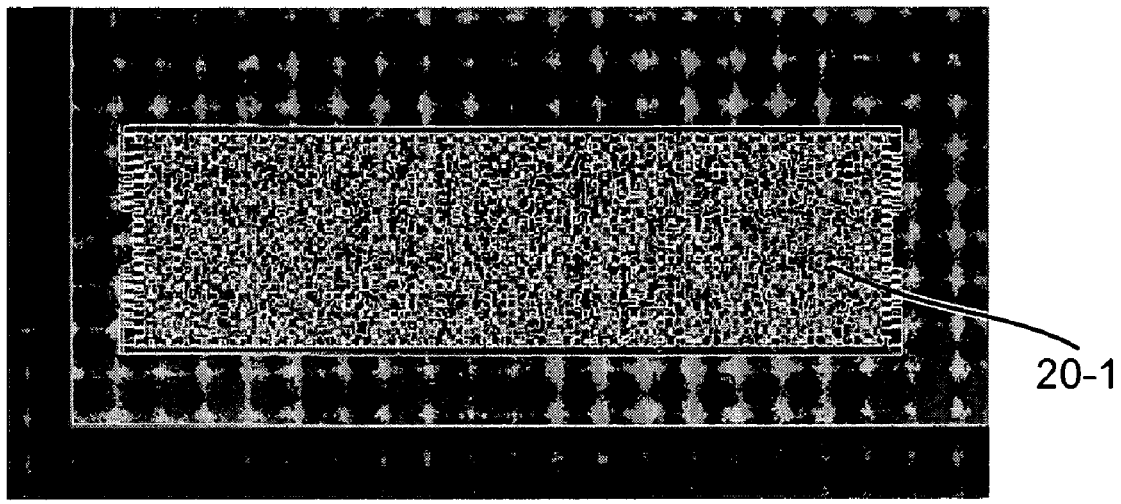
FIG. 47A and FIG. 47B are pictorial representations of identifiers 20-1 and 20-2, respectively, that will be used to describe a method of image enhancement that may be used to correct a degraded image of an identifier, according to still another embodiment of the invention.
Figure 47B:
Figure 47B:
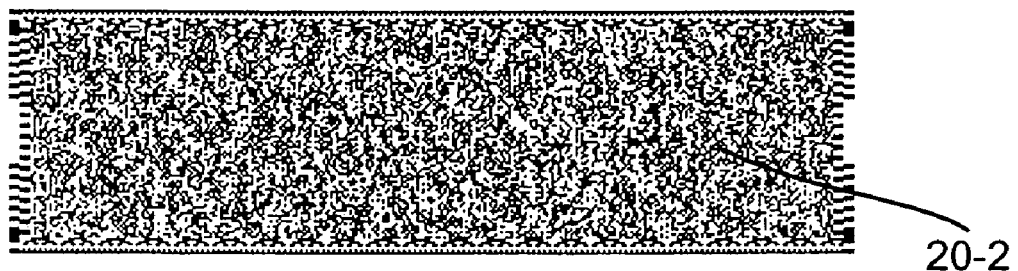

FIG. 47A and FIG. 47B are pictorial representations of identifiers 20-1 and 20-2, respectively, that will be used to describe a method of image enhancement that may be used to correct a degraded image of an identifier, according to still another embodiment of the invention. FIG. 47A shows an identifier 20-1 that is degraded by photographic reproduction, or by other similar processes. The identifier 20-1 accordingly exhibits an uneven background in which at least a portion of the pixels are not properly discernable due to blurring, or due to improper focus of a reproducing device. To restore the identifier 20-1 so that a suitable resolution and clarity is obtained, the image correction algorithms described in connection with FIG. 31 are applied to the identifier 20-1. For example, the gamma correction, unsharp filters, contrast filters and other filters that are described in detail above may be applied to the identifier 20-1 to obtain the identifier 20-2, as shown in FIG. 47B. It is understood that other image enhancements may be applied to the identifier 20-1 to obtain the identifier 20-2, including brightness corrections, contrast corrections, and sharpening and threshold corrections. The restored identifier 20-2 advantageously produces a high fidelity reproduction of the degraded identifier 20-1.

Figure 48:
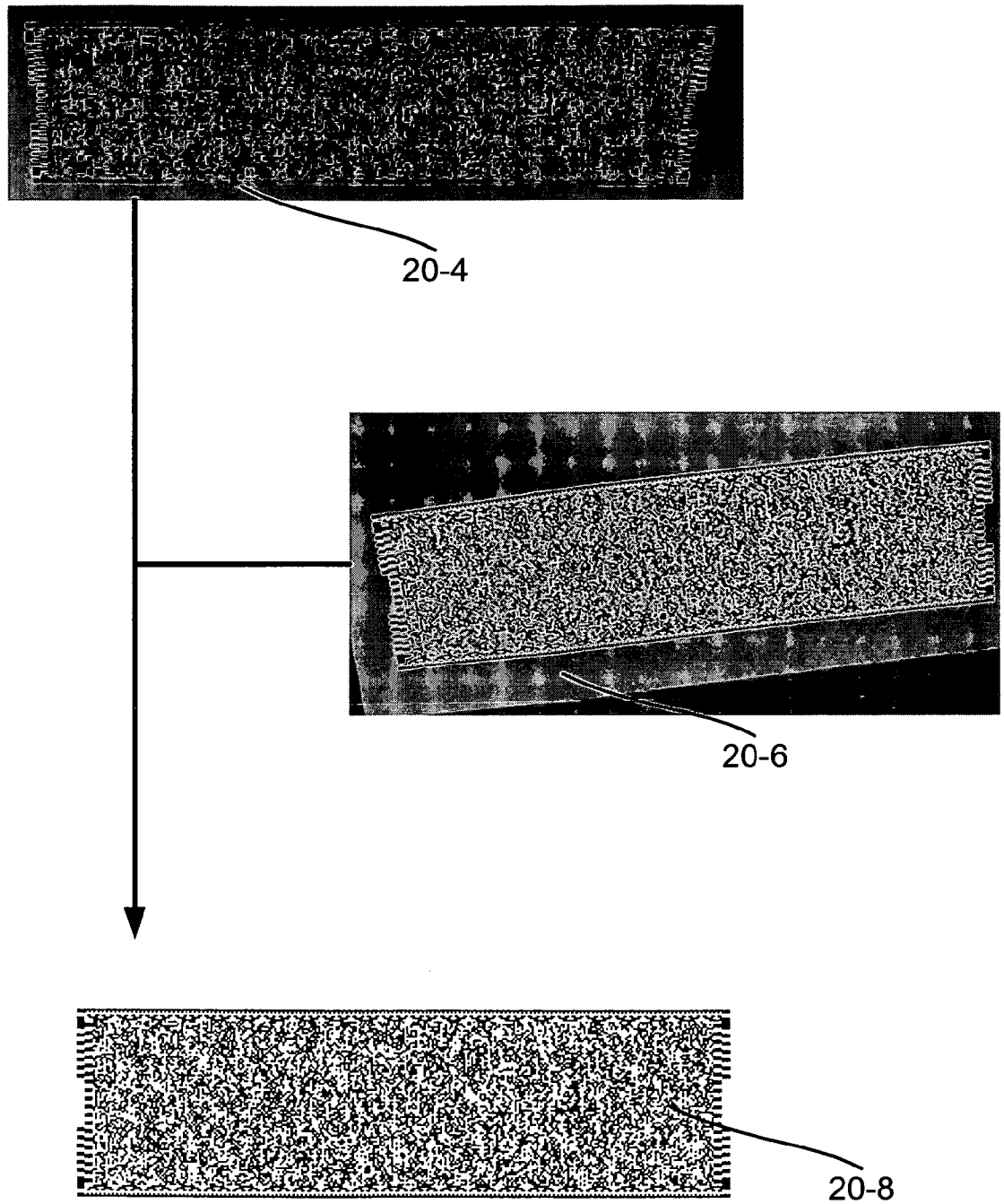
FIG. 48 includes pictorial representations of identifiers that will be used to further describe the enhancement of image-degraded identifiers.

FIG. 48 includes pictorial representations of identifiers 20-4, 20-6 and 20-8 that will be used to further describe the enhancement of image-degraded identifiers. An identifier 20-4 suffers from distortion caused by warping of a supporting surface or due to improper camera positioning. The identifier 20-6 is similarly distorted due to a skewing or a rotation. To restore the resolution and clarity of the original identifier 20 as shown, for example, in FIG. 46, image processing algorithms were applied to correct the identifiers 20-4 and 20-6. Specifically, the distortion correction algorithms from process block 360-26 of FIG. 31 have been applied. An image-enhanced identifier 20-8 results from applying the distortion correction algorithms outlined in FIG. 32. In particular, the identifier 20-8 benefits from of the de-skewing correction algorithm 360-26-1, the de-rotation algorithm 360-26-5, the de-barreling algorithm 360-26-9, the de-pincushioning algorithm 360-26-16, along with contrast enhancement algorithms 360-12 and threshold adjustment algorithm 360-22 of FIG. 32.

Figure 49:
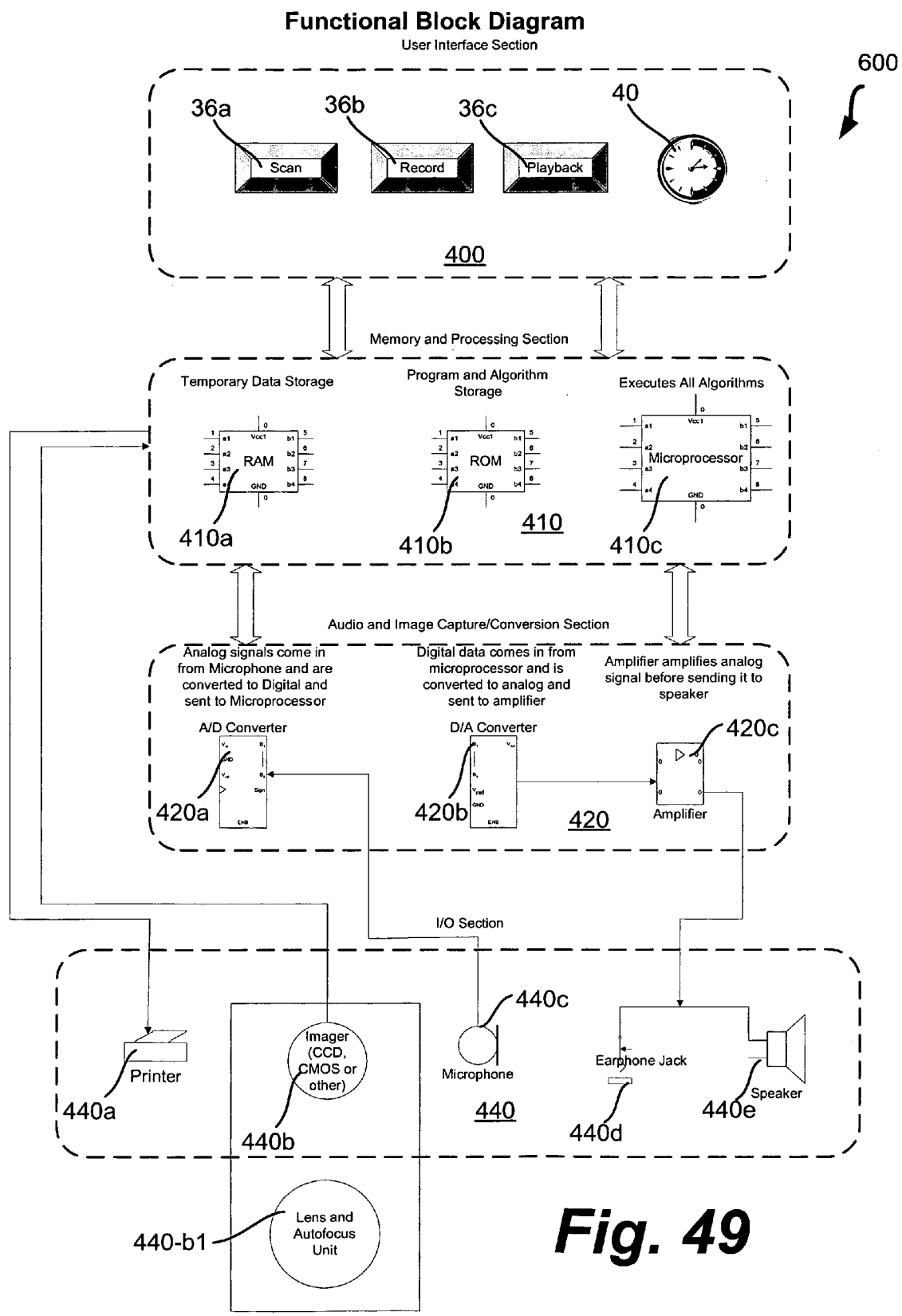
FIG. 49 is a functional block diagram of a handheld reader according to an embodiment of the invention is a functional block diagram of a handheld identifier reader.

FIG. 49 is a functional block diagram of a handheld reader 600, according to an embodiment of the invention. The reader 600 includes a button block 200 that further includes a scan button 36a, a record button 36b, a playback button 36c, and a timer display 40. The timer display 40 may provide an numeric representation of an elapsed time value, or it may present the representation of the elapsed time value in the well-known analog watch dial format. The button block 400 is functionally coupled to a memory and processing section 410 that further includes a RAM-based temporary data storage 410a, a ROM-based program and algorithm storage 410b, and a microprocessor-based algorithm executor 410c. The memory and processing section 410 is operably coupled to an audio and image capture conversion section 420 that performs analog-to-digital and digital-to-analog conversions. Accordingly, the audio and image capture conversion section 420 includes an A/D converter 420a, a D/A converter 420b, and an amplifier component 420c. The A/D converter 420a receives analog signals from a microphone 42 and converts the audio signals to digital signals that are suitable for further processing by the microprocessor 410c. The D/A converter 420b receives digital data from the microprocessor 410c and it converts it to analog form that may be communicated to a speaker. The amplifier 420c amplifies the audio analog signals, if required, before the audio signals are communicated to a speaker. The memory and processing section 410 and the audio image capture/conversion section 420 are also operably coupled with an input/output (I/O) section 440. The I/O section 440 may be operably coupled to a printer 440a, an imager 440b, a microphone 440c, an earphone jack 440d, and a speaker 440e. The imager 440b may also include camera-like devices, for example CCD, CMOS, Foveon or Foveon X3 direct image sensor devices, or other devices capable of recording an optical image. The printer I/O subsection component 440a operably interacts with the printer as previously illustrated in FIG. 11 and FIG. 12. Alternately, the printer 46a and other printers as shown in FIGS. 1, 3, 4, 6, 7, 13B, and 14A may also be used. The I/O subsection microphone 440c may operably interact with the microphones 42 and 142 shown in FIG. 2 through FIG. 10, FIG. 10C, and FIG. 14. The imager 440b may also include a lens and an auto focus unit 440b-1.

Figure 50:
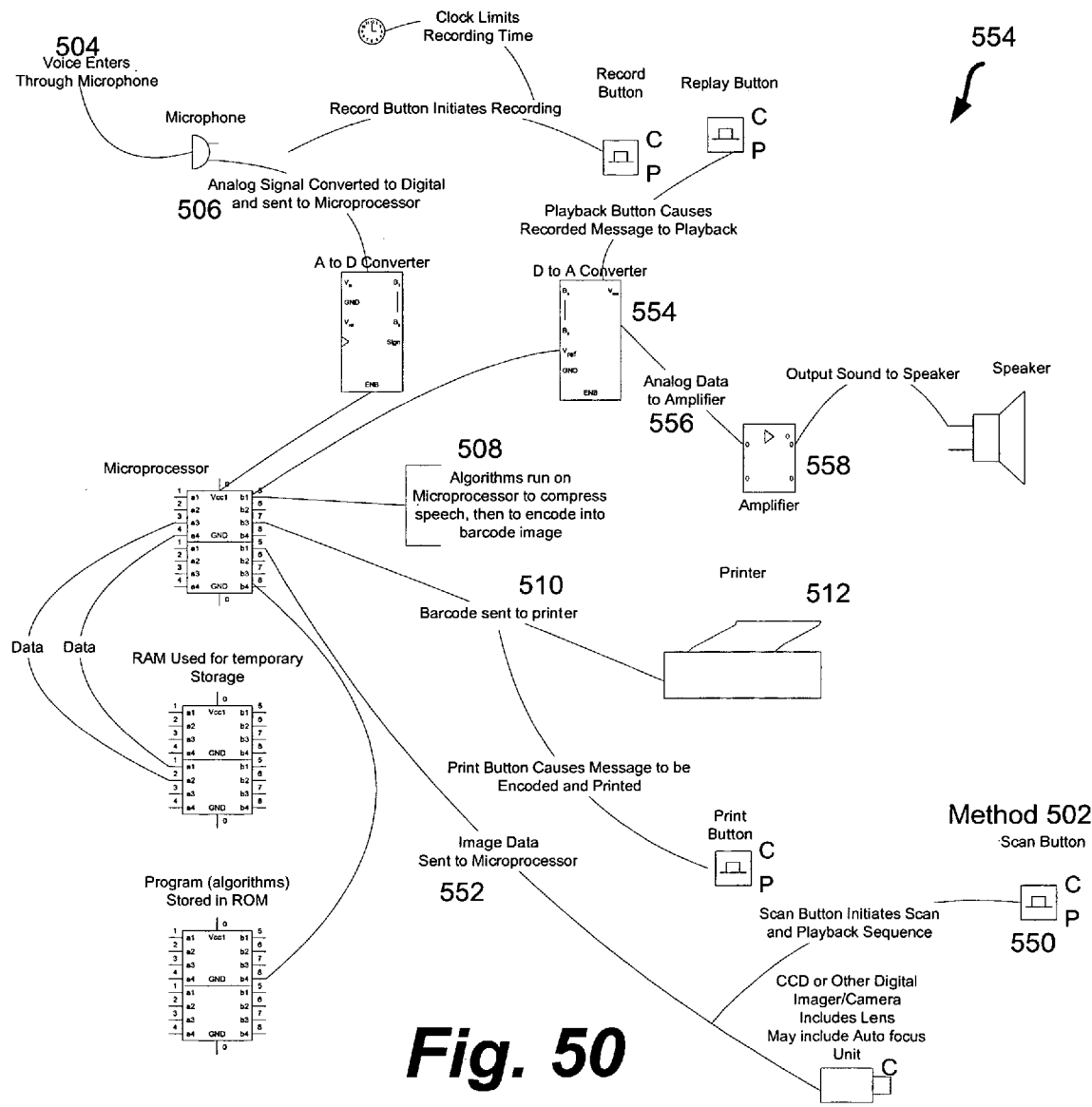
FIG. 50 is a schematic diagram that will be used to describe a method of recording audio content and generating identifiers, according to an embodiment of the invention.

FIG. 50 is a schematic diagram that will be used to describe a method 500 of recording audio content and generating identifiers, according to an embodiment of the invention. At block 504, analog audio and//or voice data is acquired by a microphone. The analog audio and/or voice signal is converted to a digital signal at block 506. Suitable algorithms within the microprocessor compress the digital signal and create the identifier pixel patterns at block 508. At block 510, the resulting pixel pattern is transferred to a printer operable to print the identifier at block 512. In one specific embodiment, the identifier is printed automatically as audio and/or voice data enters the microphone. Although block 512 includes a printing operation, it is understood that if the identifier is non-pigmented, the identifier may be applied to a semi-rigid or rigid substrate by stamping or embossing the identifier on the surface.

Alternately, at block 550, a user may indicate that an identifier is to be scanned by actuating a scan button. At block 552, the resulting scan image is sent to a microprocessor for processing. At block 554, the image data is converted to an analog signal by a digital to analog (D/A) converter. At block 556, the resulting analog data is sent to an amplifier to generate an analog signal having a sufficient power level to drive a loudspeaker. At block 558, the resulting amplified analog signal is transferred to a loudspeaker.

FIG. 51 is a table of compressor/decompressor algorithms (CODECs) for encoding audio sound into an identifier. The selected CODEC generally depends upon the amount of information contained within a given identifier and the desired level of audio quality to be recorded within the identifier. The audio quality level generally depends upon a selected CODEC since different bit rate responses are present in different CODECs to accommodate different recording requirements. Different CODECs may also exhibit different time delays even though a given CODEC offers a variable bit rate (VBR) to accommodate different audio environments. The different CODECs may also include packet loss concealment (PLC) that removes silent periods that may occur when there is a loss of data within the identifier or when the identifier is read. As shown in detail in FIG. 52, the CODECs may include Speex, iLBC, AMR-NB, AMR-WB, G.729, GSM-FR, GSM-EFR, G.723.1, G.728, and G.722, although other suitable alternatives may also be used.

Figure 52:
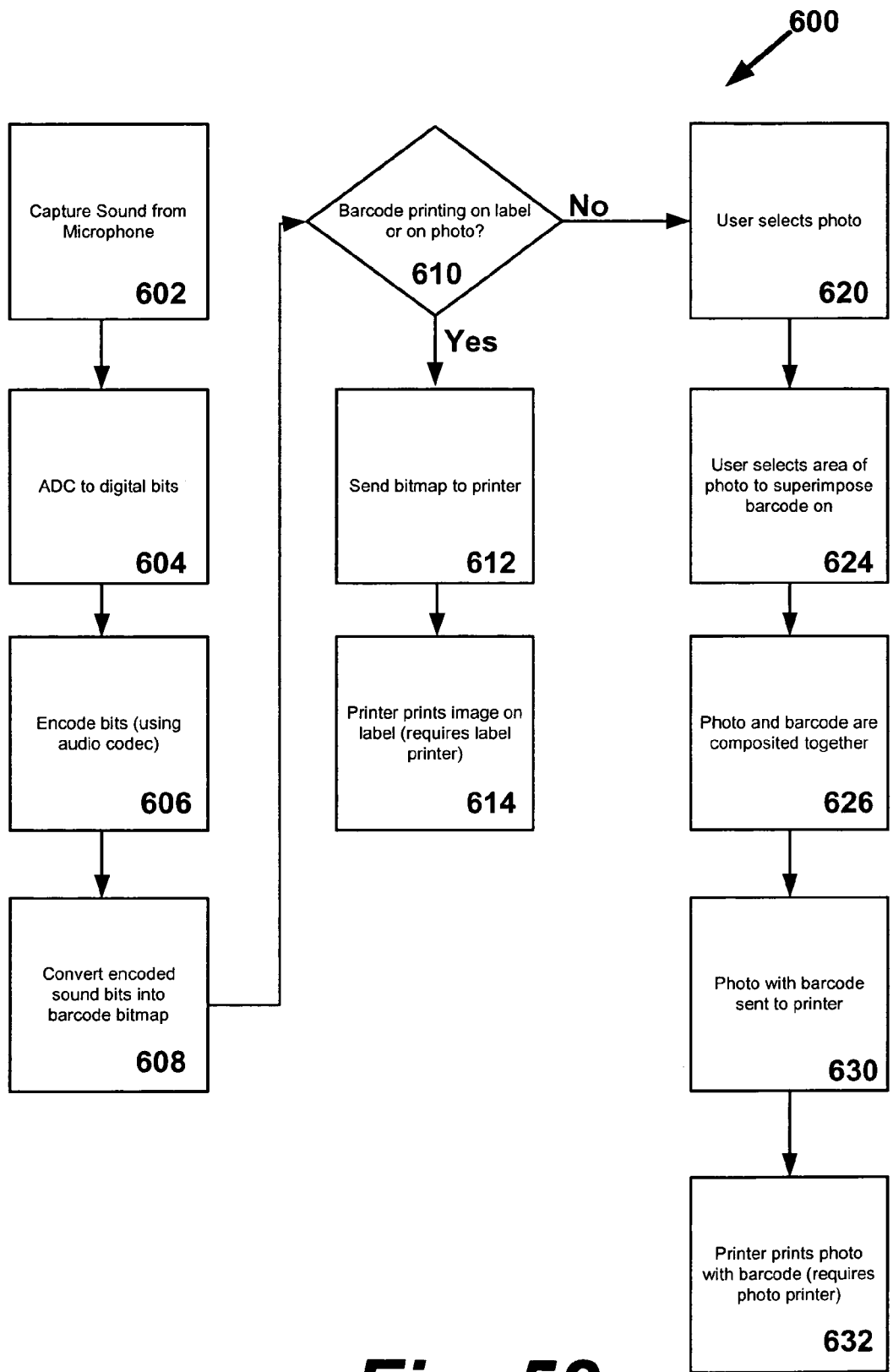
FIG. 52 is a basic encode algorithm.

FIG. 52 is a basic encode algorithm. The basic encode algorithm 600 of FIG. 52 begins with capturing sound from a microphone at block 602. The sound that is captured is converted to digital form at block 604. The digital form is encoded using an audio CODEC at block 606. At block 608, the encoded sound bits are converted into an identifier bitmap. Following process block 608, a decision diamond 610 is reached that has a query "barcode printing on label or on photo?" If the answer is to this query is "yes" then at block 612, the bitmap is sent to the printer. This affirmative branch from the decision diamond 610 then concludes with process block 614 wherein the printer prints the image of the identifier on a label. If on the other hand, the decision to the query posed in decision diamond 610 is "no" then the negative branch from decision diamond 610 begins with the user selecting a photo at block 620. Once the photo is selected, the user selects an area of the photo to superimpose the identifier upon. Thereafter, at block 626, the photo and the identifier are merged. The merged image is then sent to an image printer at block 630. Thereafter, the negative branch from the decision diamond 610 concludes with the printer printing the photo and the identifier together at block 632.

Figure 53:
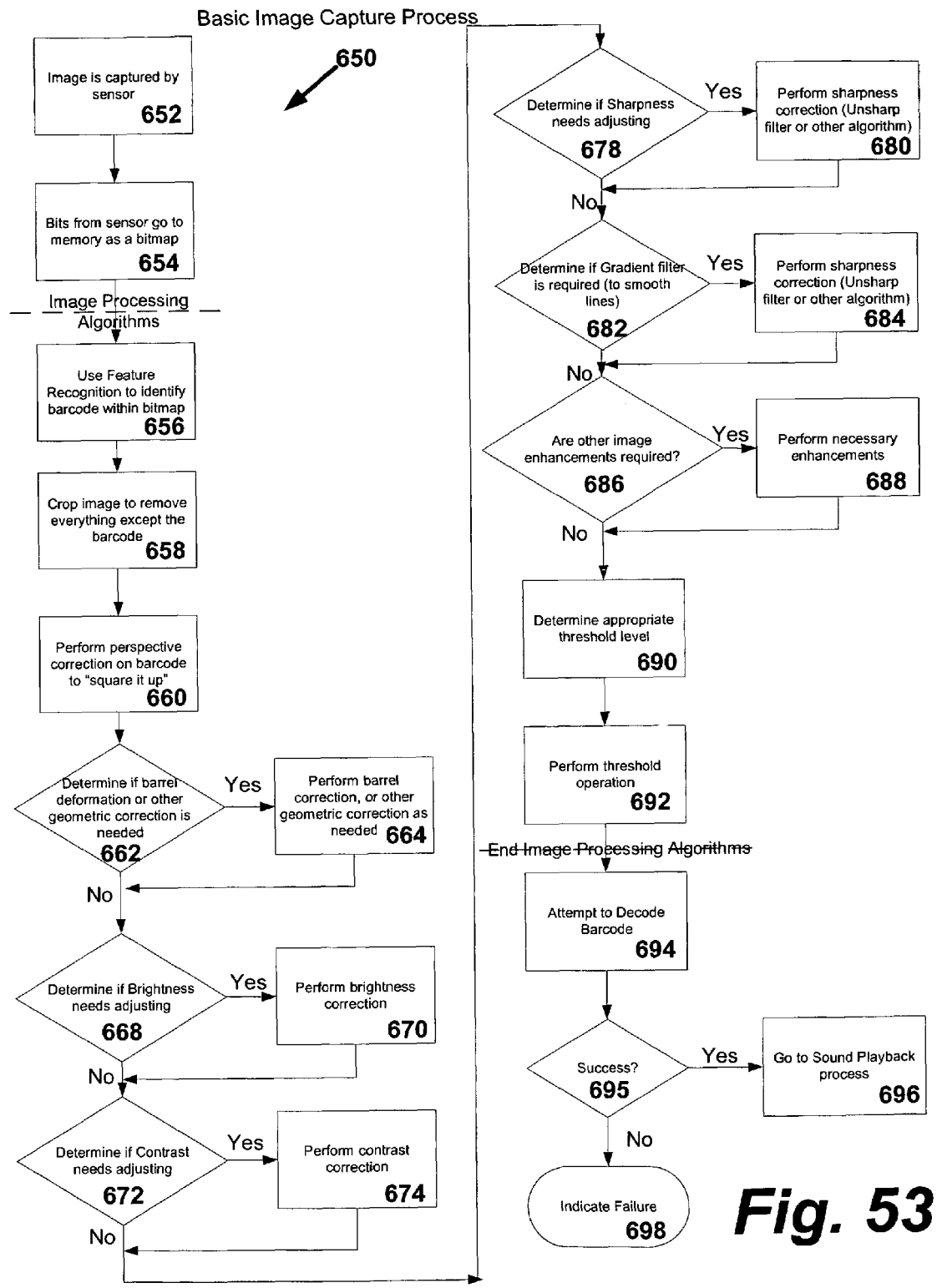
FIG. 53 is a basic image capture process algorithm.

FIG. 53 is a basic image capture process algorithm 650. The image capture process algorithm 650 begins with an image captured by a sensor at block 652. Once the image is captured by the sensor, bits from the sensor are directed into memory and stored as a bitmap file at block 654. After block 654, image processing algorithms commence at block 656 where the identifier within the bitmap is identified using a feature recognition algorithm. Once the identifier is identified, the image is cropped at block 658 to remove any extraneous content. Once the barcode is suitably cropped at block 660, a perspective correction algorithm is applied to ensure that the identifier is suitably rectangularized. Once the identifier is suitably rectangularized at decision diamond 662, a task is presented to determine if the barrel correction or other geometric correction is needed. If a barrel correction or other distortion algorithms is required for correction, then at block 664, barrel correction or other geometric correction algorithms are engaged to correct for this distortion. After correction of distortion at process block 664, a task decision is reached in decision diamond 668 with the task to determine if brightness needs adjustment. If the answer to this task decision is "yes", then at process block 670, a brightness process is performed. At decision diamond 672, if the contrast needs adjustment, then at process block 674, a contrast correcting algorithm is performed. The next task decision query is reached to determine if sharpness needs adjusting at decision diamond 678. If sharpness adjustments is required, then at process block 680 a sharpness correction algorithm is applied using an unsharp filter or comparable algorithm. Thereafter, at decision diamond 682, a determination is made to determine whether or not an image gradient filter needs to be applied. If an image gradient filter needs to be applied, then at block 684 an unsharp filter or comparable algorithm is used. Thereafter, another task query is presented at decision diamond 686 to determine if other image enhancements are required. If the answer to this query is "yes" then at process block 688, the necessary enhancements are performed. The basic image capture process algorithm then continues at process block 690 to determine the appropriate threshold level and followed by process block 692 to perform the threshold operation at the appropriate threshold level. After process block 692, the image processing algorithms are completed and attempts are made at process block 694 to determine whether or not the identifier has been successfully decoded. If there has been a successful decoding of the identifier, then at process block 696, the sound played back process algorithm is initiated. If the answer to this query is "no" then failure is so indicated at block 698.

Figure 54:
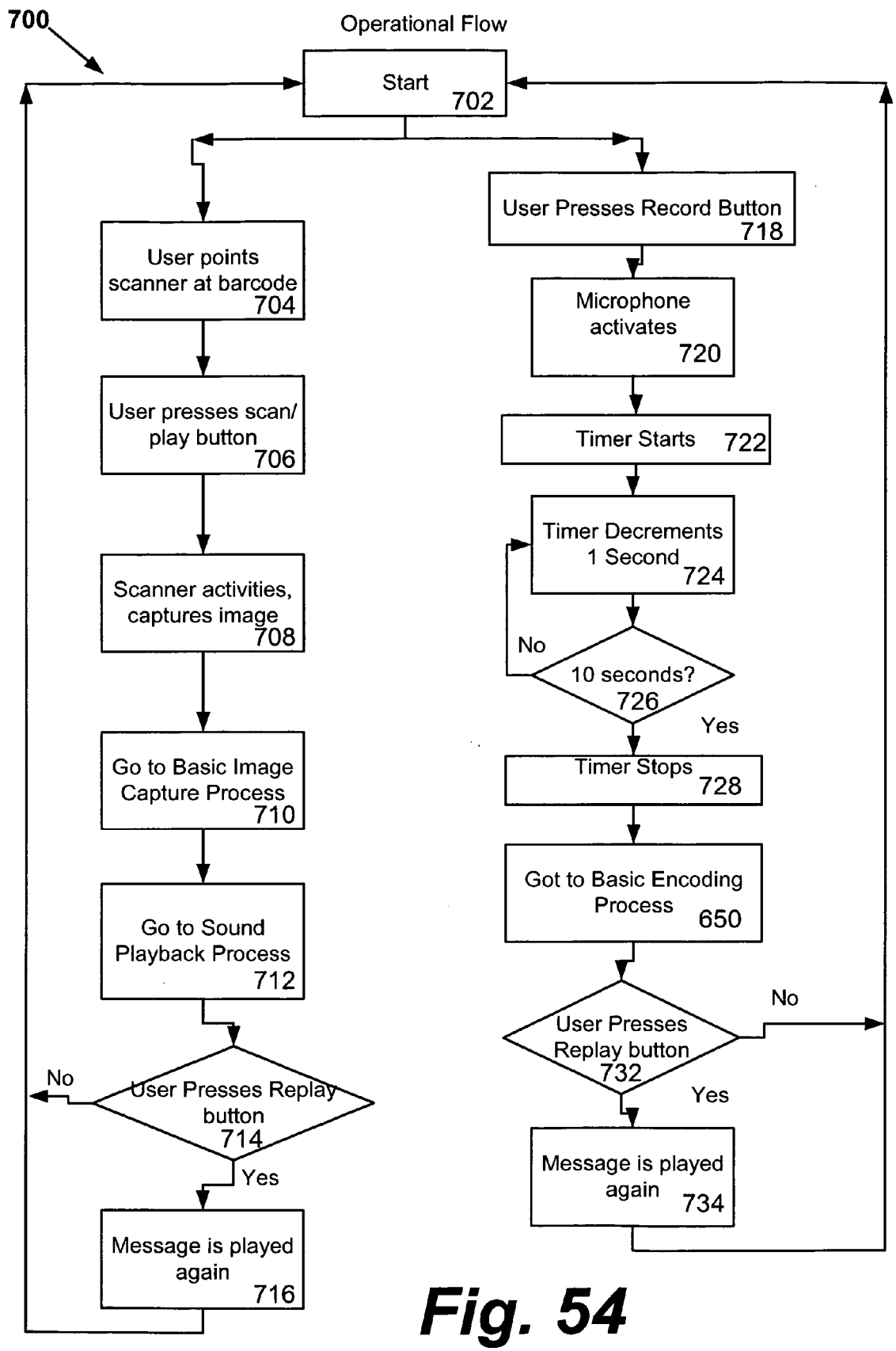
FIG. 54 is an operational flow process block diagram.

FIG. 54 is an operational flow process block diagram 700. At block 702, two-parallel cycle paths are engaged. At process block 704, a user points the scanner at the identifier followed by block 706 where a user activates the scan/play button. Upon activating the scan/play button at process block 708, the scanner activates and captures the image. Once the image is captured at process block 710, the basic image capture process algorithms are engaged as described in the preceding FIG. 53. Once the basic image capture process algorithms are engaged at process block 710, the sound playback process is engaged at process block 712. Thereafter, a decision diamond 714 is reached where a task is presented to a user for pressing the replay button. If the replay button is pressed under the "yes" exit point, then at process block 716, the message is played again. If on the other hand, the user does not press the playback button, then at the negative or "no" exit, the cycle begins again at start block 702. Another wing from the start block 702 begins with block 718 where the user presses the record button. Upon pressing the record button at block 720, the microphone is activated. Thereafter at block 722, the timer is started in which at block 724, the timer may be implemented in 1 second decrements, or other decremented values and a query is then presented in decision diamond 726 whether or not to use other larger decrements. If the answer to the query is negative, then the 1 second decrement of process block 724 is retained. If the decision is in the affirmative, then the larger time decrements are used, then block 728 is reached wherein the timer is stopped. Once the timer is stopped, then the basic encoding algorithms 650 are used as previously described. After using the basic encoding algorithms as outlined in process 650, a task query is presented in decision diamond 732 where the user determines whether or not to press the replay button. If the decision diamond is "yes" to press the replay button, then at block 734, the message is played again and the cycle repeats back to the start block 702. If the decision is not to press the replay, then the message is not played again and the process restarts at start block 702.

Figure 55:
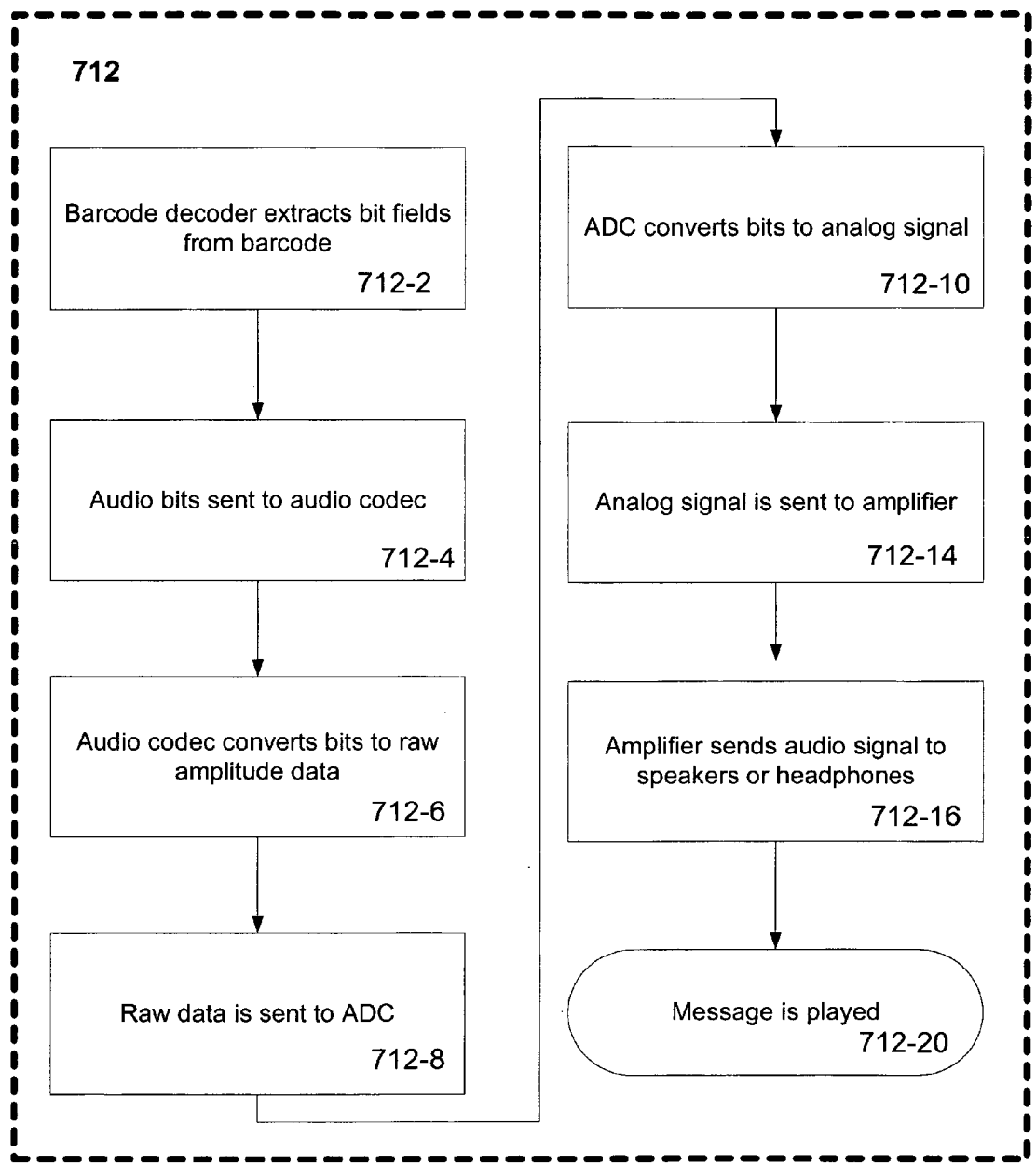
FIG. 55 is a sound playback algorithm.

FIG. 55 is an expansion of the sound playback algorithm 712. The sound playback algorithm 712 includes and begins with process block 712-2 where the identifier decoder extracts bit fields from the identifier. Once the bit fields are extracted, then at block 712-4, audio bits are sent to the audio CODEC. Once the audio bits have been received by the audio CODEC, then at block 712-6, the audio CODEC converts the bits to raw amplitude data. The raw amplitude data is then sent for analog digital conversion at process block 712-8. At process block 712-10, the ADC conversion is a reversal of an analog to digital in that the digital is converted to an analog signal. Thereafter, at process block 712-14, the analog signal is sent to an amplifier so that it may be amplified to a level that is discernable by a listener. At process block 712-16, the amplifier sends audio signals to speakers or headphones. Then the sound playback algorithm is completed at terminus 712-20 where the message is played and a listener hears the message either on speakers or headphones.

Figure 56A:
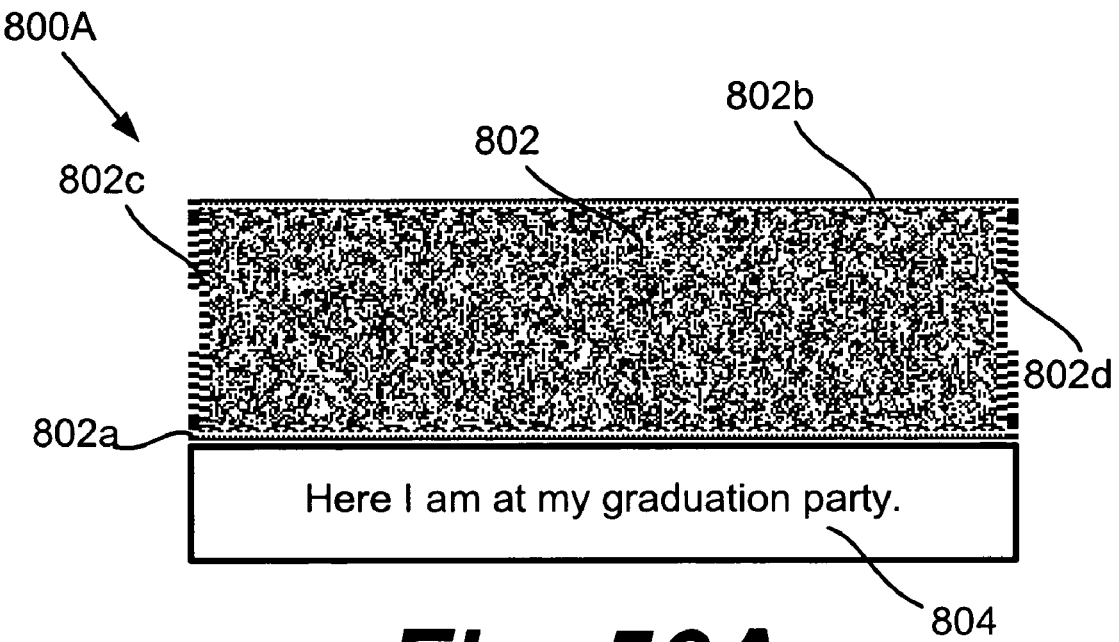
FIG. 56A is an alternate identifier embodiment.

FIG. 56A is an alternate identifier embodiment. Identifier 800A is a two section identifier having a 2D barcode pixel section 802 and an alphanumeric section 804. The pixel section 802 includes a bottom border 802a, a top border 802b, and side borders 802c and 802d. The pixel section 802 comprises substantially rectangular shaped pixels that contain encoded information, including encoded sounds and/or speech. The encoded information may be configured to have encoded speech and/or sound recordings from multiple sources. For example, a speaking subject and a speaking narrator may be suitably encoded on the identifier 800A. Adjacent to the pixel section 802 is the alphanumeric section 804 that includes a translation of the speech content of the voice or voices encoded in the pixel section 802. The identifier readers and generators of the previous systems may be configured to have respective speech-to-text and text-to-speech capabilities to perform respective generation and reading operations. The alphanumeric section 804 includes a text message that may include any desired text message. For example, the section 804 of FIG. 56A includes the text message: "Here I am at my graduation party." The alphanumeric section 804 is shown positioned below the pixel section 802, it may be placed on the top or on either side of the pixel section 802.

Figure 56B:
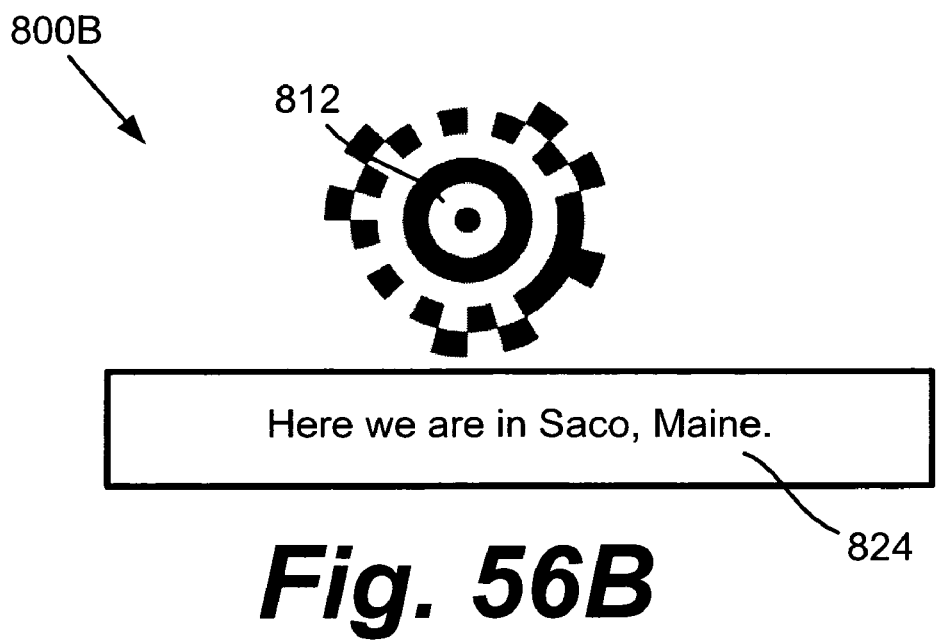
FIG. 56B is another identifier embodiment.

FIG. 56B is another identifier embodiment. Identifier 800B is comprised of a two section identifier having a 2D barcode pixel section 812 and an alphanumeric section 824 that is suitably shaped. The pixel section 812 has a circular configuration and includes concentric solid and dashed rings. The pixel section 812 contains encoded sound and/or speech and may be configured to have encoded speech and sound recordings from multiple sources, for example, a speaking subject and a speaking narrator (such as a cameraman). Adjacent to the pixel section 812 is the alphanumeric section 824 that has a text translation of the speech content of the voice or voices encoded in the pixel section 802. The identifier readers and generators of the previous systems may be configured to have respective speech-to-text and text-to-speech capabilities as needed to perform respective generation and reading operations of the circularly configured pixel section 802. The alphanumeric section 824 may include any desired text information. For example, the section 824 of FIG. 56B includes the message: "Here we are in Saco, Me." Other shapes are possible for the alphanumeric section 824 including an oval or circular or semi-circular shaped alphanumeric section 824 that is coaxially disposed around the pixel section 812.

Figure 56C:
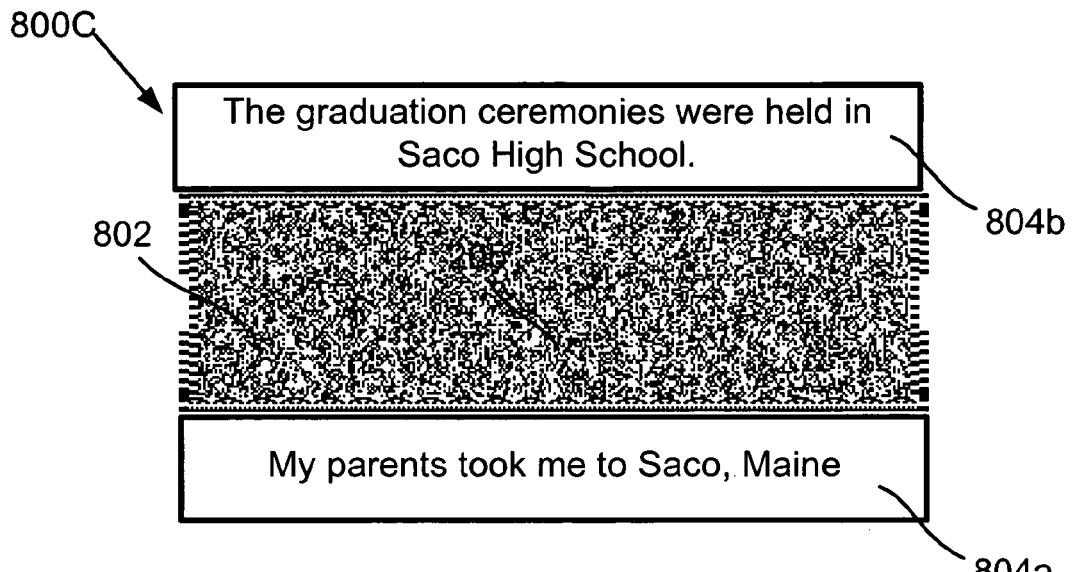
FIG. 56C is an alternate identifier embodiment.

FIG. 56C is an alternate identifier embodiment. Identifier 800C is a multi-section identifier having a suitably shaped 2D barcode pixel section 802 that is bounded by adjacent alphanumeric sections 804a and 804b. By example, the printed text message in the section 804a has a message translated from the subject-encoded portions of the pixel section 802 that reads "My parents took me to Saco, Me.". Similarly, the printed text message in the section 804b has a message translated from the narrator-encoded portions of the pixel section 802 that reads, "The graduation ceremonies were held in Saco High School".

Figure 56D:
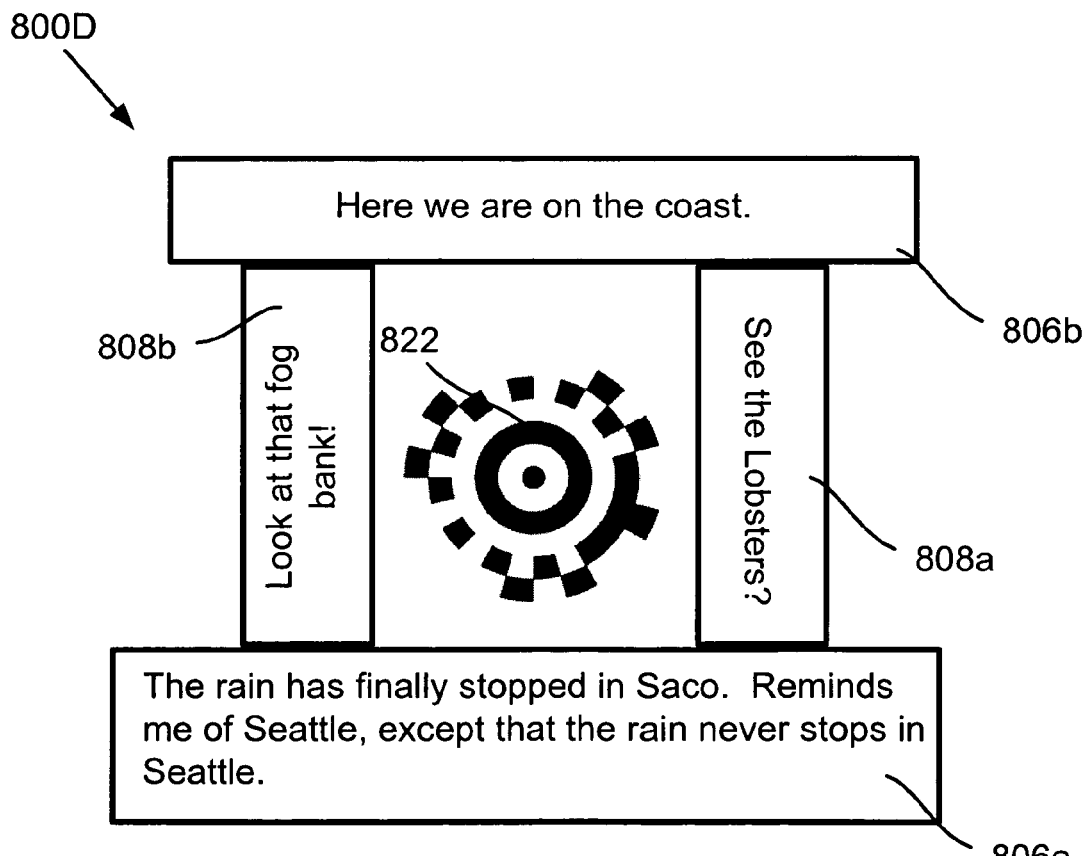
FIG. 56D is yet another identifier embodiment.

FIG. 56D is yet another identifier embodiment. Identifier 800D is a multi-section identifier having a generally circular shaped 2D barcode pixel section 822 that is bounded by alphanumeric sections 806a and 806b and alphanumeric sections 808a and 808b. As illustrated, the alphanumeric sections 806a-b and 808a-b are rectangular shaped, although they may be circular, elliptical, or semi-circular and coaxially disposed about the pixel section 822. Any desired text messaging may be included in the section 806a-b and 8-8a-b. By example, the printed text message in lower section 806a has a message translated from encoded portions of the pixel section 822 that reads, "The rain has finally stopped in Saco. Reminds me of Seattle, except that the rain never stops in Seattle". Similarly, the printed text message in the section 806b has a message that reads, "Here we are on the coast". The sections 808a and 808b respectively have printed messages that read "See the lobsters?" and "Look at that fog bank!" The messages in the sections 808a-b may be disposed in any desired orientation.

Figure 57:
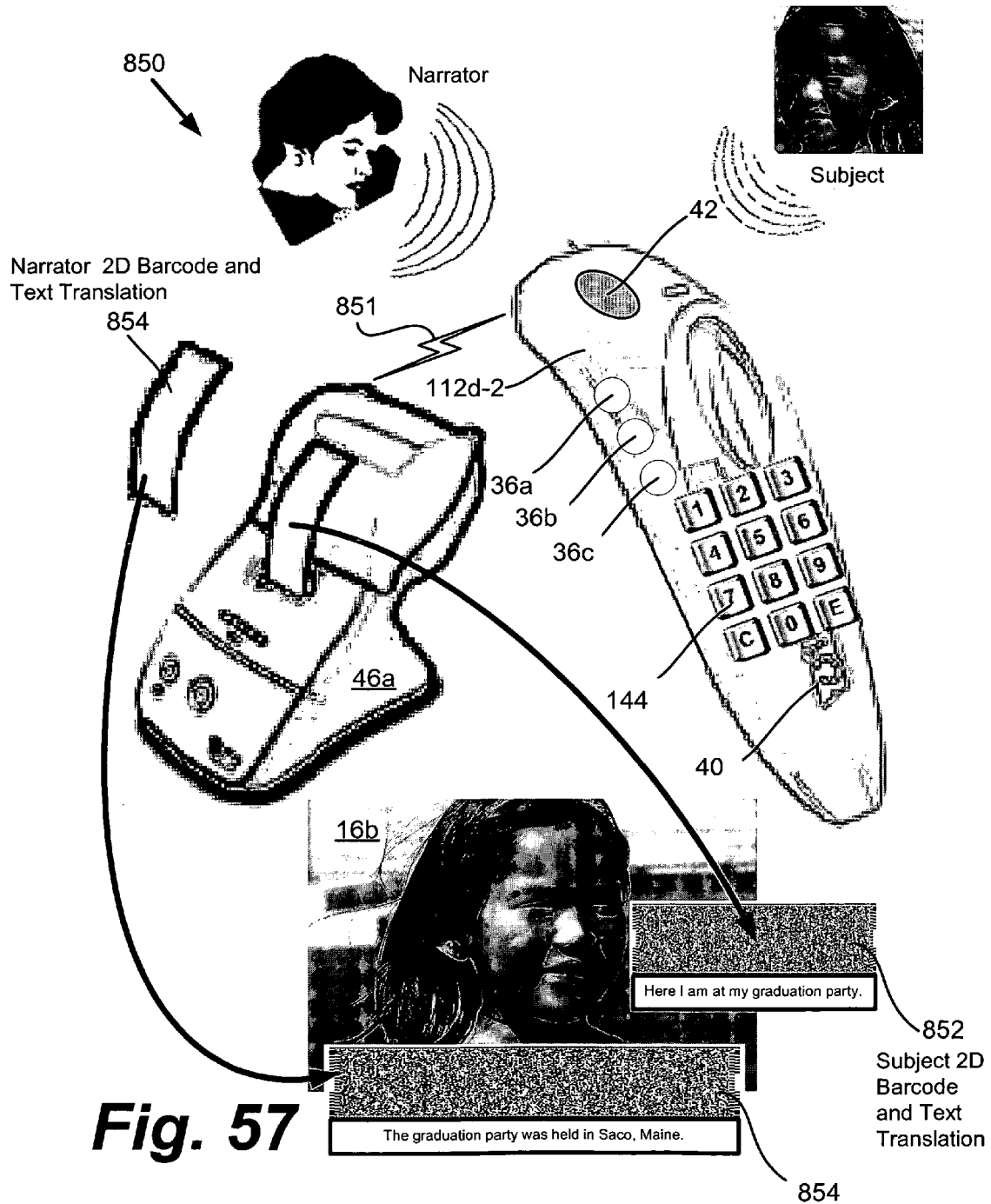
FIG. 57 schematically illustrates an alternate embodiment of an identifier generating system from a speaking subject and narrator.

FIG. 57 schematically illustrates an alternate embodiment of an identifier generating system 850 from a speaking subject and narrator. The generating system 850 includes a reader 112d-2 and a wireless printer 46a. The reader 112d-2 is a modification of the reader 112d in that reader 112d-2 further has microprocessors that execute algorithms to encode the speech into the pixel section of the identifier 852 and to perform speech-to-text translation that may be printed in an alphanumeric section of the identifier 852. The subject of image 16b speaks and the subject's voice is processed by the reader 112d-2 to encode the subject's speech into the pixel section of the identifier 852 and to perform the speech-to-text translation for the alphanumeric section of identifier 852.

Information pertinent to the subject's identifier 852 is relayed to the printer 46a through a wireless signal 851. Information pertinent to the narrator's identifier 854 may also be conveyed to the printer 46a. The printer 46a prints the multi-section identifiers 852 and 854 for separate application to the image 16b. Alternatively, the printer 46a may have microprocessors that execute algorithms to encode the speech into the pixel section of the identifier 852 and to perform speech-to-text translation that may be printed in the alphanumeric section of the identifier 852.

Figure 58:
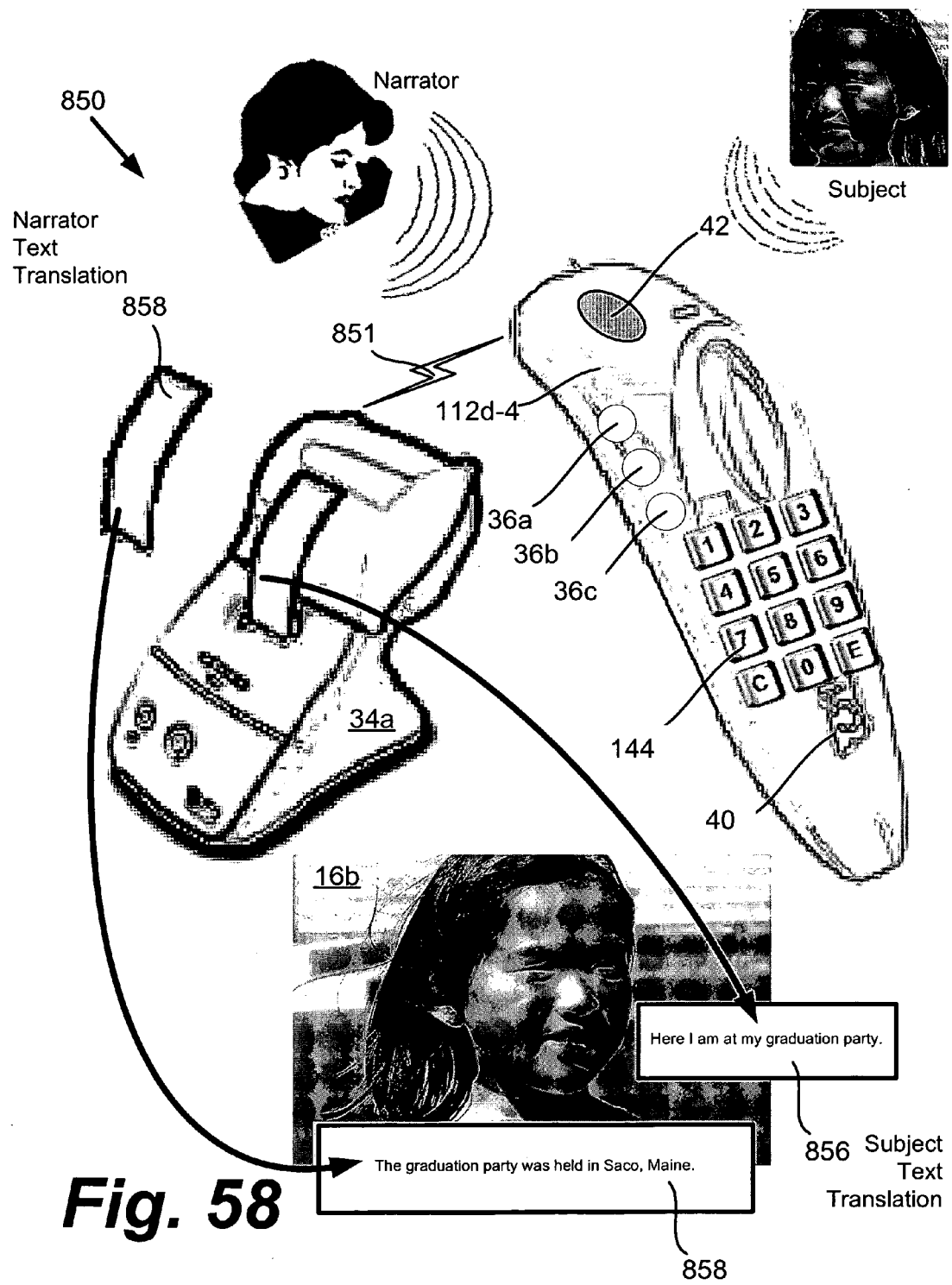
FIG. 58 illustrates another operation of the alternate embodiment depicted in FIG. 56.

FIG. 58 schematically illustrates another alternate embodiment of the system 850 of FIG. 56. The generating system 850 includes the reader 112d-2 that conveys information pertinent to the subject's identifier 856 and narrator's identifier 858 by a wireless signal 851. The printer 46a prints the subject and narrator's text translation with the alphanumeric sections of the respective identifiers 856 and 858. The printed translations for subject and narrator identifiers 856 and 858 may be separately applied to the image 16b.

Figure 59A:
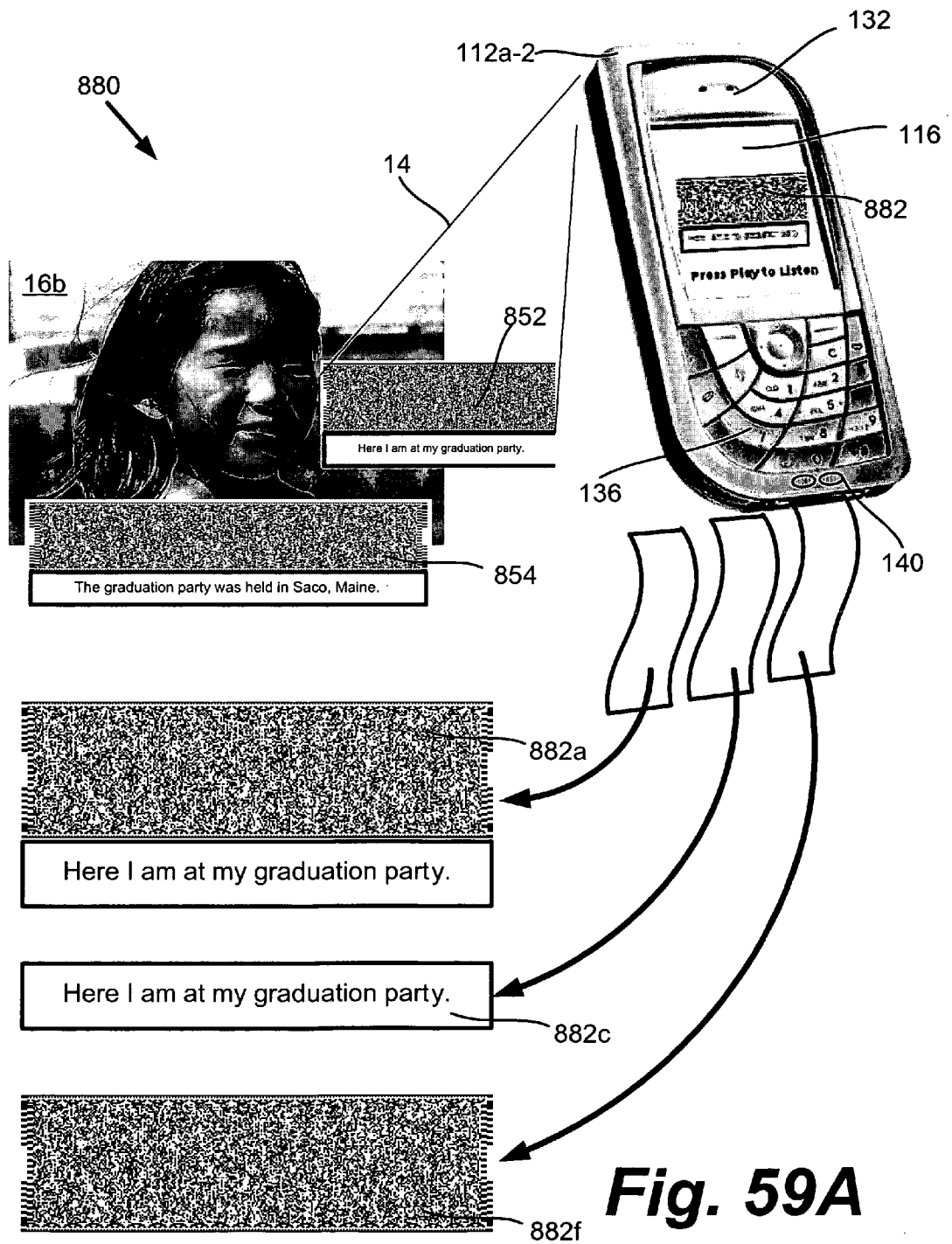
FIG. 59A is a schematic illustration of an alternate embodiment of an identifier generating system from an original identifier.

FIG. 59A is a schematic view of an alternate embodiment of an identifier generating system 880 from an original identifier. In the system 880, a combination reader/printer 112a-2 is employed. The reader/printer 112a-2 further includes suitable microprocessors that execute algorithms to reproduce identifiers that are duplicates that are replications of the pixel and alphanumeric sections, and the alphanumeric sections, or the pixel sections of a 2D identifier or barcode. As shown in FIG. 59, the subject identifier 852 that is affixed to the image 16b is scanned by the reader/printer 112a-2 and presents an identifier image 882 on the display 116. Through entries on the keypad 136, three identifier replicates, 882a-c of the original barcode 852 are generated by the reader/printer 112a-2. Identifier replicate 882a is a duplicate of the original identifier 852 in that the pixel and alphanumeric sections are printed. Identifier replicate 882b is a duplicate of the alphanumeric section in which a printed message "Here I am at my graduation party" of the original subject identifier 852 is duplicated. Identifier replicate 882f is a duplicate of the pixel section of the original identifier 852.

Figure 59B:
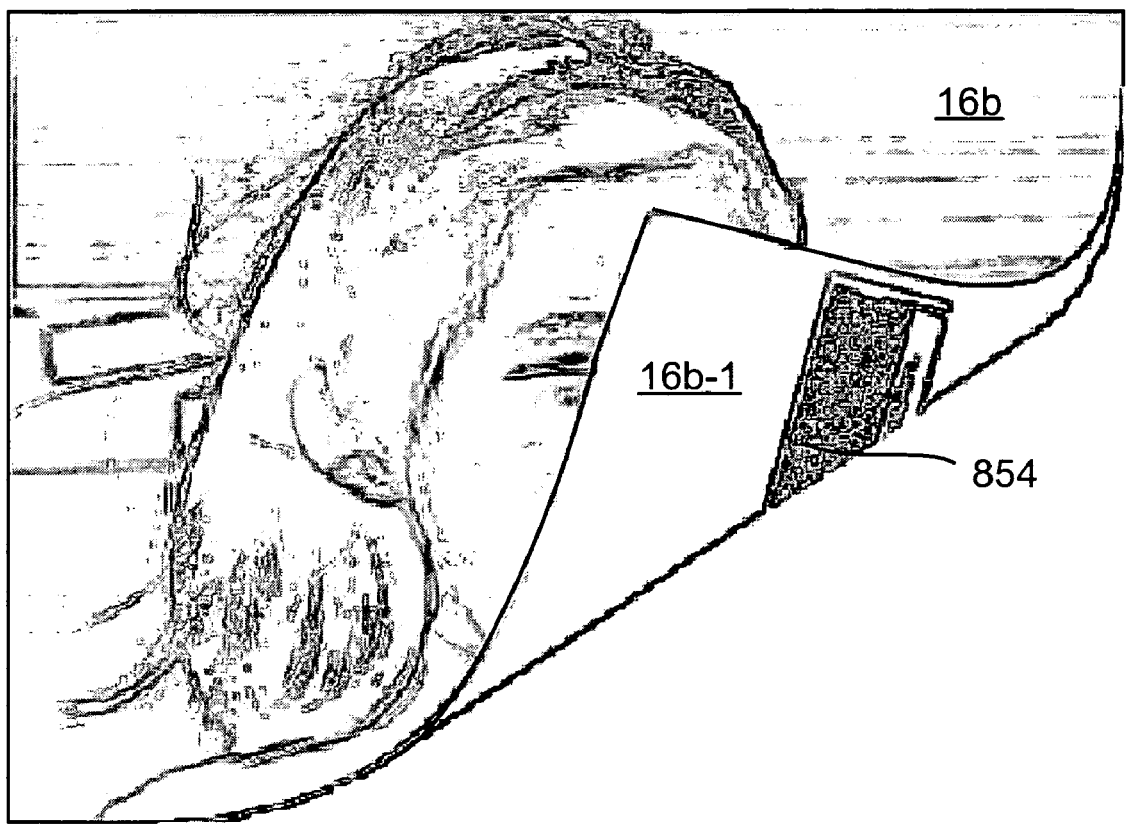
FIG. 59B schematically illustrates an alternate location for placing an identifier illustrated in FIG. 59A.

FIG. 59B schematically illustrates an alternate location for placing an identifier illustrated in FIG. 59A. The narrator identifier 854, reproduced similarly as the subject identifier or 2D barcode 852 from the original on the surface of image 16b, is placed on the backside 16b-1 of the sheet having the image 16B. The narrator identifier 854 includes the pixel section 802 and the alphanumeric section 804. In a like generic manner, the pixel section 802 or the alphanumeric section 804 may be applied or affixed to the backside 16b-1.

Figure 60:
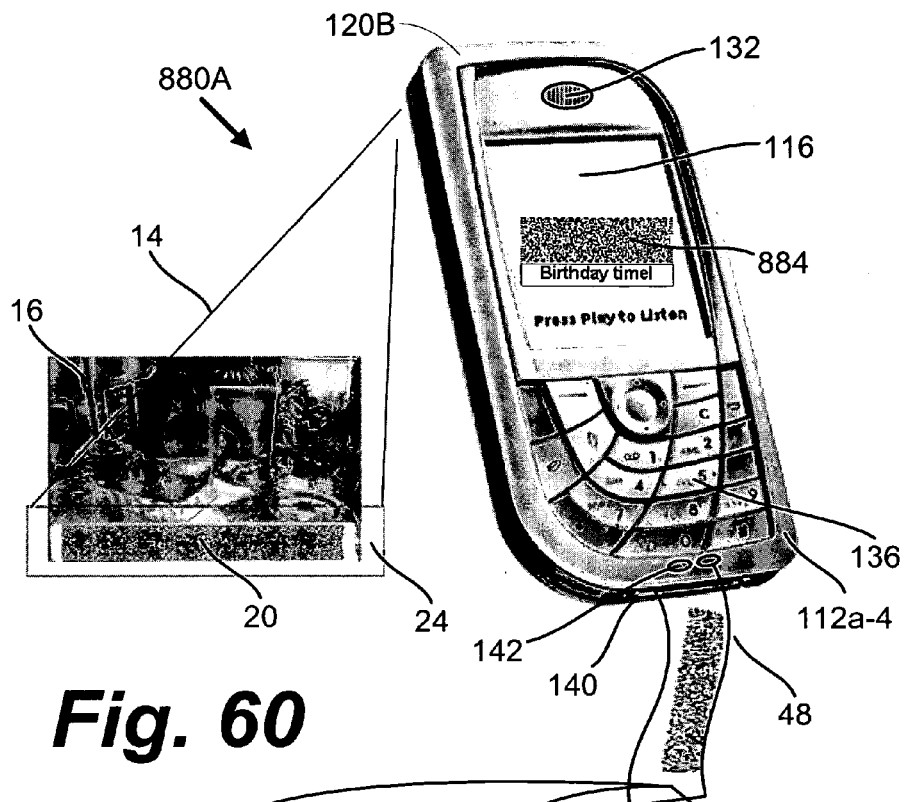
FIG. 60 is another alternate embodiment of an identifier generating system from an original identifier.
Figure 60:
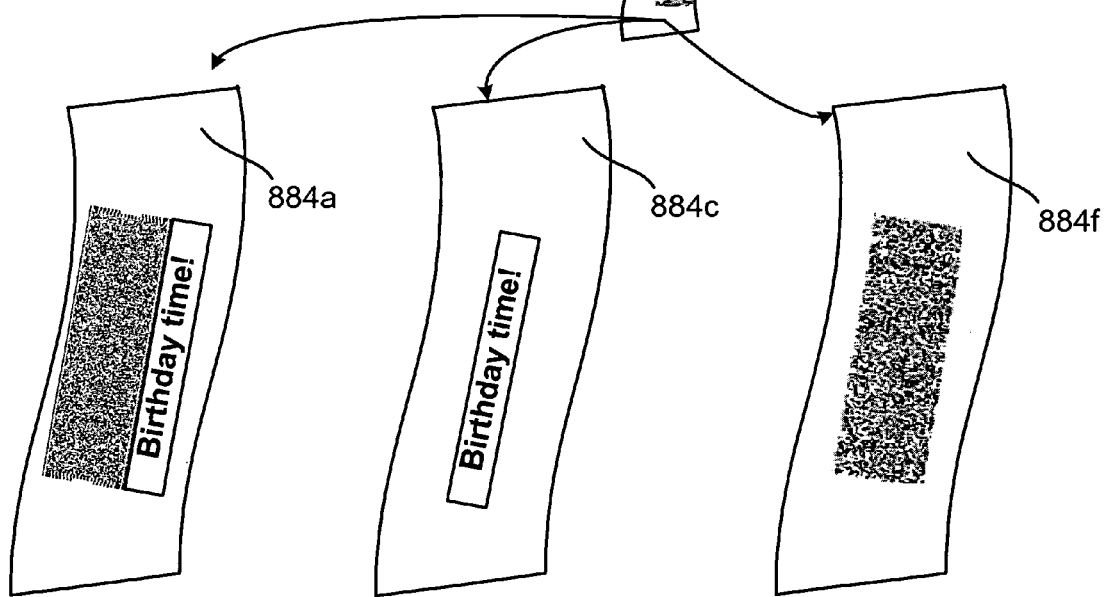

FIG. 60 is a schematic view of another alternate embodiment of an identifier generating system 880A from an original identifier. In the system 880A, a combination reader/printer 112a-4 is employed. The reader/printer 112a-4 further includes suitable microprocessors that execute algorithms to reproduce identifier pixel sections that are duplicates. The duplicates may be replications of the pixel sections or they may be translations of the pixel sections that include an original alphanumeric section, or a duplicate of the pixel section with an original alphanumeric section translation. The reader/printer 112a-4 reads and interprets the pixel portion of an identifier 20, translates the encoded speech contained within the original printed pixel array 20, and presents it as an image 884 having a pixel and text sections on the display 116. Through entries on the keypad 136, the identifier replicates, 884a-c of the original barcode 20 are generated by the reader/printer 112a-4. Identifier replicate 884a is a duplicate of the original identifier 20 with an original text translation printed in an alphanumeric section. The identifier replicate 884b is an original translation of the pixel identifier 20 message "Birthday Time!" The identifier replicate 884f is a duplicate of the original pixel identifier 20.

FIGS. 61A-D are schematic illustrations that will be used to describe the operation of another embodiment of the present invention. The system 900 of FIG. 61A-D includes a camera 200A and a printer 234 in wireless communication with the camera 200A. The printer 234 may also be suitably coupled to the camera 200A using metallic conductors or fiber optical conductors if desired.

Figure 61A:
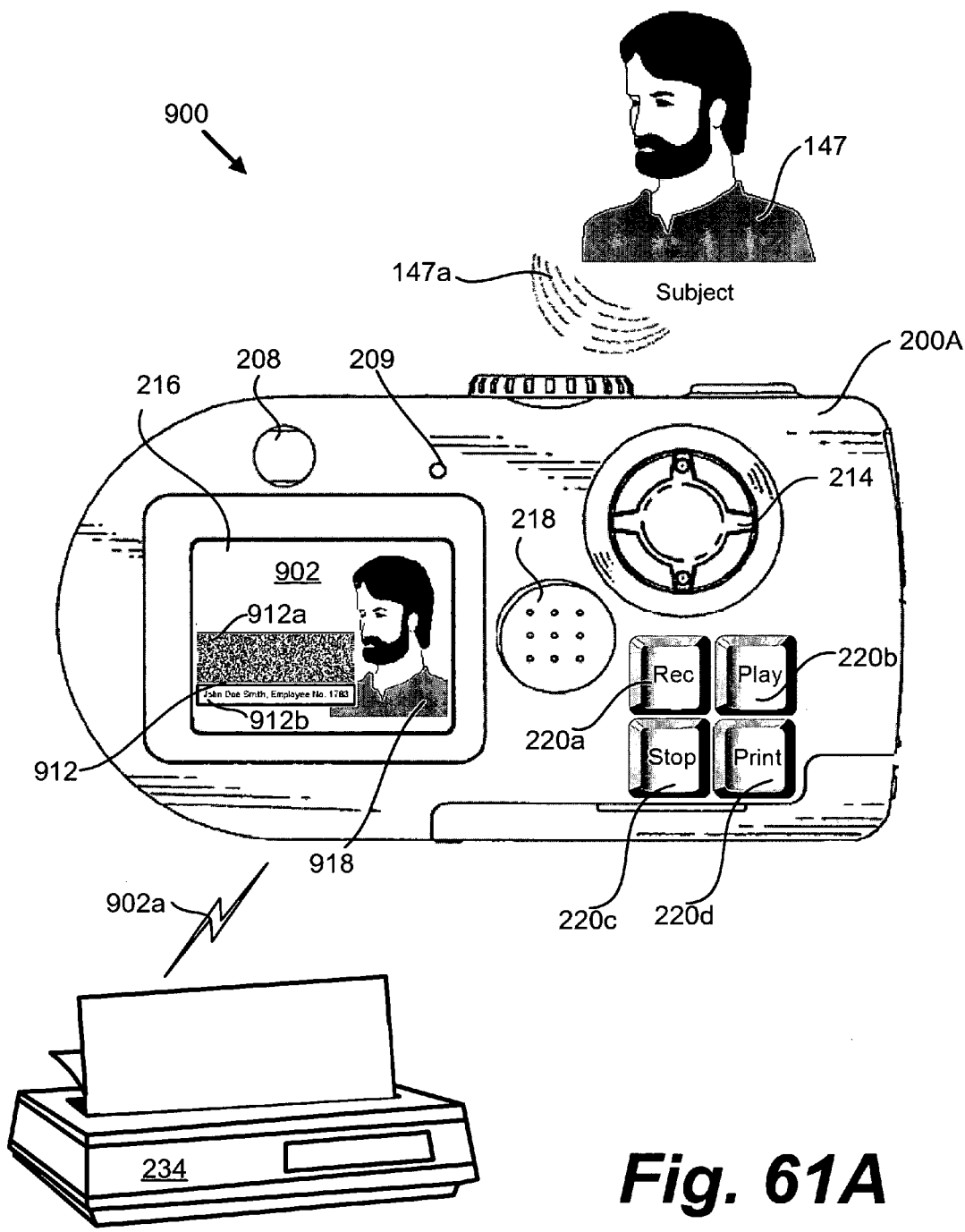
FIG. 61A illustrates the acquisition operation of sound and image of a speaking subject.

FIG. 61A illustrates the acquisition of a sound and an image of a speaking subject. The camera 200A includes suitable microprocessors that execute algorithms to process images and sound 147a acquired from the speaking subject 147 to generate a fused image 902. The fused image 902 may be viewed on the camera display 216, and includes an identifier component 912 merged with a subject image component 918. The identifier component 912 includes a multi-section identifier similar to the identifier 800A of FIG. 56A in that it has a pixel section 912a and a translated alphanumeric section 912b. The identifier component 912 of the fused image 902 may also include various details, as shown in FIGS. 56B-D. The identifier component 912 of the fused image 902 will be generated with the subject image component 918 so that a merged, printed image results. The identifier component 912b is an alphanumeric section with a displayed text that reads, "John Doe Smith, Employee No. 1783."

Figure 61B:
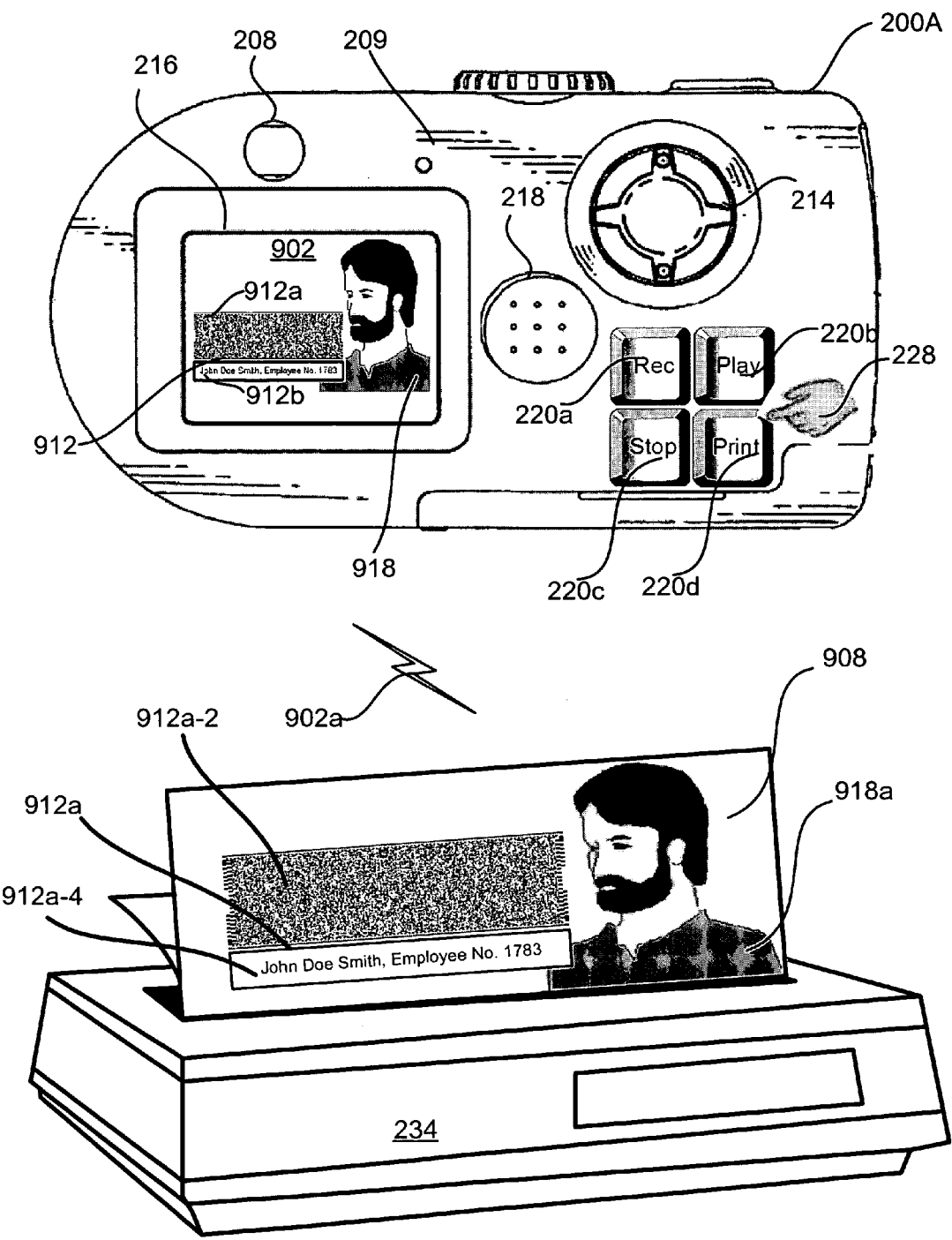
FIG. 61B illustrates a printing operation of the system shown in FIG. 61A.

FIG. 61B illustrates a printing operation of the system 900. An operator 228 presses the print key 220d so that the camera 200A sends information related to the fused image 902 to the printer 46a through wireless signals 902a. The printer 234 receives the signal 902a and the fused image 902 is printed on a paper 908. The identifier 912 is also printed as identifier 912a with the image 918 so that the image 918a results. The printed identifier 912a includes the pixel section 912a-2 and the alphanumeric section 912a-4. The alphanumeric section 912a-4 has the printed text message "John Doe Smith, Employee No. 1783", for example.

Figure 61C:
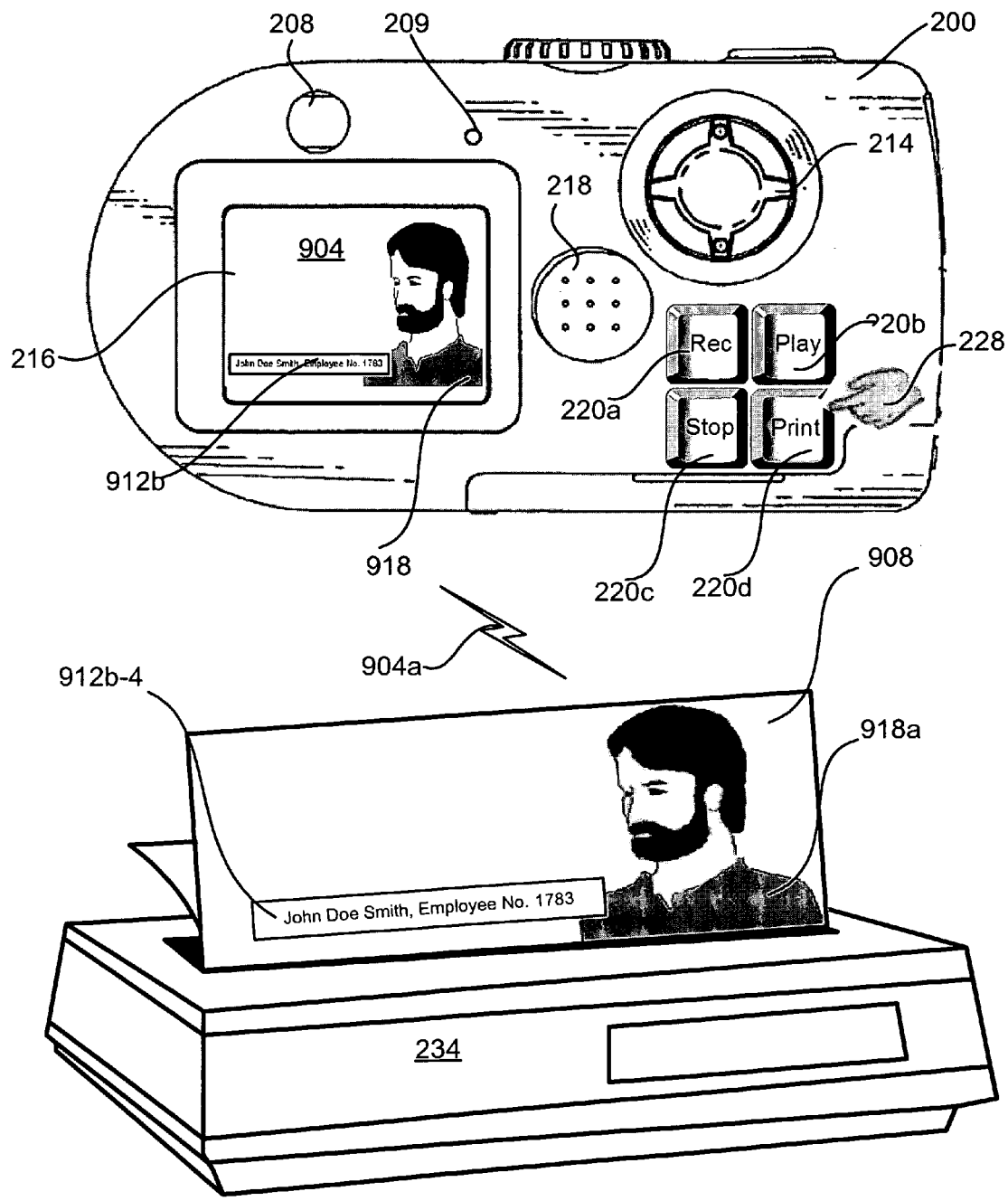
FIG. 61C illustrates another printing operation of the system shown in FIG. 61A.
Figure 61D:
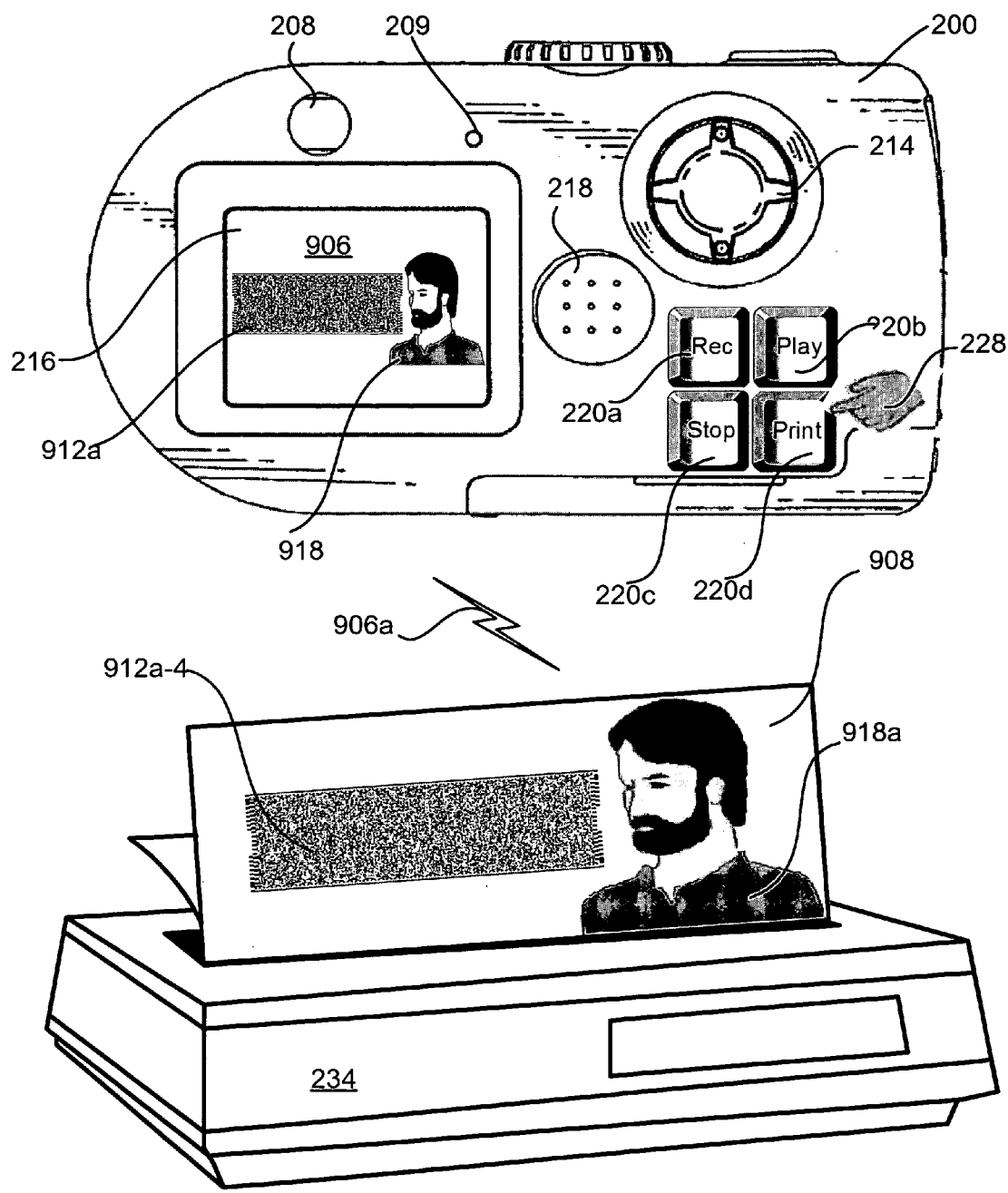
FIG. 61D illustrates yet another printing operation of the system shown in FIG. 61A.

FIG. 61C illustrates another printing operation of the system 900. The toggle switch 214 is operably configured to allow presentation of either both sections of the identifier 912, the pixel section 912a, or the alphanumeric section 912b on the camera display 216. In this case the toggle switch 214 is operated so that a fused image 904 is obtained that includes the alphanumeric section 912b with the subject image component 918. An operator 228 presses the print key 220d and causes the camera 200A to send information related to the fused image 904 to the printer 46a by a wireless signal 904a. The printer 234 receives the signal 904a and the fused image 904 is printed on paper 908. The image alphanumeric section 912b is also generated as printed identifier 912b-4 with image 918 being printed as image 918a. The alphanumeric section 912b-4 has the printed text message "John Doe Smith, Employee No. 1783", for example.

FIG. 61D illustrates yet another printing operation of the system 900. In this operation the toggle switch 214 is operated so that a fused image 906 is obtained that includes the pixel section 912a with the subject image component 918. An operator 228 presses the print key 220d that causes the camera 200A to send information related to the fused image 906 to the printer 46a through a wireless signal 906a. The printer 234 receives the signal 906a so that the fused image 906 is printed on paper 908. The image pixel section 912a is also printed as printed identifier 912a-4 with image 918 being printed as image 918a.

While embodiments of the present invention have been illustrated and described, it is understood that changes may be made without departing from the spirit and scope of the invention. For example, vendors who print images from customer-supplied digital media may be equipped with microphone-equipped readers that record a customer's voice and generates a sound-encoded or voice-encoded identifier to accompany the digital image files presented by the customer. Accordingly, the scope of the invention is not limited by the disclosure of the preferred embodiments. Instead, the invention is to be determined entirely by reference to the claims that follow.

What is claimed is:

1. A method of verifying an identity of an individual, comprising:
   producing an identifier that encodes and contains a first selected audio content received from the individual;
   applying the identifier having the encoded first selected audio content to an identification article assigned to the individual;
   acquiring a second selected audio content from the individual; and
   comparing the first selected audio content to the second selected audio content to verify the identity of the individual.

2. The method of claim 1, wherein producing the identifier further comprises providing the first selected audio content to a handheld device operable to encode the identifier.

3. The method of claim 1, wherein applying the identifier further comprises reading the identifier with a handheld device.

4. The method of claim 1, wherein acquiring a second selected audio content from the individual further comprises providing the second selected audio content to a handheld device operable to encode the identifier.

5. The method of claim 4, wherein the transferring the first selected audio content and the second selected audio content to a voice recognition device further comprises communicating the first selected audio content and the second selected audio content to a computer having voice recognition software.

6. The method of claim 1, wherein comparing the first selected audio content to the second selected audio content further comprises transferring the first selected audio content and the second selected audio content to a voice recognition device operable to make the comparison.

* * * * *